(12) United States Patent
Masud et al.

(10) Patent No.: US 9,165,051 B2
(45) Date of Patent: Oct. 20, 2015

(54) SYSTEMS AND METHODS FOR DETECTING A NOVEL DATA CLASS

(75) Inventors: Mohammad Mehedy Masud, Dallas, TX (US); Latifur Rahman Khan, Plano, TX (US); Bhavani Marienne Thuraisingham, Dallas, TX (US); Qing Chen, Plano, TX (US); Jing Gao, Urbana, IL (US); Jiawei Han, Urbana, IL (US)

(73) Assignees: BOARD OF TRUSTEES OF THE UNIVERSITY OF ILLINOIS, Urbana, IL (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 861 days.

(21) Appl. No.: 13/214,720

(22) Filed: Aug. 22, 2011

(65) Prior Publication Data

US 2012/0054184 A1 Mar. 1, 2012

Related U.S. Application Data

(60) Provisional application No. 61/376,427, filed on Aug. 24, 2010.

(51) Int. Cl.
*G06F 17/30* (2006.01)
(52) U.S. Cl.
CPC ............................. *G06F 17/30598* (2013.01)
(58) Field of Classification Search
CPC ............................................... G06F 17/30516
See application file for complete search history.

(56) References Cited

U.S. PATENT DOCUMENTS

| 7,343,362 | B1 * | 3/2008 | Flippen, Jr. | 706/20 |
|---|---|---|---|---|
| 7,464,068 | B2 | 12/2008 | Fan et al. | |
| 7,565,369 | B2 | 7/2009 | Fan et al. | |
| 2004/0019601 | A1 * | 1/2004 | Gates | 707/102 |
| 2005/0021284 | A1 * | 1/2005 | Gaal | 702/152 |
| 2005/0050087 | A1 * | 3/2005 | Milenova et al. | 707/102 |
| 2006/0095521 | A1 * | 5/2006 | Patinkin | 709/206 |
| 2006/0282425 | A1 | 12/2006 | Aggarwal et al. | |
| 2007/0226209 | A1 * | 9/2007 | Aggarwal et al. | 707/5 |
| 2007/0250522 | A1 * | 10/2007 | Perrizo | 707/101 |
| 2008/0020379 | A1 * | 1/2008 | Agan et al. | 435/6 |

(Continued)

FOREIGN PATENT DOCUMENTS

DE WO/2005/017813 A2 2/2005

OTHER PUBLICATIONS

Mohammad M. Masud, Integrating Novel Class Detection with Classification for Concept-Drifting Data Streams, Aug. 27, 2009, Springer-Verlag Berlin, Heidelberg , ECML PKDD 2009, Part II, LNAI 5782, pp. 79-94.*

(Continued)

*Primary Examiner* — Mohammad S Rostami
(74) *Attorney, Agent, or Firm* — Thomas | Horstemeyer, LLP

(57) ABSTRACT

Systems and methods for data classification and novel data class detection are provided. In one illustrative embodiment, a system or method for detecting a novel class includes receiving a data stream comprising a plurality of data points, and identifying a set of filtered outliers, in the plurality of data points, that are outside of a decision boundary. A cohesion and a separation for the set of filtered outliers may be determined. A novel class may be detected using the cohesion and the separation of the set of filtered outliers, and the novel class may include the set of filtered outliers.

32 Claims, 19 Drawing Sheets

(56) References Cited

U.S. PATENT DOCUMENTS

| | | | |
|---|---|---|---|
| 2008/0118124 A1* | 5/2008 | Madabhushi et al. | 382/128 |
| 2008/0222060 A1 | 9/2008 | Perng et al. | |
| 2009/0091443 A1 | 4/2009 | Chen et al. | |
| 2010/0223218 A1* | 9/2010 | Prendergast | 706/20 |

OTHER PUBLICATIONS

Charu C. Aggarwal, Data Streams: Models and Algorithms, Dec. 20, 2006, Springer US, illustrated, pp. 355.*

D. Agarwal. An Empirical Bayes Approach to Detect Anomalies in Dynamic Multidimensional Arrays. In Proc. ICDM, 2005.

C. C. Aggarwal, J. Han, J. Wang, and P. S. Yu. A Framework for On-Demand Classification of Evolving Data Streams. IEEE Transactions on Knowledge and Data Engineering, 18(5):577-589, 2006.

T. Ahmed, M. Coates, and A. Lakhina. Multivariate Online Anomaly Detection Using Kernel Recursive Least Squares. In Proc. IEEE Infocom, Anchorage, Alaska, May 2007.

S. D. Bay and M. Schwabacher. Mining Distance-Based Outliers in Near Linear Time with Randomization and a Simple Pruning Rule. In Proc. SIGKDD, pp. 29-38, 2003.

M. M. Breunig, H.-P. Kriegel, R. T. Ng, and J. Sander. LOF: Identifying Density-Based Local Outliers. In Proc. ACM SIGMOD, pp. 93-104, 2000.

S. Chen, H. Wang, S. Zhou, and P. Yu. Stop Chasing Trends: Discovering High Order Models in Evolving Data. In Proc. ICDE, pp. 923-932, 2008.

T. M. Cover and P. E. Hart. Nearest Neighbor Pattern Classification. IEEE Transactions on Information Theory, 13 (1):21-27, Jan. 1967.

V. Crupi, E. Guglielmino, and G. Milazzo. Neural-Network-Based System for Novel Fault Detection in Rotating Machinery. Journal of Vibration and Control, 10(8):1137-1150, 2004.

W. Fan. Systematic Data Selection to Mine Concept-Drifting Data Streams. In Proc. ACM SIGKDD International Conference on Knowledge Discovery and Data Mining (SIGKDD), pp. 128-137, Seattle, WA, USA, 2004.

J. Gao, W. Fan, and J. Han. On Appropriate Assumptions to Mine Data Streams. In Proc. Seventh IEEE International Conference on Data Mining (ICDM), pp. 143-152, Omaha, NE, USA, Oct. 2007.

G. Hulten, L. Spencer, and P. Domingos. Mining Time-Changing Data Streams. In Proc. seventh ACM SIGKDD International Conference on Knowledge Discovery and Data Mining (SIGKDD), pp. 97-106, San Francisco, CA, USA, Aug. 2001.

L. Khan, M. Awad, and B. M. Thuraisingham. A New Intrusion Detection System Using Support Vector Machines and Hierarchical Clustering. VLDB J., 16(4):507-521, 2007.

J. Kolter and M. Maloof. Using Additive Expert Ensembles to Cope with Concept Drift. In Proc. International Conference on Machine Learning (ICML), pp. 449-456, Bonn, Germany, Aug. 2005.

A. Lazarevic and V. Kumar. Feature Bagging for Outlier Detection. In Proc. SIGKDD, pp. 157-166, 2005.

M.V. Mahoney and P. Chan. Learning Rules for Anomaly Detection of Hostile Network Traffic. In Proc. ICDM, 2003.

M. Markou and S. Singh. Novelty detection: A Review-Part 1: Statistical Approaches, Part 2: Neural Network Based Approaches. Signal Processing, 83, 2003.

M. M. Masud, J. Gao, L. Khan, J. Han, and B. Thuraisingham. A Practical Approach to Classify Evolving Data Streams: Training with Limited Amount of Labeled Data. In Proc. International Conference on Data Mining (ICDM), pp. 929-934, Pisa, Italy, Dec. 15-19, 2008.

E. J. Spinosa, A. P. de Leon F. de Carvalho, and J. Gama. OLINDDA: A Cluster-Based Approach for Detecting Novelty and Concept Drift in Data Streams. Retrieved Sep. 29, 2011 from http://academic.research.microsoft.com/Publication/2469119.

A. Nairac, T. Corbett-Clark, R. Ripley, N. Townsend, and L. Tarassenko. Choosing an Appropriate Model for Novelty Detection. In Proc. International Conference on Artificial Neural Networks, pp. 117-122, 1997.

B. Pang and L. Lee. A Sentimental Education: Sentiment Analysis Using Subjectivity Summarization Based on Minimum Cuts. In Proc. of the Association for Computational Linguistics, pp. 271-278, 2004.

S. J. Roberts. Extreme Value Statistics for Novelty Detection in Biomedical Signal Processing. In Proc. Int. Conf. on Advances in Medical Signal and Information Processing, pp. 166-172, 2000.

M. Scholz and R. Klinkenberg. An Ensemble Classifier for Drifting Concepts. In Proc. Second International Workshop on Knowledge Discovery in Data Streams (IWKDDS), pp. 53-64, Porto, Portugal, Oct. 2005.

E. J. Spinosa, A. P. de Leon F. de Carvalho, and J. Gama. Cluster-Based Novel Concept Detection in Data Streams Applied to Intrusion Detection in Computer Networks. In Proc. 2008 ACM Symposium on Applied Computing, pp. 976-980, 2008.

S. Subramaniam, T. Palpanas, D. Papadopoulos, V. Kalogeraki, and D. Gunopulos. Online Outlier Detection in Sensor Data Using Non-Parametric Models. In Proc. VLDB, pp. 187-198, 2006.

G. Tandon and P. Chan. Weighting Versus Pruning in Rule Validation for Detecting Network and Host Anomalies. In Proc. SIGKDD, pp. 697-706, 2007.

K. Turner and J. Ghosh. Error Correlation and Error Reduction in Ensemble Classifiers. Connection Science, 8 (304):385-403, 1996.

H. Wang, W. Fan, P. S. Yu, and J. Han. Mining Concept-Drifting Data Streams Using Ensemble Classifiers. In Proc. Ninth ACM SIGKDD International Conference on Knowledge Discovery and Data Mining, pp. 226-235, Washington, DC, USA, Aug. 2003. ACM.

D-Y Yeung and C. Chow. Parzen-Window Network Intrusion Detectors. In Proc. International Conference on Pattern Recognition, pp. 385-388, 2002.

Y. Yang, X. Wu, and X. Zhu. Combining Proactive and Reactive Predictions for Data Streams. In Proc. SIGKDD, pp. 710-715, 2005.

Y. Yang, J. Zhang, J. Carbonell, and C. Jin. Topic-Conditioned Novelty Detection. In Proc. ACM SIGKDD, pp. 688-693, 2002.

X. Zhu. Semi-Supervised Learning Literature Survey. University of Wisconsin Madison Technical report # TR 1530, Jul. 2008.

I. Katakis, G. Tsoumakas, and I. Vlahavas. Dynamic Feature Space and Incremental Feature Selection for the Classification of Textual Data Streams. In ECML PKDD '06., pp. 102-116.

B. Wenerstrom and C. Giraud-Carrier. Temporal Data Mining in Dynamic Feature Spaces. In ICDM '06., pp. 1141-1145.

A. Bifet, G. Holmes, B. Pfahringer, R. Kirkby, and R. Gavalda. New Ensemble Methods for Evolving Data Streams. In SIGKDD, pp. 139-147, 2009.

S. Hashemi, Y. Yang, Z. Mirzamomen, and M. Kangavari. Adapted One-Versus-All Decision Trees for Data Stream Classification. IEEE TKDE, 21(5):624-637, 2009.

University of Texas at Dallas Data Mining Tools Repository. (Last updated Jul. 9, 2010). Retrieved Aug. 26, 2011, from http://dml.utdallas.edu/Mehedy.

P. Zhang, X. Zhu, and L. Guo. Mining Data Streams with Labeled and Unlabeled Training Examples. In ICDM, pp. 627-636, 2009.

E. J. Spinosa, A. P. de Leon F. de Carvalho, and J. Gama. Olindda: A Cluster-Based Approach for Detecting Novelty and Concept Drift in Data Streams. In Proc. 2007 ACM Symposium on Applied Computing, pp. 448-452, 2007.

* cited by examiner

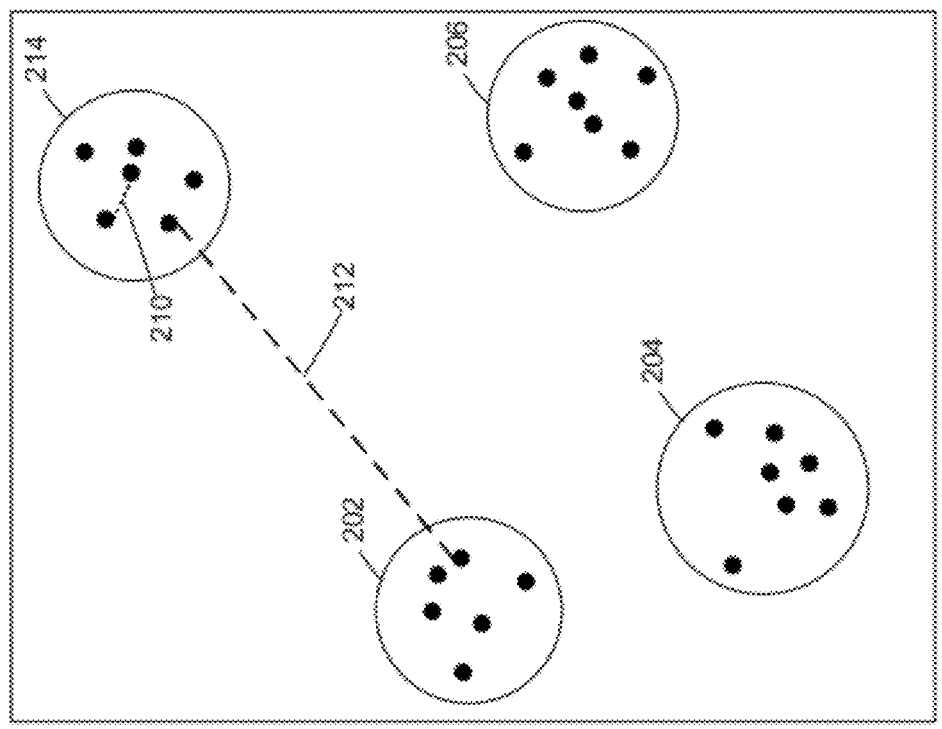
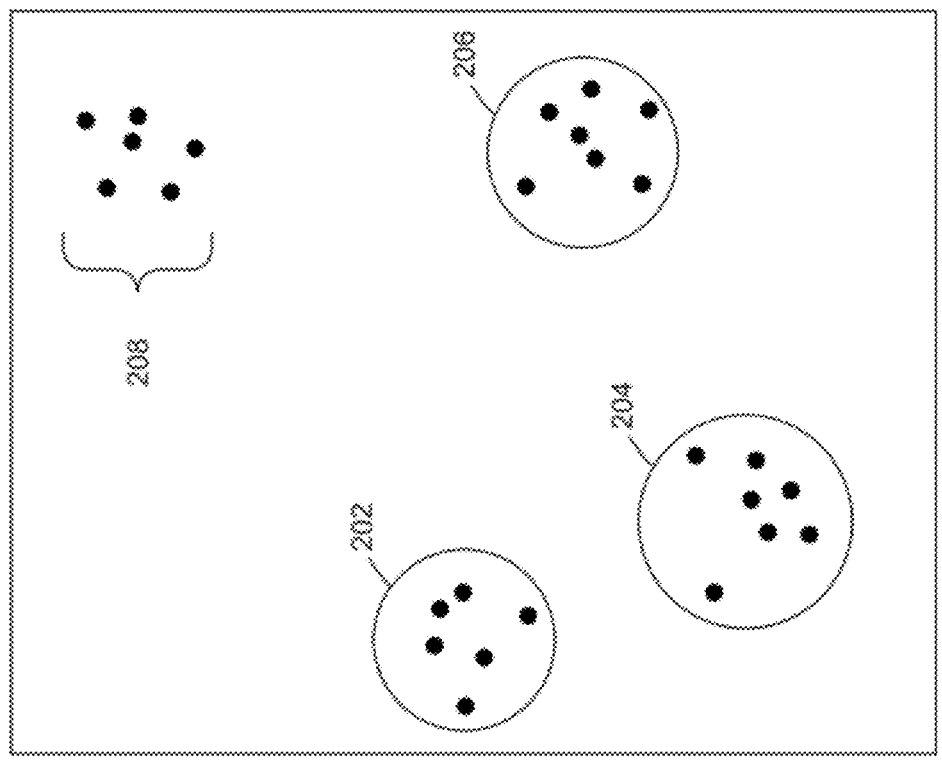

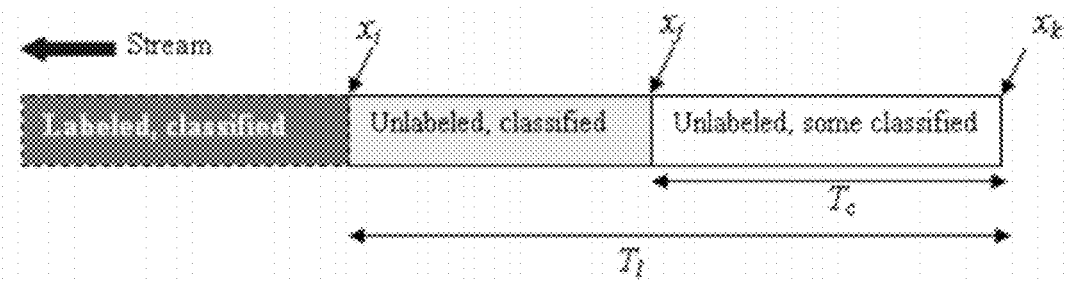

FIG. 3

TABLE I
COMMONLY USED SYMBOLS AND TERMS

| | | | |
|---|---|---|---|
| $C$ | Total number of classes in a data stream | $c_i$ | A class label |
| $D_i$ | A data chunk | $H$ | A cluster |
| $h$ | A pseudopoint created from cluster $H$ | $K$ | Number of clusters created per chunk |
| $k$ | Parameter $k$ of a $k$-NN classifier | $M$ | Ensemble size |
| $L$ | The ensemble | $L_i$ | The $i$-th model in the ensemble |
| $q$ | Parameter $q$ of the $q$-nearest neighborhood ($q$-NH) | $S$ | Chunk size |
| $T_l$ | Labeling time constraint | $T_c$ | Classification time constraint |

FIG. 4

(a) Forest Cover (b) KDDcup (c) SynCN (d) Forest Cover (e) KDDcup (f) SynCN

TABLE II
PERFORMANCE COMPARISON
| Classifier | Dataset | ERR | | | $M_{new}$ | | | $F_{new}$ | | |
|---|---|---|---|---|---|---|---|---|---|---|
| | | XM | W-OP | W-OS | XM | W-OP | W-OS | XM | W-OP | W-OS |
| Decision tree | SynC | 6.9 | 14.1 | 12.8 | - | - | - | 0.0 | 2.4 | 1.1 |
| | SynCN | 1.2 | 8.9 | 13.9 | 0.0 | 26.3 | 96.2 | 0.02 | 1.6 | 0.1 |
| | KDD | 1.8 | 5.9 | 6.7 | 1.8 | 13.2 | 96.9 | 0.9 | 4.3 | 0.83 |
| | Forest Cover | 4.7 | 7.9 | 8.3 | 8.2 | 28.7 | 70.1 | 3.0 | 1.1 | 0.2 |
| k-NN | SynC | 0.0 | 2.4 | 1.1 | - | - | - | 0.0 | 2.4 | 1.1 |
| | SynCN | 0.01 | 8.9 | 13.9 | 0.0 | 26.3 | 96.2 | 0.0 | 1.6 | 0.1 |
| | KDD | 1.2 | 4.9 | 5.2 | 5.9 | 12.9 | 96.5 | 0.9 | 4.4 | 0.83 |
| | Forest Cover | 3.6 | 4.1 | 4.6 | 8.4 | 32.3 | 70.1 | 1.3 | 1.1 | 0.2 |
FIG. 9
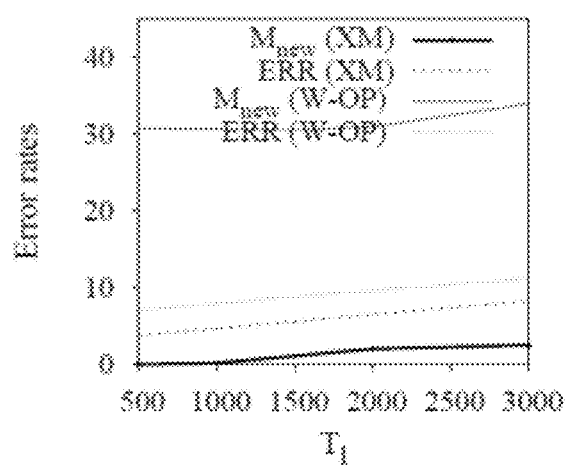
FIG. 10A
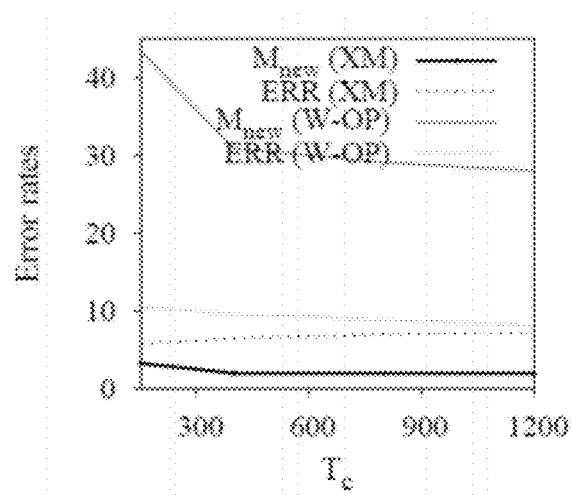
FIG. 10B TABLE III
RUNNING TIME COMPARISON IN ALL DATASETS
| Dataset | Time(sec)/1K | | | Points/sec | | | Speed gain | |
|---|---|---|---|---|---|---|---|---|
| | XM | W-OP | W-OS | XM | W-OP | W-OS | XM over W-OP | XM over W-OS |
| SynC | 0.33 | 0.41 | 0.2 | 2,960 | 2,427 | 5,062 | 1.2 | 0.6 |
| SynCN | 1.7 | 14.2 | 2.3 | 605 | 71 | 426 | 8.5 | 1.4 |
| KDD | 1.1 | 30.6 | 0.5 | 888 | 33 | 1,964 | 26.9 | 0.45 |
| Forest Cover | 0.93 | 8.3 | 0.36 | 1,068 | 120 | 2,792 | 8.9 | 0.4 |
FIG. 12
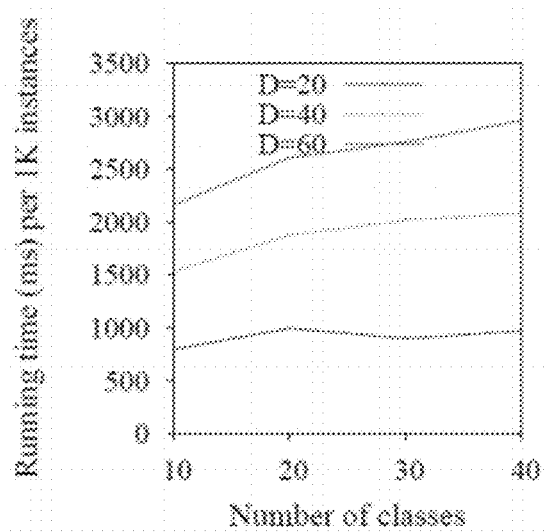
FIG. 13A
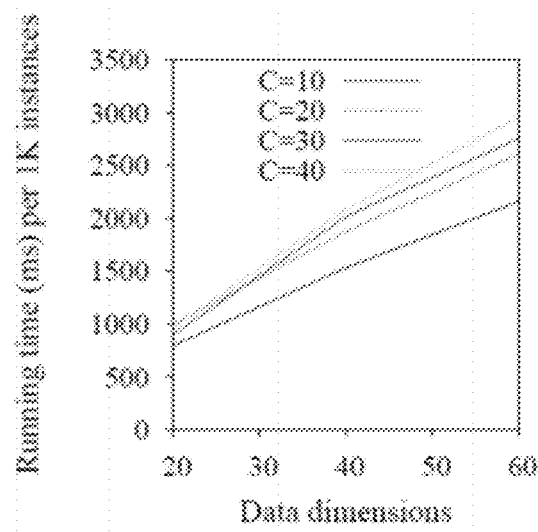
FIG. 13B

FIG. 14

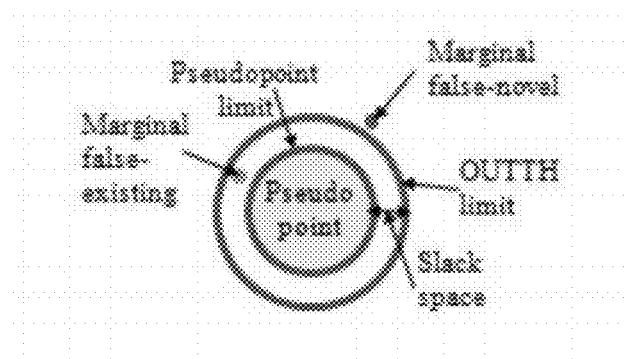

Table IV
SUMMARY OF THE RESULTS

| Dataset | Method | ERR | $M_{new}$ | $F_{new}$ | AUC |
|---|---|---|---|---|---|
| Twitter | MineClass | 17.0 | 24.3 | 15.1 | 0.88 |
| | MCM | 1.8 | 0.7 | 0.6 | 0.94 |
| | OW | 3.1 | 10.0 | 1.4 | 0.56 |
| Forest | MineClass | 3.6 | 8.4 | 1.3 | 0.97 |
| | MCM | 3.1 | 4.0 | 0.68 | 0.99 |
| | OW | 5.9 | 20.6 | 1.1 | 0.74 |

FIG. 16A

Table V
SUMMARY OF MULTI-NOVEL CLASS DETECTION RESULTS

| Dataset | Occurrence | 1 | 2 | 3 | 4 | Total |
|---|---|---|---|---|---|---|
| Twitter | Type 1 as Type 1 | 360 | 394 | 508 | 447 | 1709 |
| | Type 1 as Type 2 | 0 | 0 | 0 | 0 | 0 |
| | Type 2 as Type 2 | 518 | 568 | 453 | 500 | 2039 |
| | Type 2 as Type 1 | 35 | 0 | 35 | 19 | 109 |
| | Precision | 1.0 | 1.0 | 1.0 | 1.0 | 1.0 |
| | Recall | 0.91 | 1.0 | 0.9 | 0.96 | 0.94 |
| | F-measure | 0.95 | 1.0 | 0.94 | 0.98 | 0.97 |
| Forest | Type 1 as Type 1 | 371 | 583 | — | — | 954 |
| | Type 1 as Type 2 | 183 | 444 | — | — | 627 |
| | Type 2 as Type 2 | 300 | 550 | — | — | 850 |
| | Type 2 as Type 1 | 113 | 411 | — | — | 524 |
| | Precision | 0.67 | 0.57 | — | — | 0.60 |
| | Recall | 0.77 | 0.59 | — | — | 0.64 |
| | F-measure | 0.71 | 0.58 | — | — | 0.62 |

FIG. 16B

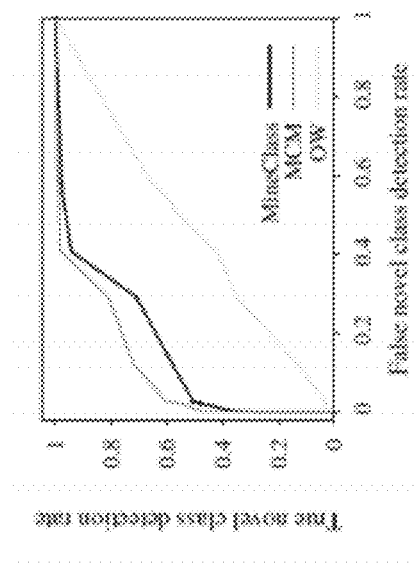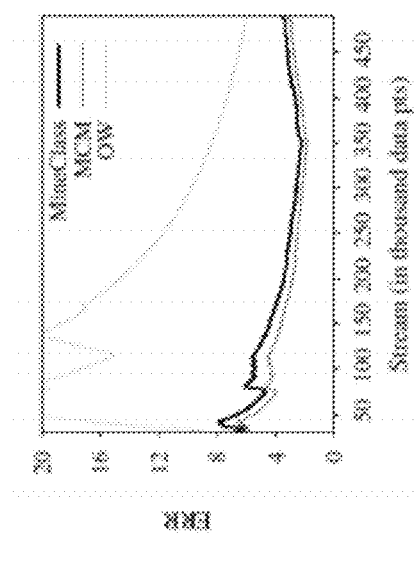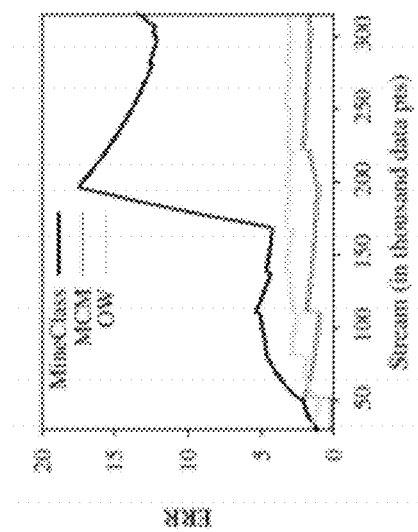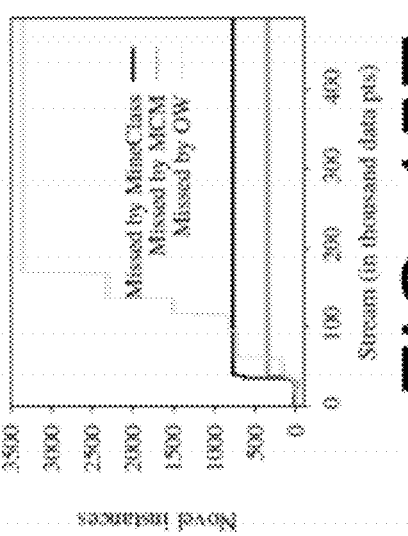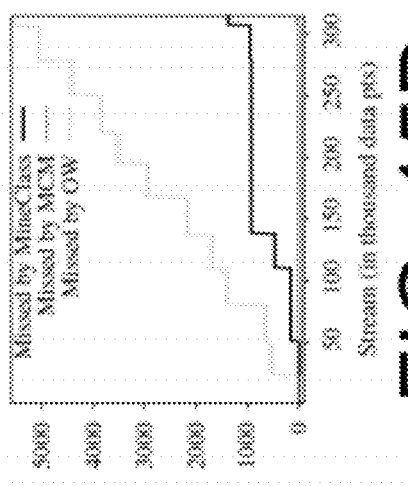

Table VI. Summary of the datasets used

| Dataset | Concept-drift | Concept-evolution | Feature-evolution | Features | Instances | Classes |
|---|---|---|---|---|---|---|
| Twitter | ✓ | ✓ | ✓ | 30 | 170,000 | 7 |
| ASRS | ✗ | ✗ | ✗ | 50 | 135,000 | 13 |
| KDD | ✓ | ✓ | ✗ | 34 | 490,000 | 22 |
| Forest | ✗ | ✗ | ✗ | 54 | 581,000 | 7 |

FIG. 17A

Table VII. Summary of the results

| Dataset | Method | ERR | $M_{new}$ | $F_{new}$ | AUC | FP | FN |
|---|---|---|---|---|---|---|---|
| Twitter | DXMiner | 4.2 | 30.5 | 0.8 | 0.887 | - | - |
| | Lossy-F | 32.5 | 0.0 | 82.0 | 0.834 | - | - |
| | Lossy-L | 1.6 | 82.0 | 0.0 | 0.704 | - | - |
| | O-F | 3.4 | 86.7 | 1.0 | 0.557 | - | - |
| ASRS | DXMiner | 0.02 | - | - | 0.000 | 0.00 | 0.1 |
| | DXMiner (info-gain) | 1.4 | - | - | 0.967 | 0.04 | 10.3 |
| | O-F | 3.4 | - | - | 0.576 | 0.00 | 24.7 |
| Forest | DXMiner | 3.0 | 8.4 | 1.3 | 0.973 | - | - |
| | O-F | 5.9 | 20.6 | 1.1 | 0.743 | - | - |
| KDD | DXMiner | 1.2 | 8.9 | 0.9 | 0.989 | - | - |
| | O-F | 4.7 | 9.6 | 4.4 | 0.907 | - | - |

FIG. 17B

SYSTEMS AND METHODS FOR DETECTING A NOVEL DATA CLASS

CROSS-REFERENCE TO RELATED APPLICATIONS

This application claims the benefit of U.S. Provisional Application No. 61/376,427 filed Aug. 24, 2010, which is hereby incorporated by reference.

STATEMENT REGARDING FEDERALLY SUPPORTED RESEARCH

This invention was made with government support under Grant No. FA9550-08-1-0265 awarded by the Air Force Office of Scientific Research and Grant No, NNX08AC35A awarded by the National Aeronautics and Space Administration. The government has certain rights in the invention.

TECHNICAL FIELD

The illustrative embodiments relate generally to data processing, and more particularly, to the detection of novel data classes in a data stream.

BACKGROUND

It is a major challenge to the data mining community to mine the ever-growing amount of streaming data. Indeed, there are problems related to stream data classification. For example, two problems related to data streams involve "infinite length" and "concept-drift". Since data streams have infinite length, traditional multi-pass learning processes are not applicable as they would require infinite storage and training time. Concept-drift occurs in the stream when the underlying concept of the data changes over time. Another example of a problem or failure in current data stream classification techniques involves "concept-evolution", meaning, emergence of a novel class. Some of the existing solutions assume that the total number of classes in the data stream is fixed. But in real world data stream classification problems, such as intrusion detection, text classification, and fault detection, novel classes may appear at any time in the stream (e.g. a new intrusion). Traditional data stream classification techniques may be unable to detect the novel class until the classification models are trained with labeled instances of the novel class. Thus, novel class instances may go undetected (i.e., misclassified) until the novel class is manually detected by experts, and training data with the instances of that class is made available to the learning process. These examples of problems illustrate some of the current failures in the field of data stream, classification, though improvement in other areas is needed as well.

SUMMARY

According to an illustrative embodiment, a method for detecting a novel class includes receiving a data stream including a plurality of data points, and identifying a set of filtered outliers, in the plurality of data points, that are outside of a decision boundary. The method also includes determining a cohesion and a separation for the set of filtered outliers. The method also includes detecting a novel class using the cohesion and the separation of the set of filtered outliers, the novel class including the set of filtered outliers.

According to another illustrative embodiment, a method for detecting a novel class includes receiving a data stream including a plurality of data points, and dividing the data stream into a plurality of chunks. The method also includes generating a plurality of classification models to form an ensemble, each of the classification models generated using respective chunks in the plurality of chunks. The method also includes generating, for each of the classification models in the ensemble, a respective decision boundary, and identifying, for each of the classification models in the ensemble, a respective set of filtered outliers that are outside of the respective decision boundary of the classification model. The method also includes determining a cohesion and a separation for the respective set of filtered outliers for each of the classification models in the ensemble. The method also includes determining, by each of the classification models in the ensemble, whether a novel class is detected by the classification model using the cohesion and the separation for the respective set of filtered outliers, and detecting the novel class in response to a threshold number of the plurality of classification models in the ensemble determining that the novel class is detected.

According to another illustrative embodiment, a data classification and novel class detection system includes a decision boundary builder to determine a decision boundary, and a filtered outlier identifier to determine a set of filtered outliers, in an incoming data stream, that is outside of the decision boundary. The data classification and novel class detection system also includes a cohesion and separation analyzer to determine a cohesion and a separation for the set of filtered outliers. The data classification and novel class detection system also includes a novel class determination engine to detect a novel class using the cohesion and the separation for the set of filtered outliers.

BRIEF DESCRIPTION OF THE DRAWINGS

FIG. 2A is a schematic, pictorial representation of existing class clusters that have been built from training data in accordance with an illustrative embodiment;

FIG. 2B is a schematic, pictorial representation of how a novel data class may be declared in accordance with an illustrative embodiment;

FIG. 3 provides one example of the time constraints proposed by the illustrative embodiments and the significance of $T_1$ and $T_c$ in accordance with an illustrative embodiment;

FIG. 4 is a table providing example definitions for commonly used symbols;

FIG. 9 depicts an example summary of error metrics for ECSMiner, WCE-OLINDDA_PARALLEL, and WCE-OLINDDA_SINGLE in each dataset for decision tree and KNN in accordance with an illustrative embodiment;

FIGS. 10A-10B depict example ECSMiner and WCE-OLINDDA_PARALLEL responses to the constraints $T_1$ and $T_c$ in Forest Cover dataset in accordance with, an illustrative embodiment;

FIG. 12 depicts a comparison of the running times of ECSMiner, WCE-OLINDDA_PARALLEL, and WCE-OLINDDA_SINGLE on each dataset for decision tree in accordance with an illustrative embodiment;

FIGS. 13A-13B depict example results of the scalability of ECSMiner high dimensional data in accordance with an illustrative embodiment;

FIG. 14 depicts a slack space outside the decision boundary in accordance with an illustrative embodiment;

FIGS. 15A and 15B depict example total misclassification errors for Twitter and Forest datasets respectively in accordance with an illustrative embodiment;

FIG. 15C depicts example ROC curves for the Twitter dataset in accordance with an illustrative embodiment;

FIGS. 15D and 15E depict an example total number of novel class instances missed (i.e., misclassified as existing class) for the Twitter and Forest datasets respectively in accordance with an illustrative embodiment;

FIG. 16A is a table summarizing example results of overall classification and novel class detection error in accordance with an illustrative embodiment;

FIG. 16B is a table summarizing multiple novel class detection results in accordance with an illustrative embodiment;

FIG. 17A is a table summarizing example datasets used, in accordance with an illustrative embodiment;

FIG. 17B is a table illustrating the ERR, $M_{new}$ (% of novel class instances Misclassified as existing classes), $F_{new}$ (% of existing class instances Falsely identified as novel class), FP (total existing class instances misclassified as a novel class), FN (total novel class instances misclassified as an existing class), and AUCs (areas under the curve) in accordance with am illustrative embodiment;

DETAILED DESCRIPTION

Figure 1:
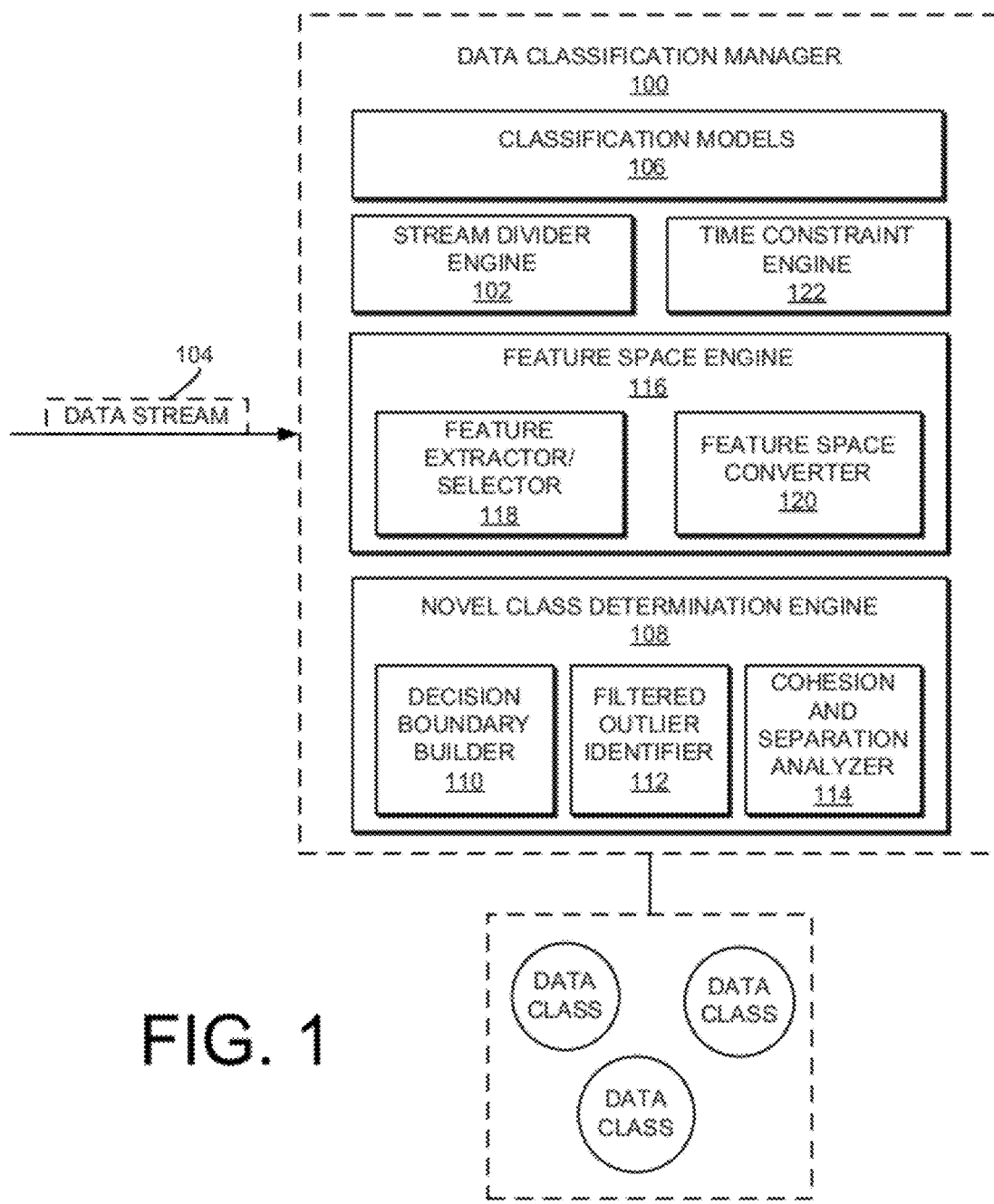
FIG. 1 is a schematic, block diagram of a system for classifying data and detecting novel classes in accordance with an illustrative embodiment.

In the following detailed description of the illustrative embodiments, reference is made to the accompanying drawings that form a part hereof. These embodiments are described in sufficient detail to enable those skilled in the art to practice the invention, and it is understood, that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense.

The illustrative embodiments provide a system and method for data stream classification and novel data class detection. In particular, a data classification framework is provided that enables the automatic detection of novel classes in evolving (i.e., dynamic content) data streams, without necessarily requiring the classification models (classifiers) being trained with any labeled instances of those new classes. In identifying novel classes in an evolving data stream, the data classification framework allows for detecting whether a single data point deviates from, or is outside of, a decision boundary representing existing classes, and determines whether a group of such data point outliers possesses the potential of forming a new class by showing sufficient cohesion among themselves, as well as showing a sufficient separation from the existing classes. If defined cohesion and separation parameters are met, a novel class may be automatically declared.

In one embodiment, when a data stream including a plurality of data points is received by the data stream classification mechanism, a set of filtered, outliers (F-outliers) in the plurality of data points that are outside of a decision boundary (that was built during training) are identified. For each F-outlier in the set of F-outliers, both a cohesion measurement between the F-outlier and other F-outliers and a separation measurement between the F-outlier and existing data classes are determined. If enough cohesion among the F-outliers and enough separation from the existing data classes and the F-outliers are found, then the set of F-outliers may be identified as part of a novel class.

I. Introduction

A goal of data stream classification may be to train classification models based on past labeled data, and to classify data from future incoming data streams using these trained models. The term "classification" comprises the task of categorizing an object into two or more different classes, or related groups. A classification model is typically trained by providing a fixed set of training data comprising known attributes to a model employing a classification process. As the model processes the training data, the model learns to categorize the data into classes, and any errors in the classification may be addressed.

The dynamic and evolving nature of data streams pose special challenges to the development of effective and efficient classification processes. Two examples of challenging characteristics of data streams are "infinite length" and "concept-drift." Since a data stream is a high volume phenomenon, which can be considered infinite in length, it is impractical to store and use all the historical data for training. Therefore, traditional learning classification techniques that require multiple passes over the whole training data, may not be directly applicable to data streams.

In addition, concept-drift occurs in the stream when the underlying concepts of the stream change over time. A classification model should adapt itself to the most recent concept in order to cope with concept-drift. However, another characteristic of data streams is that of "concept-evolution." Concept-evolution occurs when new classes evolve in the data. In order to cope with concept-evolution, a classification model may be able to automatically detect these novel, classes. For example, consider the problem of intrusion detection in a network traffic stream. If each type of attack is considered a particular class, then concept-evolution occurs when a completely new kind of attack occurs in the traffic, thereby representing a new class. Another example is the case of a textual data stream, such as that occurring in Twitter. In this case, new topics (classes) may frequently emerge in the underlying stream of text messages.

A further characteristic of some data streams is "feature-evolution." Feature-evolution occurs when new features emerge in the data stream. In other words, the feature space that represents a data point in the stream may change over time. For example, consider a text stream where each data point is a document, and each word is a feature. Over time, the feature space can change dynamically as new words that may be useful for classification emerge and old, previously useful words become redundant. Since it is impossible to know which words will appear in the data stream in the future, the complete feature space may be unknown. In addition, it is customary to use only a subset of the words as the feature set because a portion of the words are likely to be redundant for classification. Therefore at any given time, the feature space is defined by the useful words (i.e., features) selected using selection criteria. However, existing data stream classification techniques may attempt to address only infinite length and concept-drift problems in classification of data streams and assume that the feature space of the data points in the stream is static. This assumption may be impractical for some type of data, for example, textual data. The illustrative embodiments consider the dynamic nature of the feature space and provide an elegant solution for classification and novel class detection when the feature space is dynamic.

Thus, the illustrative embodiments provide solutions that address several current data stream classification challenges, including infinite length, concept-drift, concept-evolution, and feature evolution, among others. The illustrative embodiments may be useful in various domains or applications, such as network intrusion detection, fault detection, malware detection, text classification, power grid system fault or intrusion detection, credit card fraud detection, and many others. To provide one non-limiting example, in the case of intrusion detection, a new kind of intrusion might go undetected by traditional classifiers, but the illustrative embodiments may detect the intrusion and deduce that, it is a new kind of intrusion. This discovery may lead to an intense analysis of the intrusion by human experts in order to understand its cause, find a remedy, and make the system more secure.

II. Data Classification System

Referring now to FIG. 1, a block diagram of an exemplary system for classifying data streams and detecting novel classes is depicted in accordance with an illustrative embodiment. Data classification manager 100 may be implemented in a computing device, such as computing device 102 in FIG. 23. Data classification manager 100 is only meant as an example and not intended as a limitation on different illustrative embodiments. For example, data classification manager 100 may include more or fewer components as necessary to accomplish processes of the different illustrative embodiments.

In this example, data classification manager 100 comprises various components that may be used to handle infinite length, concept-drift, concept-evolution, and feature-evolution challenges, among others, when classifying data streams. In one embodiment, data classification manager 100 includes stream divider engine 102. When data stream 104 is received at data classification manager 100, stream divider engine 102 may divide data stream 104 into chunks (e.g., equal-sized chunks), wherein a chunk may be used to train one classification model when all the data instances in the chunk have been labeled, manually or otherwise.

Classification models 106 comprise the data classifiers in data classification manager 100 and may be used to classify data stream 104. Classification models 106 may comprise a single model or an ensemble of models. In one embodiment, classification models 106 comprise an ensemble of N models, and each model may be trained to classify data instances using a labeled, data chunk. The ensemble may also be continuously updated so that it represents the most recent concept in the stream. For example, the update may be performed in one embodiment as follows: when a new classification model is trained, one of the existing models in the ensemble may be replaced by the new model, if necessary. The victim model may be chosen by evaluating the error rate of each of the existing models in the ensemble on the latest-labeled chunk, and discarding the one with the highest error rate.

In addition, each classification model 106 in the ensemble may detect novel classes within data stream 104. The novel data detection features may be applied to synthetic and real-world data and enable classification models 106 to automatically detect new classes arriving in data stream 104, without requiring manual intervention. For example, each classification model 106 processing a data stream 104 may attempt to classify a data instance in the stream. A class may be defined as a novel class if none of the classification models 106 has been trained with that class. Otherwise, if one or more of the classification models 106 has been trained with that class, then that class may be considered an existing class. Data points belonging to the same class should be closer to each other (cohesion) than other data points, and should be far apart from the data points belonging to other classes (separation).

The detection and determination of a novel class may comprise the following main aspects. First, a decision boundary may be built during training of the models. Second, the test points falling outside the decision boundary may be declared as filtered outliers, or F-outliers. F-outliers have the potential to be declared novel class instances. Third, the F-outliers may be analyzed to see if there is enough cohesion among themselves (i.e., among the F-outliers) and separation from the training instances. Fourth, where the cohesion and separation is sufficient, the F-outliers may be identified, as instances in a novel class.

In one embodiment, a novel class determination engine 108 may comprise a decision boundary builder 110, an F-outlier identifier 112, and a cohesion and separation analyzer 114. Decision boundary builder 110 may be used to identify boundaries around the training data. In one embodiment, a decision boundary may be a boundary that encompasses the training data. In a non-limiting example of this embodiment, the decision boundary may be a boundary that encompasses the training data as tightly as possible. In one embodiment, a decision boundary may be built for each of the classification models 106 in data classification manager 100.

F-outlier identifier 112 may be used to identify the data points that fall outside the defined decision boundary. For instance, when classifying a data point within the data stream 104, if the data point is determined to be inside the decision boundary of any classification model 106 in the ensemble, then that data point may be classified as an existing class instance using majority voting of the models. However, if that data point is outside the decision boundary of all the classification models 106, then the data point may be considered an F-outlier, and the data instance is temporarily stored in a buffer buf. As F-outliers are added to the buffer, the number of F-outliers may meet or exceed a predetermined threshold value. When this threshold value is met or exceeded, the data class determination engine 110 initiates the cohesion and separation analyzer 114 to determine if these F-outliers belong to a novel class. Additional details and embodiments of this process are provided below.

The cohesion and separation analyzer 114 compares the F-outliers to each other and to the existing classes. In particular, the cohesion and separation analyzer 114 makes a determination as to whether the F-outliers represent data points that are well separated from the training data points of the existing classes. The higher the separation an F-outlier is from the training data, the more likely that the F-outlier may be part of a novel class. In addition, the cohesion and separation analyzer 114 may make a determination as to whether the F-outliers have enough cohesion among themselves (i.e., among the F-outliers). If a sufficient number of F-outliers are found that show strong cohesion among themselves (i.e., they are close together), and these F-outliers represent data points that are well separated from the training data, then the cohesion and separation analyzer 114 may declare the F-outliers as a novel class.

In one embodiment, a feature space engine 116 is provided which considers the dynamic nature of the feature space of the data stream 104. In one non-limiting example, a feature may be a word in a document (data point) in a text stream. As the feature space that represents a data point in the stream may change over time, the feature space engine 116 enables the classification models 106 to correctly classify a data point that has a different feature space than the feature space of the models. In this example embodiment, feature space engine 116 may comprise feature extractor/selector 118 and feature space converter 120. Feature extractor/selector 118 may be used on the raw data to extract all of the features of a training data chunk. Once the features are extracted, feature extractor/selector 118 may select the best features for the latest unlabeled data chunk. In addition, feature space converter 120 may be utilized when the feature set is dynamic (there may be different data sets in the different data chunks). In order to have the classification models 106 trained on the same feature sets, feature space converter 120 may be used to homogenize the feature sets of the models and test instances prior to classification.

In order to determine whether an instance belongs to a novel class, the classification model may sometimes need to wait for more test instances to discover similarities among those instances. A maximum allowable wait time $T_c$ may be imposed as a time constraint to classify a test instance. In addition, most existing stream classification approaches assume that the true label of a data point can be accessed immediately after the data point is classified. In reality, a time delay $T_l$ may be involved in obtaining the true label of a data point, since manual labeling is time consuming. Time constraint engine 122 may be used to apply the time constraints to the classification process. For instance, the illustrative embodiments may wait to determine whether more such F-outliers appear in the streams that observe strong cohesion among themselves. If a sufficient number of such strongly cohesive and well separated F-outliers are observed, a novel class may be assumed to have appeared, and the F-outliers may be classified as a novel class instance. However, the classification decision of a test instance may be deferred at most $T_c$ time units after its arrival. Novel class instances may keep being detected in this 'unsupervised' fashion for at least $T_l$ time units from the arrival of the first novel class instance, since labeled training data of the novel class(es) may not be available before that point.

A. Novel Classes and F-outliers

FIGS. 2A and 2B depict am overview of novel class determination in accordance with the illustrative embodiments. In particular, FIG. 2A provides a pictorial representation of existing class clusters 202, 204, 206 that have been built from training data. Also shown are data points 208 that do not fall within the decision boundary of the existing classes. In traditional classification systems, these data points 208 may be misclassified into existing classes 202, 204, 206, even though the data points may potentially comprise a new data class. In contrast, FIG. 2B provides a pictorial view of how a novel data class may be declared.

In one embodiment, the novel class determination engine 108 in FIG. 1 identifies any F-outliers from the data stream. In this example, data points 208 may be considered F-outliers as they fall outside of the predetermined decision boundary. Following a property that states a data point should be closer to the data points of its own class (cohesion) and farther apart from the data points of other classes (separation), the novel class determination engine 108 may measure the cohesion (e.g., 210) among each of the F-outliers 208 in the buffer, and the separation (e.g., 212) of each of the F-outliers 208 from the existing class instances by computing a unified measure of cohesion and separation, which may be called q-Neighborhood Silhouette Coefficient (q-NSC). The expression q-NSC yields a value between −1 and +1. A positive value indicates that, a particular data point is closer to the other F-outlier instances (more cohesion) and farther away from existing class instances 202, 204, 206 (more separation), and vice versa. In an example, based on the positive cohesion and separation measurement, F-outliers 208 may be declared a novel class 214. The q-NSC value of an F-outlier may be computed separately for each classification model. A novel class is declared if there are at least q' (>q) F-outliers having a positive q-NSC for all the classification models.

Two possible novelty detection technique categories include parametric and non-parametric. Parametric approaches assume a particular distribution of data, and estimate parameters of the distribution from the normal data. According to this assumption, any test instance may be assumed to be novel if it does not follow the distribution. The illustrative embodiments may utilize a non-parametric approach, and therefore, may not be restricted, to any specific data distribution. Examples of non-parametric approaches include the parzen window method, k-nearest neighbor (k-NN) based approach, kernel based method, and rule based approach.

Many existing novelty detection techniques only consider whether a test data point is significantly different from the normal data. However, the illustrative embodiments may not only consider whether a test instance is sufficiently different from the training data, but also may consider whether there are strong similarities among such test instances. Therefore, existing techniques may discover novelty individually in each test point, whereas the illustrative embodiments may discover novelty collectively among several coherent test points to detect the presence of a novel class. In addition, some of the illustrative embodiments may be considered as "multiclass" novelty detection techniques, since they may distinguish among different classes of data, and also discover emergence of a novel class. But existing novelty detection techniques may only distinguish between normal and novel, and, therefore, can be considered as "one-class" classifiers. Furthermore, most of the existing novelty detection techniques assume that the "normal" model is static, i.e., there is no concept-drift in the data. The illustrative embodiments, on the other hand, may detect novel classes even if concept-drift occurs in the existing classes.

B. Classification Time Constraints

Traditional stream classification techniques often make impractical assumptions about the availability of labeled data. Most existing techniques improperly assume that the true label of a data point can be accessed as soon as it has been classified by the classification model. However, the label of a data instance is not always immediately obtainable, since manual labeling of data can be time consuming and costly. For example, in a credit card fraud detection problem, the actual labels (i.e., authentic/fraud) of credit card transactions usually become available in the next billing cycle after a customer reviews all his transactions in the last statement and reports fraud transactions to the credit card company. One assumption that may be used by the illustrative embodiments is to have a data point labeled after $T_l$ time units of its arrival. For simplicity, it may be assumed that the i-th instance in the stream arrives at the i-th time unit. Thus, $T_l$ may be considered as a time constraint imposed on data labeling process. Note that traditional stream classification techniques may assume $T_l=0$. The illustrative embodiments may also impose another time constraint, $T_c$, on classification decision. That is, an instance may be considered to be classified, by the classification model within $T_c$ time units of its arrival. If it is assumed that there is no concept-evolution, it may be customary to have $T_c=0$, i.e., an instance should be classified as soon as it arrives. However, when new concepts evolve in the continuous data stream, classification decisions may sometimes have to be postponed until enough data instances are seen by the classification models to gain confidence in the decisions made whether an instance belongs to a novel class or not. $T_c$ may be considered the maximum allowable time up to which the classification decision can be postponed. In the illustrative embodiments, it may be desirable that $T_c < T_l$.

FIG. 3 provides one non-limiting example of the time constraints proposed by the illustrative embodiments and the significance of $T_l$ and $T_c$. In this example, $x_k$ is the last data instance in the data stream that has arrived at the classification model. Let $x_j$ be the data instance that arrived $T_c$ time units earlier and $x_i$ be the data instance that arrived $T_l$ time units earlier. Then $x_i$ and all data instances that arrived before $x_i$ (shown with dark-shaded, area) are labeled, since all of them are at least $T_l$ time units old. Similarly, $x_j$ and all data instances that arrived before $x_j$ (both the light-shaded and dark-shaded areas) are classified by the classification model since the data instances are at least $T_c$ time units old. However, the data instances inside the light-shaded area are unlabeled (unclassified). Data instances that arrived after $x_j$ (age less than $T_c$) are unlabeled, and may or may not be classified (shown with the unshaded area). In summary, $T_l$ may be enforced/utilized by labeling a data instance x after $T_l$ time units of its arrival at the classification model, and $T_c$ may be enforced by classifying x within $T_c$ time units of its arrival at the classification model, for every data instance x in the data stream.

III. Data Stream Classification

The following mathematical formulations for the data stream classification problem may be utilized.

The data stream may be a continuous sequence of data points: $\{x_1, \ldots, x_{now}\}$, where each $x_i$ is a d-dimensional feature vector, $x_1$ is the very first data point in the stream, and $x_{now}$ is the latest data point that has just arrived.

Each data point $x_i$ may be associated with two attributes: $y_i$, and $t_i$, being its class label, and time of arrival, respectively.

For simplicity, it may be assumed that $t_{i+1}=t_i+1$, and $t_1+1$.

The latest $T_l$ instances in the stream: $\{x_{now-T_l+1}, \ldots, x_{now}\}$ may be unlabeled, meaning, their corresponding class labels are unknown. But the class labels of all other data points may be known.

The class label of $x_{now}$ may be predicted before the time $t_{now}+T_c$, i.e., before the data point $x_{now+T_c}$ arrives, and $T_c < T_l$.

Table I, shown in FIG. 4, provides example definitions for the most commonly used symbols herein.

A. Top Level Process

Process 1 below shows one approach that may be utilized by the illustrative embodiments:

---

Process 1 ECSMiner

```
1:   L ← Build-initial-ensemble( )
2:   buf ← empty //temporary buffer
3:   U ← empty //unlabeled data buffer
4:   𝓛 ← empty //labeled data buffer (training data)
5:   while true do
6:     x_j ← the latest data point in the stream
7:     Classify(L,x_j,buf) //(Process 2, section IV)
8:     U ⇐ x_j //enqueue
9:     if |U| > T_l then //time to label the oldest
          instance
10:      x_k ⇐ U //dequeue the instance
11:      𝓛 ⇐ <x_k,y_k> //label it and save in training buffer
12:      if |𝓛| = S then //training buffer is full
13:        L'     ← Train-and-save-decision-boundary(𝓛)
                    (section III-E)
14:        L     ← Update(L,L',𝓛)
15:        𝓛     ← empty
16:      end if
17:    end if
18:  end while
```

---

Process 1 may start with building the initial ensemble of models $L=\{L_1, \ldots, L_M\}$ with the first M labeled data chunks. The process may maintain three buffers: buffer buf keeps potential novel class instances, buffer U keeps unlabeled data points until they are labeled, buffer $\mathcal{L}$ keeps labeled instances until they are used to train a new classifier. After initialization, the while loop begins from line 5, which may continue indefinitely. At each iteration of the loop, the latest data point in the stream, $x_j$ may be classified (line 7) using Classify ( ) (see, e.g., Process 2 below). The novel class detection mechanism may be implemented, inside Process 2. If the class label of $x_j$ cannot be predicted immediately, it may be stored in buf for future processing. Example details of this step will be discussed below. $x_j$ may then be pushed into the unlabeled data buffer U (line 8). If the buffer size exceeds $T_l$, the oldest element $x_k$ may be dequeued and labeled (line 9), since $T_l$ units of time has elapsed since $x_k$ arrived in the stream (so it is time to label $x_k$). The pair $<x_k, y_k>$ may be pushed into the labeled data buffer $\mathcal{L}$ (line 9). When there are S instances in $\mathcal{L}$, where S is the chunk size, a new classifier L' may be trained using the chunk (line 13). Then the existing ensemble may be updated (line 14) by choosing the best M classifiers from the M+1 classifiers LU{L'} based on their accuracies on $\mathcal{L}$, and the buffer $\mathcal{L}$ may be emptied to receive the next chunk of training data (line 15). The process(es) utilized by the illustrative embodiments, including, but not limited to, Process 1, will be referenced henceforth as "ECSMiner" (pronounced like ExMiner), which stands for Enhanced Classifier for Data Streams with novel class Miner. In one embodiment, any base learner may be enhanced with the novel class detector embodiments, and used in ECSMiner. In one example, the Train-and-save-decision-boundary may be treated specially for a particular base learner.

B. Example—Nearest Neighborhood Rule

The instances belonging to a class c may be generated by an underlying generative model $\theta_c$, and the instances in each class may be independently identically distributed. Thus, it may be considered that the instances which are close together under some distance metric are supposed to be generated by the same model, i.e., belong to the same class. This may be one basic assumption for nearest-neighbor classifications. An example of the concept of "nearest neighborhood" is as follows:

Definition 1 ($\lambda_{c,q}$-neighborhood): $\lambda_{c,q}$-neighborhood, or $\lambda_{c,q}(x)$ of any instance x is the set of q nearest neighbors of x within class c.

Figure 5A:
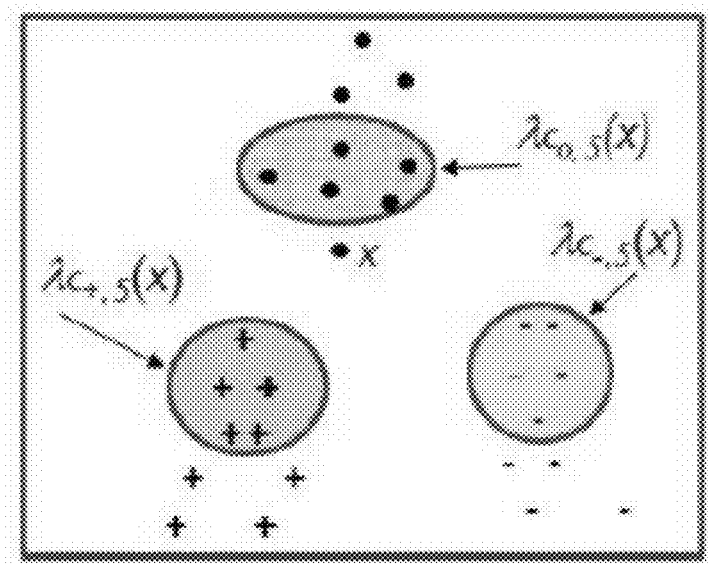
FIG. 5A depicts an example of the "nearest neighborhood" in accordance with an illustrative embodiment.

For example, let there be three classes $c_+$, and $c_-$, and $c_0$, denoted by the symbols "+", "−", and black dots, respectively, as shown in FIG. 5A. Also, let q=5. Then $\lambda_{c_+,q}(x)$ of any arbitrary instance x may be the set of 5 nearest neighbors of x in class $c_+$, and so on. FIG. 5A illustrates one example of $\lambda_{c,q}(x)$ for q=5.

In one example, let $\overline{D}_{c,q}(x)$ be the mean distance from x to $\lambda_{c,q}(x)$, i.e., $$\overline{D}_{c,q}(x) = \frac{1}{q} \sum_{x_i \in \lambda_{c,q}(x)} D(x, x_i) \qquad \text{Equation (1)}$$

where $D(x_i, x_j)$ may be the distance between the data points $x_i$ and $x_j$ in some appropriate metric. In one example, let $c_{min}$ be the class label such that $\overline{D}_{c_{min},q}(x)$ may be the minimum among all $\overline{D}_{c,q}(x)$, i.e., $\lambda_{c_{min},q}(x)$ is the nearest $\lambda_{c,q}(x)$ neighborhood (or q-nearest neighborhood or q-NH) of x. For example, in FIG. 5A, $c_{min}=c_0$, i.e., $\lambda_{c_0,q}(x)$ is the q-NH of x.

The illustrative embodiments may use the following definition:

Definition 2 (q-NH rule): Let $c_{min}$ be the class label of the instances in q-NH of x. According to the q-NH rule, the predicted, class label of x is $c_{min}$.

In the example of FIG. 5A, $c_{min}=c_0$, therefore, the predicted class label of x may be $c_0$. The novel class detection technique embodiments may use the assumption that any class of data follows the q-NH rule. The similarity of this rule with k-NN rule is discussed below.

C. Novel Class and Possible Properties

The illustrative embodiments may use the following definition:

Definition 3 (Existing class and Novel class): Let L be the current ensemble of classification models. A class c is an existing class if at least one of the models $L_i \in L$ has been trained with the instances of class c. Otherwise, c is a novel class.

Therefore, in one example if a novel class c appears in the stream, none of the classification models in the ensemble may be able to correctly classify the instances of c. The following property of the novel class may result from the q-NH rule.

Property 1: Let x be an instance belonging to a novel class c, and let c' be an existing class. Then according to q-NH rule, $\overline{D}_{c,q}(x)$, i.e., the average distance from x to $\lambda_{c,q}(x)$ is smaller than $\overline{D}_{c',q}(x)$, the average distance from x to $\lambda_{c',q}(x)$, for any existing class c'. In other words, x may be closer to the neighborhood of its own class (cohesion), and farther from the neighborhood of any existing classes (separation).

Figure 5B:
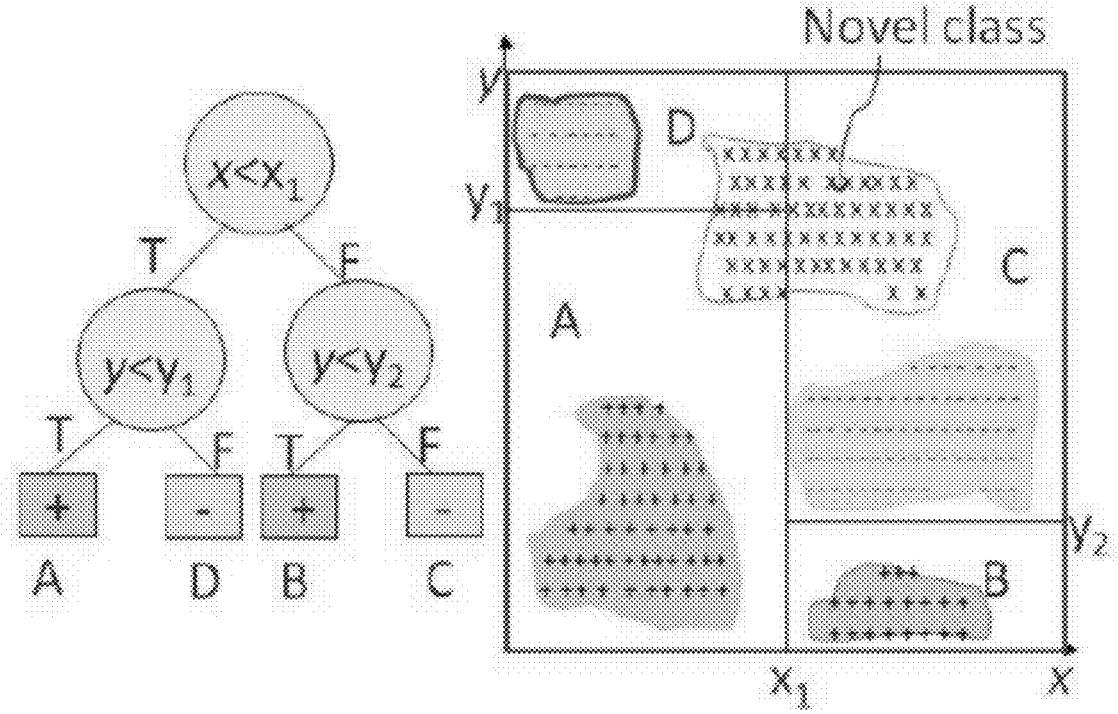
FIG. 5B depicts an example of a decision tree and an appearance of a novel class in accordance with an illustrative embodiment.

FIG. 5B shows a hypothetical example of a decision tree and an appearance of a novel class. An example of a decision tree and its corresponding feature vector partitioning by its leaf nodes are shown in FIG. 5B. The shaded portions of feature space may represent the training data. After the decision tree is built, a novel class may appear in the stream (shown with, "x" symbol), which, in some circumstances, may follow Property 1. The decision tree model may misclassify all the instances in the novel class as existing class instances since the model is unaware of the novel class. The illustrative embodiments may detect the novel class without having to train the model with that class. Note that instances in the novel class may follow Property 1, since the novel-class neighborhood of any novel-class instance is much closer to the instance than the neighborhoods of any other classes. Observing this property in a collection of unlabeled test instances, the novel class may be detected. The illustrative embodiments may decide when to classify an instance immediately, and when to postpone the classification decision, and wait for more test instances so that Property 1 can be revealed among those instances. Because in order to discover Property 1 (cohesion) a collection of test instances may need to be dealt with simultaneously. In one example, the decision may not be deferred more than $T_c$ time units after the arrival of a test instance.

Therefore, novel class detection may address the following in some circumstances and depending on the embodiment: i) saving the training data efficiently without using much memory, ii) knowing when to classify a test instance immediately, and when to postpone the classification decision, iii) classifying the deferred, instances within $T_c$ time unit, and iv) predicting the presence of a novel class quickly and correctly.

D. Base Learners

The illustrative embodiments may be applied, on two different classifiers: decision tree, and k-nearest neighbor (k-NN). When a decision tree is used as a classifier, each training data chunk may be used to build a decision tree. When k-NN is used, each chunk may be used to build, a k-NN classification model. An example of one way to build such a model is to just store all the data points of the training chunk in memory. In order to make the model more efficient, K clusters may be built with the training data. A semi-supervised, clustering technique may be applied using Expectation Maximization (E-M) that tries to minimize both intra-cluster dispersion (e.g., same objective as unsupervised K-means) and cluster impurity. After building the clusters, the cluster summary of each cluster (centroid, and frequencies of data points belonging to each class) may be saved in a data structure called "micro-cluster", and the raw data points may be discarded. Since only K micro-clusters may be stored and used, in one embodiment, both the time and memory requirements may become functions of K (a constant number). A test instance $x_j$ may be classified, as follows: the micro-cluster whose centroid is nearest from $x_j$ may be found, and assigned a class label that has the highest frequency in that micro-cluster.

E. Creating Decision Boundary During Training

The training data may be clustered using K-means and the summary of each cluster may be saved as "pseudopoint". Then the raw training data may be discarded. These pseudopoints may form a decision boundary for the training data.

K clusters may be built per chunk from the training data. This clustering step may be specific to each base learner. For example, for k-NN, existing clusters may be used that were created using the approach discussed in the Base Learners section above. For decision tree, clustering may be done at each leaf node of the tree, since decision boundaries may be created in each leaf node separately. This may be performed as follows. Suppose S is the chunk-size. During decision tree training, when a leaf node $l_i$ is reached, $k_i=(t_i/S)*K$ clusters may be built in that leaf, where $t_i$ denotes the number of training instances belonging to leaf node $l_i$. Therefore, the number of clusters built in each leaf node may be proportional to the number of training instances that belong to the leaf node. If a leaf node is not empty (has one or more instances), then at least one cluster may be built in that node.

For each cluster, any or all of the following cluster summary information may be stored in a data structure called a pseudopoint: i) Weight, w: Total number of points in the cluster, ii) Centroid, μ. iii) Radius, $\mathcal{R}$ : Distance between the centroid and the farthest data point in the cluster, iv) Mean distance, μd: The mean distance from each point to the cluster centroid. So, w(h) may denote the "weight" value of a pseudopoint h, and so on. After computing the cluster summaries, the raw data may be discarded and only the pseudopoints may be stored in memory. Any pseudopoint having too few (less than 3) instances may be considered as noise and may also be discarded. Thus, the memory requirement for storing the training data may become constant, i.e., O(K).

In one embodiment, each pseudopoint h may correspond to a hypersphere in the feature space having center μ(h) and radius $\mathcal{R}$(h). The portion of feature space covered by a pseudopoint h may be denoted as the "region" of h or RE(h). Therefore, RE($L_i$) may denote the union of the regions of all pseudopoints h in the classifier $L_i$, i.e., RE($L_i$)=$\cup_{h \in L_i}$RE(h). RE($L_i$) may form a decision boundary for the training data of classifier $L_i$. The decision boundary for the ensemble of classifiers L may be the union of the decision boundaries of all classifiers in the ensemble, i.e., RE(L)=$\cup_{L_i \in L}$RE($L_i$). The decision boundary may play a role in novel class detection. It may define the physical boundary of existing class instances. Lemma 1, which can be used to relate the decision boundary to distinguishing the existing class instances from novel class instances, may be utilized by the illustrative embodiments:

Lemma 1: Let x be a test instance inside the decision boundary RE(L). That is, there is a pseudopoint h such that the distance from x to the center of h is less than or equal to the radius of h, i.e., D(x,μ(h))≤$\mathcal{R}$(h). Then x may be an existing class instance.

For a proof, without loss of generality, let D(a,b), in one example, be the square of Euclidean distance between a and b, i.e., $D(a,b)=(a-b)^2$. Note that $\mathcal{R}$(h) may be the distance between μ(h) and the farthest data point in the corresponding cluster H. Let the data point be x'. Therefore, $D(\mu, x')=\mathcal{R}$(h). Also, x' may be an existing class data point, since it may be a training instance that was used to form the cluster. Let $x_i \in H$ be an arbitrary data point in cluster h, and the total number of data points in H is n, i.e., w(h)=n. In order to simplify notation, μ may be used instead of μ(h) in the proof.

From the Lemma statement, it can be deduced that:

$$D(\mu, x) \le D(\mu, x') \Rightarrow (x-\mu)^2 \le (x'-\mu)^2 \Rightarrow$$
$$x^2 - 2x\mu + \mu^2 \le x'^2 - 2x'\mu + \mu^2$$
$$\Rightarrow x^2 - 2x\mu \le x'^2 - 2x'\mu \Rightarrow x^2 - 2x\frac{1}{n}\sum_{x_i \in H} x_i \le x'^2 - 2x'\frac{1}{n}\sum_{x_i \in H} x_i$$

(by definition of μ)

$$\Rightarrow x^2 - 2x\frac{1}{n}\sum_{x_i \in H} x_i + \frac{1}{n}\sum_{x_i \in H} x_i^2 \le x'^2 - 2x'\frac{1}{n}\sum_{x_i \in H} x_i + \frac{1}{n}\sum_{x_i \in H} x_i^2$$

(adding $$\frac{1}{n}\sum_{x_i \in H} x_i^2$$

on both sides)

$$\Rightarrow \frac{1}{n}\sum_{x_i \in H}(x^2 - 2xx_i + x_i^2) \le \frac{1}{n}\sum_{x_i \in H}(x'^2 - 2x'x_i + x_i^2)$$
$$\Rightarrow \frac{1}{n}\sum_{x_i \in H}(x-x_i)^2 \le \frac{1}{n}\sum_{x_i \in H}(x'-x_i)^2 \Rightarrow \overline{D}(x,H) \le \overline{D}(x',H)$$

where $\overline{D}$(x,H) may denote the mean distance from x to the instances in H. Therefore, the mean distance from x to the instances in H may be less than the mean distance from x' to the instances in H. Since x' as well as all $x_i \in H$ may be existing class instances, according to Property 1, x may also be an existing class instance. It may be deduced from the Lemma that a novel class instance may be outside the decision boundary. Any test instance outside the decision boundary may be referred to as an F-outlier.

Definition 4 (F-outlier): In one embodiment, a test instance is an F-outlier (i.e., filtered outlier) if it is outside the decision boundary of all classifiers $L_i \in L$, i.e., it is outside RE(L).

A novel class instance may be an F-outlier.

IV. Classification with Novel Class Detection

Process 2 (Classify) may be used by an illustrative embodiment as a classification and novel class detection technique. Process 2 may include two parts: classification (lines 1-5) and novel class detection (lines 6-14). Examples of the steps in this Process will be explained in the following subsections.

| Process 2 Classify(L, $x_j$, buf) | |
|---|---|
| Input: | L: Current ensemble of best M classifiers |
| | $x_j$: test instance |
| | buf: buffer holding temporarily deferred instances |
| Output: | Immediate or deferred class prediction of $x_j$ |
| 1: | fout ← true |
| 2: | If F-outlier(L, $x_j$) = false then |
| 3: |    $y_i$'majority-voting(L,$x_j$) //classify immediately |
| 4: |    fout ← false |
| 5: | end if |
| 6: | Filter(buf) |
| 7: | if fout = true then |
| 8: |    buf ⇐ $x_j$ //enqueue |
| 9: |    if buf.length > q and last_trial + q ≤ $t_j$ then |
| 10: |      last_trial ← $t_j$ |
| 11: |      novel ← DetectNovelClass(L,buf) //(Process 3, section IV-B) |
| 12: |      if novel = true then remove_novel (buf) |
| 13: |    end if |
| 14: | end if |

A. Classification

Line 2 of Process 2 first checks whether the test instance $x_j$ is an F-outlier. So, if $x_j$ is not am F-outlier, it may be classified immediately using the ensemble voting (line 3). Recall that a novel class instance may be an F-outlier. However, an F-outlier is not necessarily an existing class instance. Therefore, we may perform further analysis on the F-outliers to determine whether they really belong to a novel class.

B. Novel Class Detection

The buffer buf may temporarily hold potential novel class instances. These instances may be analyzed periodically in order to detect novel class, which is explained in the next paragraph. buf may need to be cleared periodically (line 6, Process 2) to remove instances that no longer contribute to novel class detection. Besides, instances in buf that have reached classification deadline $T_c$ may be classified immediately. An instance may be removed from buf if it fulfills any of the following three conditions. (1) Age>S: the front of buf contains the oldest element in buf. It may be removed if its age is greater than S, the chunk size. Therefore, at any moment in time, there may be at most S instances in buf. (2) Ensemble update: the ensemble may be updated while an instance $x_k$ is waiting inside buf. As a result, $x_k$ may no longer be an F-outlier for the new ensemble of models, and it may be removed if so. If $x_k$ is no longer an F-outlier, and it is not removed, it may be falsely identified as a novel class instance, and also it may interfere with other valid novel class instances, misleading the detection process. (3) Existing class: any instance may be removed from buf if it has been labeled, and it belongs to one of the existing classes. If it is not removed, it may also mislead novel class detection. When am instance is removed from buf, it may be classified immediately using the current ensemble (if not classified already).

In one example, lines 7-14 may be executed only if $x_j$ is an F-outlier. At first, $x_j$ may be enqueued into buf (line 8). Then it may be checked whether buf.length, i.e., the size of buf is at least, q, and the last check on buf for detecting novel class had been executed (i.e., last_trial) at least q time units earlier (line 9). Since, in some cases, novel class detection may be more expensive than simple classification, this operation may be performed, at most, once in every q time units. In line 11, Process 3 (DetectNovelClass) is called, which may return true if a novel class is found. Finally, if a novel class is found, all instances that are identified as novel, class may be removed from buf (line 12).

Process 3 may be examined to understand now buf is analyzed to detect presence of novel class. First, q-neighborhood silhouette coefficient, or q-NSC, may be defined as follows:

Definition 5 (q-NSC): Let $\overline{D}_{c_{out},q}(x)$ be the mean distance from an F-outlier x to $\lambda_{c_{out},q}(x)$ defined by Equation (1), where $\lambda_{c_{out},q}(x)$ is the set of q-nearest neighbors of x within the F-outlier instances. Also, let $\overline{D}_{c_{min},q}(x)$ be the minimum among all $\overline{D}_{c,q}(x)$, where c is an existing class. Then q-NSC of x may be given by:

$$q\text{-}NSC(x) = \frac{\overline{D}_{c_{min},q}(x) - \overline{D}_{c_{out},q}(x)}{\max(\overline{D}_{c_{min},q}(x), \overline{D}_{c_{out},q}(x))} \quad \text{Equation (2)}$$

q-NSC, which may be a unified measure of cohesion and separation, may yield a value between −1 and +1. A positive value may indicate that x is closer to the F-outlier instances (more cohesion) and farther away from existing class instances (more separation), and vice versa. Note that q-NSC (x) of an F-outlier x may be computed separately for each classifier $L_i \in L$. A new class may now be declared if there are at least q'(>q) F-outliers having positive q-NSC for all classifiers $L_i \in L$.

Here is one example of speeding up the computation of q-NSC. For each classifier $L_i \in L$, computing q-NSC for all F-outlier instances may take quadratic time in the number of F-outliers. Let B=buf.length. In order to compute q-NSC for one element x in buf, we may need O(B) time to compute the distances from x to all other elements in buf, and O(K) time to compute the distances from x to all existing class pseudopoints $h \in L_i$. Therefore, the total time to compute q-NSC of all elements in buf may be $O(B(B+K))=O(B^2)$, since B>>K. In order to make the computation faster, in one embodiment $K_o(=(B/S)*K)$ pseudopoints may be created from F-outliers using K-means clustering and perform the computations on the pseudopoints (referred to as Fpseudopoints), where S may be the chunk size. The time required to apply K-means clustering on B instances may be $O(K_o B)$. The time complexity to compute q-NSC of all of the Fpseudopoints may be $O(K_o*(K_o+K))$, which is constant, since both $K_o$ and K may be independent of the input size. Therefore, the overall complexity for computing q-NSC including the overhead for clustering may become $O(K_o*(K_o+K)+K_o B)=O(K_o(B+K_o+K))=O(K_o B)$, since $B>>K \geq K_o$. So, the running time to compute q-NSC after speedup may be linear in B compared to quadratic in B before speedup. q-NSC of an Fpseudopoint computed in this way may actually be an approximate average of the q-NSC of each F-outlier in that Fpseudopoint. The approximate q-NSC of an Fpseudopoint h may be denoted as q-NSC'(h).

In line 1 of Process 3 below, Fpseudopoints may be created using the F-outliers as explained earlier. For each classifier $L_i \in L$, q-NSC'(h) of every Fpseudopoint h (line 4) may be computed. If the total weight of the Fpseudopoints having positive q-NSC'( ) is greater than q, then $L_i$ may vote for novel class (line 7). If all classifiers vote for a novel class, then a novel class may have really appeared (line 9). Once novel class is declared, the instances of the novel class may be found. This may be performed as follows: suppose h is an Fpseudopoint having positive q-NSC'(h) with respect, to all classifiers $L_i \in L$ (note that q-NSC'(h) may be computed with respect to each classifier separately). Therefore, all F-outlier instances belonging to h may be identified as novel class instances.

| Process 3 Detectnovelclass(L,buf) |
| --- |
| Input:    L: Current ensemble of best M classifiers<br>          buf: buffer holding temporarily deferred instances<br>Output: true, if novel class is found; false, otherwise<br>1:      Make $K_o$=(K*buf.length/S) clusters with the instances<br>       in buf using K-means clustering, and create $K_o$<br>       Fpseudopoints<br>2:      Let $H_o$ be the set of Fpseudopoints<br>3:      for each classifier $L_i \in L$ do<br>4:          for each $h \in H_o$ do Compute q-NSC' (h)<br>5:          $H_p \leftarrow \{h|h \in H_o$ and q-NSC' (h) > 0$\}$//Fpseudopoints<br>            with positive q-NSC' ( )<br>6:          $(H_p) \leftarrow \Sigma_{h \in H_p} w(h)$. //w(h) is the weight of h<br>            i.e., # of instances in the Fpseudopoint h.<br>7:          if w($H_p$) > q then NewClassVote++<br>8:      end for<br>9:      if NewClassVote = M then return true else return<br>         false |

Process 3 may be used, to detect one or more novel classes concurrently when each novel class follows Property 1 and contains at least q instances. This may be true even if the class distributions are skewed. However, if more than one such novel class appears concurrently, Process 3 may identify the instances belonging to those classes as novel, without imposing any distinction between dissimilar novel class instances (i.e., it may treat them simply as "novel"). But the distinction may be learned by the model as soon as the true labels of those novel class instances arrive, and a classifier is trained with those instances.

In one example, the larger the value of q, the greater the confidence with which we may decide whether a novel class has arrived. However, if q is too large, then a new class may fail to be detected if the total number of instances belonging to the novel class is ≤q. In one embodiment, an optimal value of q may be obtained empirically, as exemplified in below.

Figure 6A:
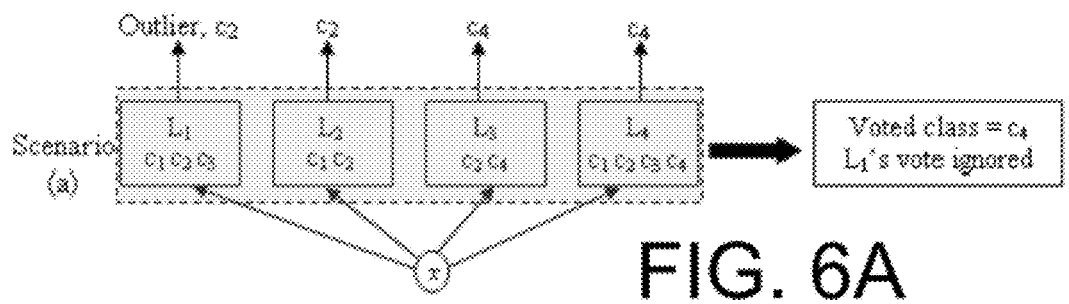
FIG. 6A depicts an example of the impact of evolving class labels on an ensemble in accordance with an illustrative embodiment.
Figure 6B:
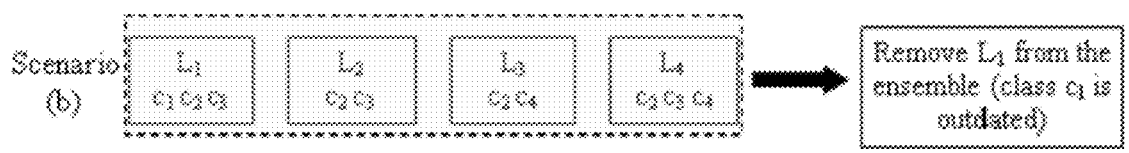
FIG. 6B depicts another example of the impact of evolving class labels on an ensemble in accordance with an illustrative embodiment.

One possible impact of evolving class labels on ensemble classification is that the arrival of novel classes in the stream may cause the classifiers in the ensemble to have different sets of class labels. There may be two scenarios to consider. Scenario (1): suppose am older (earlier) classifier $L_i$ in the ensemble has been trained with classes $c_0$ and $c_1$, and a younger (later) classifier $L_j$ has been trained with classes $c_1$ and $c_2$, where $c_2$ is a new class that appeared after $L_i$ had been trained. In one example, this may put a negative effect on a voting decision, since the $L_i$ may misclassify instances of $c_2$. So, rather than counting the votes from each classifier, their votes may be selectively counted as follows. If a younger classifier $L_j$ classifies a test instance x as class c, but an older classifier $L_i$ had not been trained with training data of c, then the vote for $L_i$ may be ignored if x is found to be an outlier for $L_i$. Scenario (2): the opposite situation may also arise where the oldest classifier is trained with some class c', but none of the newer classifiers are trained with that class. This means class c' may have been outdated, and in that case, $L_i$ may be removed from the ensemble. FIG. 6A is an example illustration of scenario (1), and shows an example of the impact of evolving class labels on ensemble. The classifier (s) in the ensemble may be sorted according to their age, with $L_1$ being the oldest, and $L_4$ being the youngest. Each classifier $L_i$ may be marked, with the classes with which, it has been trained. For example, $L_1$ may have been trained with classes $c_1$, $c_2$, and $c_3$, and so on. Note that class $c_4$ may appear only in the two youngest classifiers. x may appear as an outlier to $L_1$. Therefore, $L_1$'s vote may not be counted, since x is classified, as $c_4$ by a younger classifier $L_3$, and $L_1$ does not contain class $c_4$. FIG. 6B is an example illustration of scenario (2). Here $L_1$ may contain class $c_l$, which is not contained by any younger classifiers in the ensemble. Therefore, $c_l$ may have become outdated, and $L_1$ may be removed from the ensemble. In this way, it may be ensured that older classifiers have less impact in the voting process. If class $C_l$ later re-appears in the stream, it may be automatically detected, again as a novel, class (see Definition 3).

The classification techniques in the illustrative embodiments may perform better than existing techniques for several reasons. For instance, uniform voting may be preferred to weighted ensemble voting. Also, by removing classifiers that contain outdated class labels, if the outdated class re-appears, a new classification model will be included in the ensemble. This may make the ensemble more up-to-date with the current trend, of that class, since the class characteristics might have been modified due to concept-drift. Note that a new model may be trained in each batch anyway, (i.e., whether a novel class appears or not), therefore, there may not be an increase in run-time overhead due to the illustrative updating approach.

C. Analysis and Discussion

Here is one example justification of the novel class detection Process. In Process 3, a novel class may be declared if there are at least q'(>q) F-outliers that nave positive q-NSC for all the classifiers in the ensemble. First, this condition is illustrated, i.e., "more than q F-outliers have positive q-NSC".

Equation (2) may be considered to deal with the mean distance between an F-outlier and its nearest neighborhood. An example of the mean distances between any pair of F-outliers is now examined.

In one example, let $\Rightarrow$ be the set of F-outliers having positive q-NSC. Therefore, for any $x \in \Rightarrow$, the following may apply:

$$\overline{D}_{c_{min},q}(x) - \overline{D}_{c_{out},q}(x) > 0 \Rightarrow \overline{D}_{c_{min},q}(x) > \overline{D}_{c_{out},q}(x) \quad \text{(from Equation 2)}$$

Summing up for all F-outliers $x \in \Rightarrow$, the following may apply:

$$\sum_{x \in \mathcal{F}} \overline{D}_{c_{min},q}(x) > \sum_{x \in \mathcal{F}} \overline{D}_{c_{out},q}(x) \quad \text{Equation (3)}$$

$$\Rightarrow \sum_{x \in \mathcal{F}} \frac{1}{q} \sum_{x_i \in \lambda_{c_{min},q}(x)} D(x, x_i) >$$

$$\sum_{x \in \mathcal{F}} \frac{1}{q} \sum_{x_j \in \lambda_{c_{out},q}(x)} D(x, x_j)$$

(from Equation 1)

$$\Rightarrow \frac{1}{m}\frac{1}{q} \sum_{x \in \mathcal{F}} \sum_{x_i \in \lambda_{c_{min},q}(x)} D(x, x_i) >$$

$$\frac{1}{m}\frac{1}{q} \sum_{x \in \mathcal{F}} \sum_{x_j \in \lambda_{c_{out},q}(x)} D(x, x_j)$$

(letting $m = |\mathcal{F}|$)

Therefore; the mean pairwise distance between any pair (x, $x_j$) of F-outliers, (such that x is an F-outlier with positive q-NSC and $x_j$ is a F-outlier in $\lambda_{c_{out},q}(x)$, may be less than the mean pairwise distance between an F-outlier x and any existing class instance $x_i$. In other words, an F-outlier with positive q-NSC may be more likely to have its k-nearest neighbors (k-NN) within the F-outlier instances (for k≤q). So, each of the F-outliers $x \in \Rightarrow$ may have the same class label as the other F-outlier instances, and may have a different class label than any of the existing classes. This implies that the F-outliers may belong to a novel class. The higher the value of q, the larger the support in favor of the arrival of a new class. Furthermore, when all the classifiers unanimously agree on the arrival of a novel class, in some circumstances, there may be very little choice other than announcing the appearance of a novel class. In one example, the q-NR rule may be thought of a variation of the k-NN rule, and may be applicable to any dataset irrespective of its data distribution, and shape of classes (e.g. convex and non-convex).

Here is an example deviation between approximate and exact q-NSC computation. As discussed, earlier, q-NSC may be computed for each Fpseudopoint, rather than each F-outlier individually in order to reduce time complexity. In one embodiment, the resultant q-NSC may be an approximation of the exact, value. However, the following analysis snows that the deviation of the approximate value from exact value may be negligible.

Figure 7:
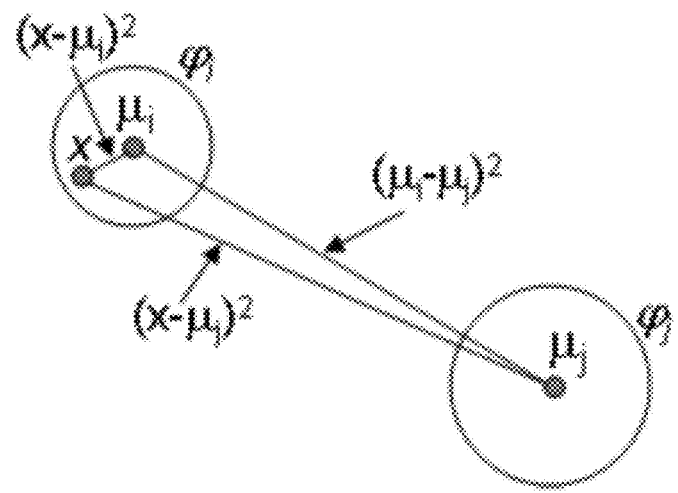
FIG. 7 depicts an example of the deviation between approximate and exact q-NSC computations in accordance with an illustrative embodiment.

Without loss of generality, in one example, let $\phi_i$ be an Fpseudopoint having weight $q_1$, and $\phi_j$ be an existing class pseudopoint having weight $q_2$, which is the closest existing class pseudopoint from $\phi_i$ (FIG. 7). FIG. 7 illustrates an example of the computation of deviation. In FIG. 7, $\phi_i$ may be an Fpseudopoint, i.e., a cluster of F-outliers, and $\phi_j$ may be an existing class pseudopoint, i.e., a cluster of existing class instances. In the non-limiting example of FIG. 7, all instances in $\phi_i$ may belong to a novel class. q-NSC' ($\phi_i$), the approximate q-NSC of $\phi_1$, may be computed using the following formula:

$$q\text{-}NSC'(\phi_i) = \frac{D(\mu_i, \mu_j) - \overline{D}_i}{\max(D(\mu_i, \mu_j), \overline{D}_i)} \quad \text{Equation (4)}$$

Where $\mu_i$ is the centroid of $\phi_i$, $\mu_j$ is the centroid of $\phi_j$, and $\overline{D}_i$ is the mean distance from centroid $\mu_i$ to the instances in $\phi_i$. In one example, the exact value of q-NSC may result from Equation (2):

$$q\text{-}NSC(\phi_i) = \quad \text{Equation (5)}$$

$$\frac{\frac{1}{q_1}\sum_{x \in \phi_i} \frac{1}{q}\sum_{x_j \in \lambda_{c_{min},q}(x)} D(x, x_j) - \frac{1}{q}\sum_{x_i \in \lambda_{c_{out},q}(x)} D(x, x_i)}{\max\left(\frac{1}{q}\sum_{x_j \in \lambda_{c_{min},q}(x)} D(x, x_j), \frac{1}{q}\sum_{x_i \in \lambda_{c_{out},q}(x)} D(x, x_i)\right)}$$

Where $\lambda_{c_{out},q}(x)$ is the set of q nearest neighbors of x within Fpseudopoint $\phi_i$, and $\lambda_{c_{min},q}(x)$ is the set of q nearest neighbors of x within pseudopoint $\phi_j$, for some $x \in \phi_i$. Therefore, the deviation from the exact, value, e.g., $\epsilon_{qnsc}$=q-NSC($\phi_i$)–q-NSC'($\phi_i$). Applying Equations (4) and (5) results in:

$$\epsilon_{qnsc} = \frac{\frac{1}{q_1}\sum_{x \in \phi_i} \frac{1}{q}\sum_{x_j \in \lambda_{c_{min},q}(x)} D(x, x_j) - \frac{1}{q}\sum_{x_i \in \lambda_{c_{out},q}(x)} D(x, x_i)}{\max\left(\frac{1}{q}\sum_{x_j \in \lambda_{c_{min},q}(x)} D(x, x_j), \frac{1}{q}\sum_{x_i \in \lambda_{c_{out},q}(x)} D(x, x_i)\right)} - \frac{D(\mu_i, \mu_j) - \overline{D}_j}{\max(D(\mu_i, \mu_j), \overline{D}_i)} \quad \text{Equation (6)}$$

In order to simplify the equations, it may be assumed that $q_1 = q_2 = q$, and q-NSC is positive for any $x \in \phi_i$. Therefore, e.g., $\lambda_{c_{out},q}(x) = \phi_i$, $\lambda_{c_{min},q}(x) = \phi_j$. Also, consider the square of Euclidean distance as the distance metric, i.e., $D(x,y) = (x-y)^2$. Since q-NSC may be positive for any $x \in \phi_i$, in one example, the following relationships may be deduced:

$R_1: \max(D(\mu_i, \mu_j), \overline{D}_i) = D(\mu_i, \mu_j)$ as the q-NSC for each $x \in \phi_i$ may be positive, the overall q-NSC of $\phi_i$ (i.e., q-NSC'($\phi_i$)) may also be positive. Therefore, this relationship may follow from Equation (4):

$$R_2: \max\left(\frac{1}{q}\sum_{x_j \in \lambda_{c_{min},q}(x)} D(x, x_j), \frac{1}{q}\sum_{x_i \in \lambda_{c_{out},q}(x)} D(x, x_i)\right) =$$

$$\frac{1}{q}\sum_{x_j \in \lambda_{c_{min},q}(x)} D(x, x_j)$$

which follows, since the mean q-NSC of the instances in $\phi_i$ may be positive. Also, $$\overline{D}_i = \frac{1}{q}\sum_{x \in \phi_i} (x - \mu_i)^2 = \sigma_i^2,$$

the mean distance of the instances in $\phi_i$ from the centroid. Therefore, q-NSC'($\phi_i$) may be re-written as:

$$q\text{-}NSC'(\phi_i) = \frac{(\mu_i - \mu_j)^2 - \sigma^2}{(\mu_i - \mu_j)^2}$$

$$= \frac{1}{q}\sum_{x \in \phi_i} \frac{(\mu_i - \mu_j)^2 - (x - \mu_i)^2}{(\mu_i - \mu_j)^2}$$

$$= \frac{1}{q}\sum_{x \in \phi_i} q\text{-}NSC'(x)$$

where q-NSC'(x) is an approximate value of q-NSC(x). Now the following inequalities may be deduced:

$I_1$: $(x-\mu_i)^2 \leq (\mu_i-\mu_j)^2$—since q-NSC'(x)>0 for all $x \in \phi_i$.
$I_2$: $\sigma_i^2 \leq (\mu_i-\mu_j)^2$—from Equation (7), since q-NSC'($\phi_i$)>0.
$I_3$: $(x-\mu_j)^2 \leq (x-\mu_i)^2 + (\mu_i-\mu_j)^2$—by triangle inequality (see FIG. 7)
$I_4$: $\sigma_j^2 \leq (\mu_i-\mu_j)^2$—because $\phi_j$ represents an existing class, and similar inequality as $I_2$ is applicable to the instances of $\phi_j$.

Continuing from Equation (6):

$$\epsilon_{qnsc} = \frac{1}{q}\sum_{x \in \phi_i} \frac{\frac{1}{q}\sum_{x_j \in \phi_j}(x-x_j)^2 - \frac{1}{q}\sum_{x_j \in \phi_i}(x-x_i)^2}{\frac{1}{q}\sum_{x_j \in \phi_j}(x-x_j)^2} - \frac{(\mu_i - \mu_j)^2 - \sigma_i^2}{(\mu_i - \mu_j)^2}$$

$$= \frac{1}{q}\sum_{x \in \phi_i} \left(\frac{1}{q}\sum_{x_j \in \phi_j}(x-x_j)^2 - \frac{1}{q}\sum_{x_j \in \phi_i}(x-x_i)^2 - \frac{(\mu_i - \mu_j)^2 - (x - \mu_i)^2}{(\mu_i - \mu_i)^2}\right)$$

It may be shown that $$\frac{1}{q}\sum_{x \in \phi_i}(x - x_i)^2 - (x - \mu_i)^2 = \sigma_i^2$$

and

-continued $$\frac{1}{q}\sum_{x\in\phi_j}(x-x_j)^2 - (x-\mu_j)^2 = \sigma_j^2.$$

Substituting these values, we may obtain:

$$\varepsilon_{qnsc} = \frac{1}{q}\sum_{x\in\phi_i}\left(\frac{\sigma_j^2+(x-\mu_j)^2-\sigma_i^2-(x-\mu_i)^2}{\sigma_j^2+(x-\mu_j)^2} - \frac{(\mu_i-\mu_j)^2-(x-\mu_i)^2}{(\mu_i-\mu_j)^2}\right)$$

$$= \frac{1}{q}\sum_{x\in\phi_i}\left(1 - \frac{\sigma_i^2+(x-\mu_i)^2}{\sigma_j^2+(x-\mu_j)^2} - 1 + \frac{(x-\mu_i)^2}{(\mu_i-\mu_j)^2}\right)$$

$$= \frac{1}{q}\sum_{x\in\phi_i}\left(\frac{(x-\mu_i)^2}{(\mu_i-\mu_j)^2} - \frac{\sigma_i^2+(x-\mu_i)^2}{\sigma_j^2+(x-\mu_j)^2}\right)$$

$$= \frac{\sigma_i^2}{(\mu_i-\mu_j)^2} - \frac{1}{q}\sum_{x\in\phi_i}\left(\frac{\sigma_i^2}{\sigma_j^2+(x-\mu_j)^2}\right) - \frac{1}{q}\sum_{x\in\phi_i}\frac{(x-\mu_i)^2}{\sigma_j^2+(x-\mu_j)^2}$$

$$\leq \frac{\sigma_i^2}{(\mu_i-\mu_j)^2} - \frac{\sigma_i^2}{\sigma_i^2+\sigma_j^2+(\mu_i-\mu_j)^2} - \frac{1}{q}\sum_{x\in\phi_i}\frac{(x-\mu_i)^2}{\sigma_j^2+(x-\mu_j)^2}$$

The last line may follow since using the relationship between harmonic mean and arithmetic mean it may be shown that:

$$\frac{1}{q}\sum_{x\in\phi_i}\frac{\sigma_i^2}{\sigma_j^2+(x-\mu_j)^2} \geq \frac{\sigma_i^2}{\frac{1}{q}\sum_{x\in\phi_i}(\sigma_j^2+(x-\mu_j)^2)}$$

$$= \frac{\sigma_i^2}{\sigma_j^2+\frac{1}{q}\sum_{x\in\phi_i}(x-\mu_j)^2}$$

$$= \frac{\sigma_i^2}{\sigma_j^2+\sigma_i^2+(\mu_i-\mu_j)^2}$$

Applying inequalities $I_1$-$I_4$, and after several algebraic manipulations, we may obtain:

$$\varepsilon_{qnsc} \leq \frac{\sigma_i^2}{(\mu_i-\mu_j)^2} - \frac{\sigma_i^2}{3(\mu_i-\mu_j)^2} - \frac{\sigma_i^2}{3(\mu_i-\mu_j)^2} \quad \text{Equation (8)}$$

$$= \frac{\sigma_i^2}{3(\mu_i-\mu_j)^2}$$

If $\phi_i$ belongs to a novel class, it may be empirically observed that q-NSC'$(\phi_i) \geq 0.9$. Putting this value in Equation (7), and solving, we may obtain of $\sigma_i^2 \leq (1-0.9)(\mu_i-\mu_j)^2$. Therefore, from Equation (8), we may obtain $\varepsilon_{qnsc} \leq 0.1/3 \approx 0.03$. Since the range of q-NSC may be −1 to +1, an example deviation of 0.03 (3%) from the exact value may be considered negligible, and may not affect the outcome of the process. Similar reasoning may be carried out for the cases where q-NSC of the instances in $\phi_i$ is negative.

With regard to time and space complexity, line 1 of Process 3 (clustering) may take O(KS) time, and the for loop (lines 3-8) may take O(K²M) time. The overall time complexity of Process 3 may be O(K²M+KS)=O(KS), since S>>KM. Lines 1-5 of Process 2 may take O(S(KM+Mf$_c$)) per chunk, where f$_c$ may be the time to classify an instance using a classifier, and O(KM) may be the time to determine whether an instance is a F-outlier. Line 6 may take O(S) time. In one example, line 11 (Process 3) may be executed at most once in every q time units. Therefore, the worst case complexity of lines 7-14 may be O((KS)*(S/q)), where O(KS) is the time required to execute line 11 (Process 3). So, the overall complexity of Process 2 may be O(S(KM+Mf$_c$+KS$_q^{-1}$)) per chunk. For most classifiers, f$_c$=O(1). Also, in one example, let S/q=m. So, the overall complexity of Process 2 may become O(KMS+MS+mS)=O(mS), since m>>KM. Finally, the overall complexity of Process 1 (ECSMiner) may be O(mS+f$_t$(S)) per chunk, where f$_t$(S) is the time to train a classifier with S training instances, and m<<S.

In one embodiment, ECSMiner may keep three buffers: buf, the training buffer $\mathcal{L}$, and the unlabeled data buffer U. In one example, both buf and $\mathcal{L}$ may hold at most S instances, whereas U holds at most $T_1$ instances. Therefore, in the example, the space required to store all three buffers may be: O(max (S, $T_1$)). The space required to store a classifier (along with the pseudopoint s) may be much less than S. Thus, the overall space complexity may remain O(max(S, $T_1$)).

V. Experiments

To further illustrate the embodiments described herein, a number of non-limiting experimental examples are provided using synthetic and real datasets. Such experiments are by way of illustration only, and do not limit the many various implementations of the illustrative embodiments.

A. Data Sets

Synthetic data with only concept-drift (SynC): SynC may be used to simulate only concept-drift, with no novel classes. This may be done to show that concept-drift does not erroneously trigger a new class detection in our approach. SynC data may be generated with, a moving hyperplane. The equation of a hyperplane may be as follows: $\Sigma_{i=1}^{d}a_ix_i=a_0$. If $\Sigma_{i=1}^{d}a_ix_i=a_0$, then an example is negative; otherwise it is positive. Each example may be a randomly generated d-dimensional vector $\{x_1, \ldots, x_d\}$, where $x_i \in [0,1]$. Weights $\{a_1, \ldots, a_d\}$ may also be randomly initialized with a real number in the range [0,1]. The value of $a_0$ may be adjusted so that roughly the same number of positive and negative examples is generated. This can be done by choosing $$a_0 = \frac{1}{2}\sum_{i=1}^{d}a_i.$$

We may also introduce noise randomly by switching the labels of p % of the examples, where p=5 may be set in our experiments. There may be several parameters that simulate concept drift. Parameter m may specify the percent of total dimensions whose weights are involved in changing, and it may be set to 20%. Parameter t may specify the magnitude of the change in every N examples. In our experiments, t may be set to 0.1, and N may be set to 1000. $s_i$, $i \in \{1, \ldots, d\}$ may specify the direction of change for each weight. Weights may change continuously, i.e., $a_i$ is adjusted by $s_i.t/N$ after each example is generated. There may be a possibility of 10% that the change would reverse direction after every N examples are generated. A total of 250,000 records may be generated.

Synthetic Data With Concept-Drift And Novel-Class (SynCN): This synthetic data may simulate both concept-drift and novel-class. Data points belonging to each class may be generated using Gaussian distribution having different means (−5.0 to +5.0) and variances (0.5 to 6) for different classes. Besides, in order to simulate the evolving nature of data streams, the probability distributions of different classes may be varied with time. This may cause some classes to appear and some other classes to disappear at different times. In order to introduce concept-drift, the mean values of a certain percentage of attributes may have been shifted at a constant rate. As may be done in the SynC dataset, this rate of change may also be controlled by the parameters m, t, s, and N in a similar way. The dataset may be normalized so that all attribute values fall within the range [0,1]. The SynCN dataset may be generated with 20 classes, 40 real valued attributes, having a total of 400K data points.

Real data—KDDCup 99 network intrusion detection: The 10% version of the dataset may be used, which is more concentrated, hence may be more challenging than the full version. It may contain around 490,000 instances. Here different classes may appear and disappear frequently, making the new class detection challenging in some cases. This dataset may contain TCP connection records extracted from LAN network traffic at MIT Lincoln Labs over a period of two weeks. Each record may refer to either to a normal connection or an attack. In one example, there may be 22 types of attacks, such as buffer-overflow, portsweep, guess-passwd, neptune, rootkit, smurf, spy, etc. Thus, there may be 23 different classes of data. In one example, most of the data points belong to the normal class. Each record may consist of 42 attributes, such as connection duration, the number bytes transmitted, number of root accesses, etc. One may use only the 34 continuous attributes, and remove the categorical attributes. This dataset may also be normalized to keep the attribute values within [0,1].

Real data—Forest cover (UCT repository): This dataset may contain geospatial descriptions of different types of forests. It may contain 7 classes, 54 attributes and around 581,000 instances. The dataset may be normalized, and the data may be arranged so that in any chunk at most 3 and at least 2 classes co-occur, and new classes may appear randomly.

B. Example Experimental Setup

The processes described herein may be implemented using any programming language; in these illustrative experiments, Java is used to implement the processes. The code for decision tree may be adapted from the Weka machine learning open source repository. While the processes described herein may be executed on any processor, such as the processor unit 105 in FIG. 23 below, these illustrative experiments were run on an Intel P-IV machine with 2 GB memory and 3 GHz dual processor CPU. For these illustrative experiments, our parameter settings may be as follows, unless mentioned otherwise: i) K (number of pseudopoints per classifier)=50, ii) q (minimum number of instances required to declare novel class)=50, iii) M (ensemble size)=6, iv) S (chunk size)=2,000. These values of parameters may be tuned to achieve an overall satisfactory or improved performance.

C. Baseline Method

Previous systems and methods may fail to effectively classify data streams and detect novel classes. Consequently, MineClass, or any of the illustrative embodiments, may be compared with a combination of two baseline techniques: OLINDDA, and Weighted Classifier Ensemble (WCE), where the former may work as a novel class detector and the latter may perform classification. This may be performed as follows. For each test instance, the classification may be delayed for $T_c$ time units. That is, QLINDDA may be given $T_c$ time units to determine whether the instance is novel. If by that time the test instance is identified as a novel class instance, then it may be considered novel and not classified using WCE. Otherwise, the instance may be assumed to be an existing class instance, and its class may be predicted using WCE.

However, OLINDDA assumes that there is only one "normal" class, and all other classes are "novel". Thus, it is not directly applicable to the multi-class novelty detection problem, where any combination of classes can be considered as the "existing" classes. Therefore, two alternative solutions may be proposed. First, parallel QLINDDA models may be built, one for each class, which evolve simultaneously. Whenever the instances of a novel class appear, a new OLINDDA model may be created for that class. A test instance may be declared as novel, if all the existing class models identify this instance as novel. This baseline method may be referred to as WCE-OLINDDA_PARALLEL. Second, an OLINDDA model may be initially built using all the available classes with the first init number instances. Whenever a novel class is found, the class may be absorbed into the existing OLINDDA model. Thus, only one "normal" model may be maintained throughout the stream. This may be referred, to as WCE-OLINDDA_SINGLE. In all experiments, the ensemble size and chunk-size may be kept the same for all three baseline techniques. Besides, the same base learner may be used for WCE and ECSMiner. The parameter settings for OLINDDA may be: i) number of clusters built, in the initial model, K=30, ii) least number of normal instances needed to update the existing model=100, iii) least number of instances needed to build the initial model=100, iv) maximum size of the "unknown memory"=200. The following acronyms will henceforth be used: XM for ECSMiner, W-OP for WCE-OLINDDA_PARALLEL and W-OS for WCE-OLINDDA_SINGLE.

D. Performance Study

Evaluation Approach

In one experimental example, let $F_n$=total novel class instances misclassified as an existing class, $F_p$=total existing class instances misclassified as a novel class, $F_e$=total existing class instances misclassified (other than $F_p$), $N_c$=total novel class instances in the stream, N =total instances in the stream. The following performance metrics may be used to evaluate this technique: $M_{new}$=% of novel class instances Misclassified as existing class $$= \frac{F_n * 100}{N_C},$$

$F_{new}$=% of existing class instances Falsely identified as novel class $$= \frac{F_p * 100}{N - N_C},$$

ERR=Total misclassification error (%) (including $M_{new}$ and $F_{new}$)

$$= \frac{(F_p + F_n + F_e) * 100}{N}.$$

From the definition of the error metrics, ERR may not necessarily be equal to the sum of $M_{new}$ and $F_{new}$.

Evaluation may be performed as follows: initial models may be built in each method with the first init_number instances. In the illustrative experiments, we may set init_number=3S (first three chunks). From the $4^{th}$ chunk onward, the performances of each method may be evaluated on each data, point using the time constraints. The models may be updated with a new chunk whenever all data points in that chunk are labeled.

Results

Figure 8A:
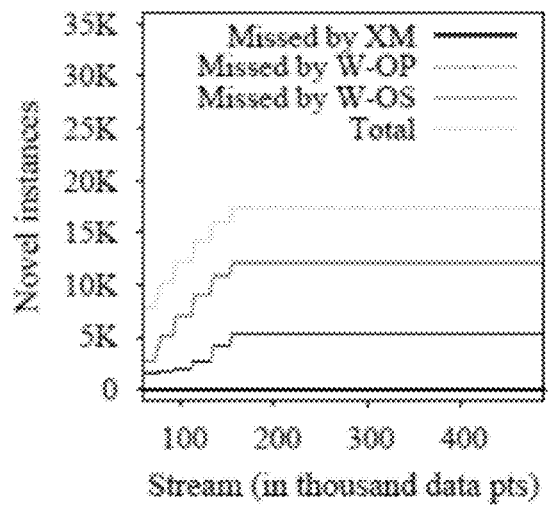
FIGS. 8A-8C depict an example total number of novel class instances missed (i.e., misclassified as existing class) for ECSMiner, WCE-OLINDDA_PARALLEL, and WCE-QLINDDA_SINGLE in accordance with an illustrative embodiment.
Figure 8B:
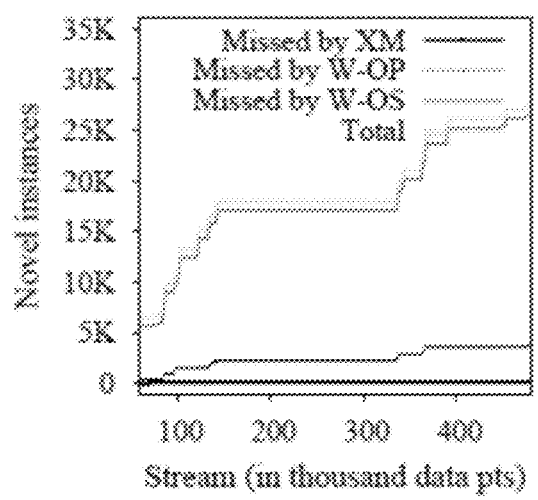
Figure 8C:
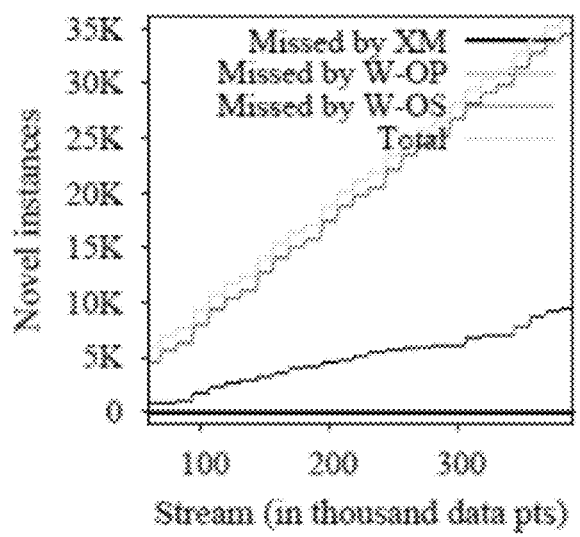
Figure 8D:
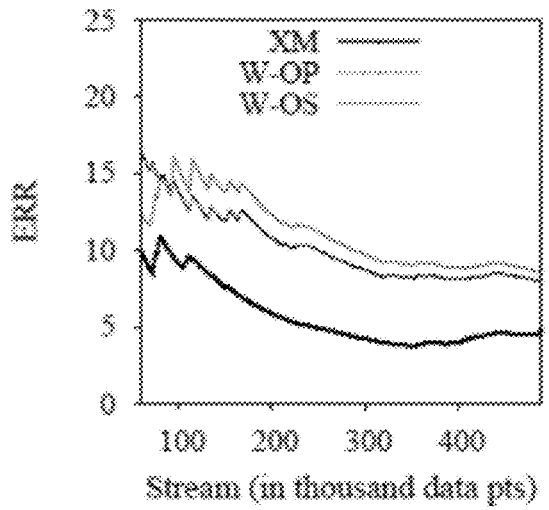
FIG. 8D-8F depicts example overall error rates (ERR) of ECSMiner, WCE-OLINDDA_PARALLEL, and WCE-OLINDDA_SINGLE up to a certain, point in the stream in different datasets in accordance with an illustrative embodiment.
Figure 8E:
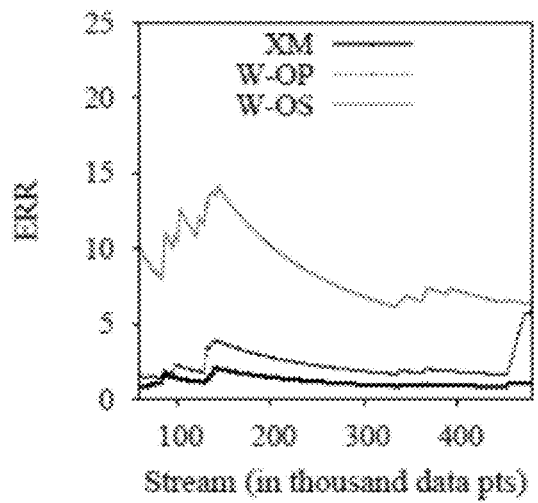
Figure 8F:
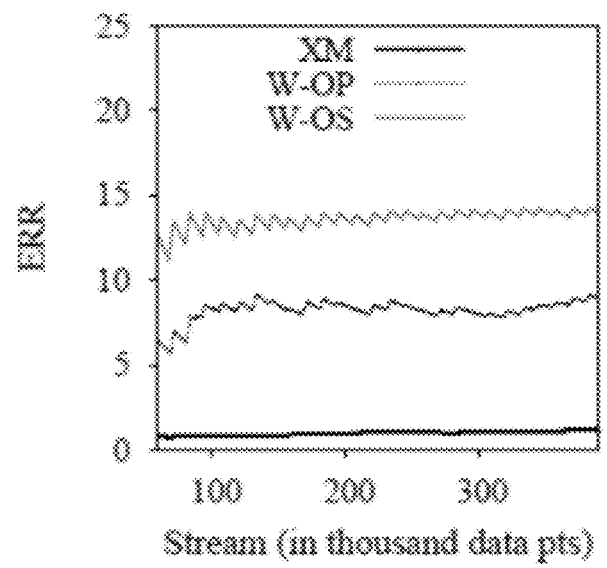

The example of FIGS. 8A-8C shows the total number of novel class instances missed (i.e., misclassified as existing class) and the example of FIGS. 8D-8F shows the overall error rates (ERR) of each of the techniques for decision tree classifier up to a certain point in the stream in different datasets. SynC may be omitted from the Figures since it does not have any novel class. k-NN classifier may also have similar results. For example, in FIG. 8A at X axis=100, the Y values show the total, number of novel class instances missed by each approach in the first 100K data points in the stream (Forest Cover). At this point, XM misses only 15 novel class instances, whereas W-OP, and W-OS misses 1,937, and 7,053 instances, respectively. The total number of novel class instances appeared in the stream by this point of time is shown by the corresponding Y value of the curve "Total", which is 12,226. Likewise, in FIG. 8D, the ERR rates are shown throughout the stream history. In this Figure, at the same position (X=100), Y values show the ERR of each of the three techniques up to the first 100K data points in the stream. The ERR rates of XM, W-OP, and W-OS at this point are: 9.2%, 14.0%, and 15.5%, respectively.

Table II, shown in FIG. 9, shows an example summary of the error metrics for each of the techniques in each dataset for decision tree and KNN. The columns headed by ERR, $M_{new}$ and $F_{new}$ report the value of the corresponding metric on an entire dataset. For example, while using decision tree in KDD dataset, XM, W-OP, and W-OS have 1.0%, 5.8%, and 6.7% ERR, respectively. Also, their corresponding $M_{new}$ are 1.0%, 13.2% and 96.9%, respectively. Note that there is no novel class in SynC, and so, there is no $M_{new}$ for any approach. In general, XM, one of the illustrative embodiments, outperforms the baseline techniques in overall classification and novel class detection.

The examples of FIGS. 10A and 10B illustrate how XM and W-OP respond to the constraints $T_l$ and $T_c$ in Forest Cover dataset. In particular, FIGS. 10A and 10B show $M_{new}$ and overall error (ERR) rates on a Forest Cover dataset for (a) $T_c$=400 and different values of $T_l$, and (b) $T_l$=2000 and different values of Tc. Similar characteristics may be observed for other datasets and W-OS. From FIG. 10A it may be seen that increasing $T_l$ increases error rates. This may be because of the higher delay involved in labeling, which makes the newly trained models more outdated. $M_{new}$ rate may decrease with increasing $T_c$ as shown in FIG. 10B because higher values of $T_c$ means more time to detect novel classes. As a result, ERR rates may also decrease.

Figure 11A:
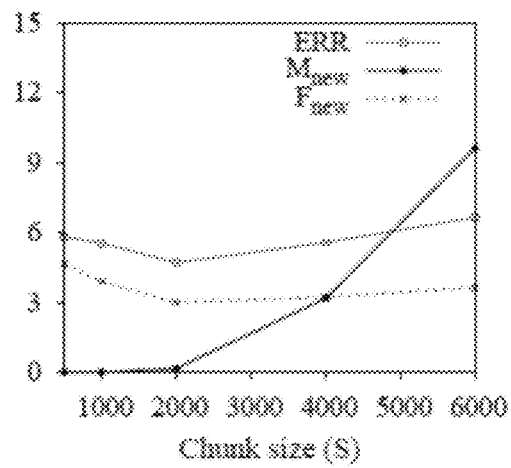
FIGS. 11A-11D depict how error rates of ECSMiner may change for different parameter settings on Forest cover dataset and decision tree classifier in accordance with an illustrative embodiment.

In one example, FIGS. 11A-11D illustrate how the error rates of XM may change for different parameter settings on Forest cover dataset and decision tree classifier. These parameters may have similar effects on other datasets, and k-NN classifier. FIG. 11A shows the effect of chunk size on ERR, $F_{new}$, and $M_{new}$ rates for default values of other parameters. It may be noted that ERR and $F_{new}$ rates may decrease up to a certain point (2,000) then increase. The initial decrement may occur because larger chunk size means more training data for the classifiers, which leads to lower error rates. However, if chunk size is increased too much, then we may have to wait much longer to build the next classifier. As a result, the ensemble may be updated less frequently than desired, meaning, the ensemble remains outdated for longer period of time. This may cause increased error rates.

Figure 11B:
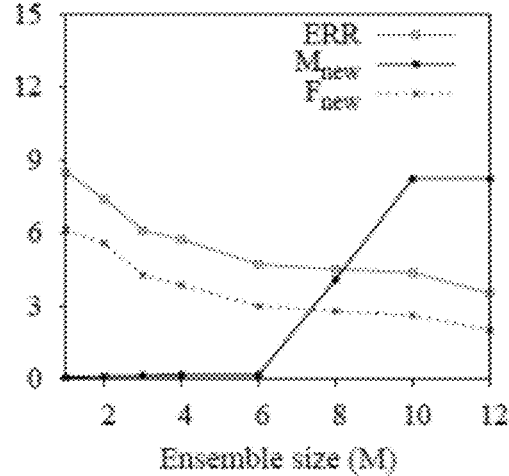
Figure 11C:
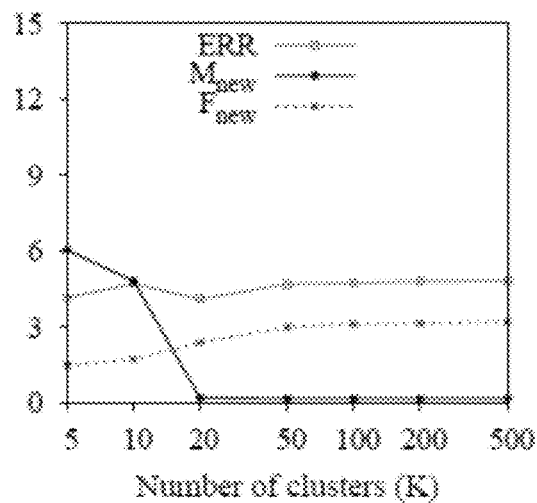
Figure 11D:
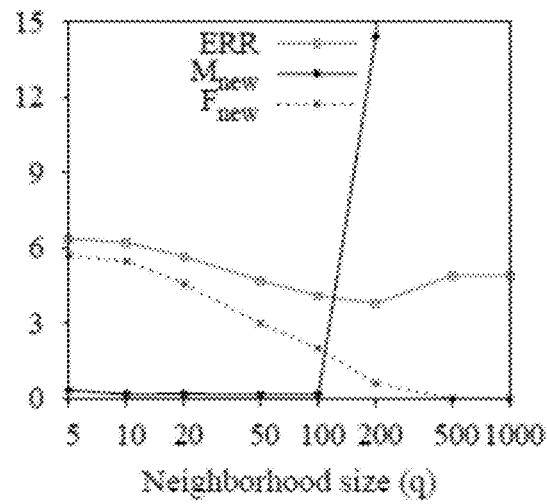

FIG. 11B shows an example effect, of ensemble size (M) on error rates. The ERR and $F_{new}$ rates may keep decreasing with increasing M. This may be because when M is increased, classification error naturally decreases because of the reduction of error variance. But the rate of decrement may be diminished gradually. However, $M_{new}$ rate may start increasing after some point (M=6), because a larger ensemble means more restriction on declaration of the arrival of novel classes. Therefore, a value may be chosen where the overall error (ERR) is considerably low and also $M_{new}$ is low. FIG. 11C shows an example effect of number of clusters (K) on error. The x-axis in this chart is drawn on a logarithmic scale. Although the overall error may not be much sensitive on K, $M_{new}$ rate may be. Increasing K may reduce $M_{new}$ rate, because outliers are more correctly detected. FIG. 11D shows an example effect of q (Minimum neighborhood size to declare a novel class) on error rates. The x-axis in this chart is also drawn on a logarithmic scale. Increasing q up to a certain point (e.g. 200) may help reduce $F_{new}$ and ERR, since a higher value of q may give us a greater confidence (i.e., reduces possibility of false detection) in declaring a new class (see section IV). But a too large value of q may increase $M_{new}$ and ERR rates (which is observed in the chart), since a novel class may be missed if there are less than q instances of the novel class in a window of S instances. In one embodiment, any value between 20 to 100 may be used for q, although other values may be used in other embodiments.

Finally, the running times of all three competing methods may be compared on each dataset for decision tree in Table III, shown in FIG. 12. k-NN may also show similar performances. The columns headed by "Time (sec)/1K" show the average running times (train and test) in seconds per 1000 points, the columns headed by "Points/sec" show how many points have been processed (train and test) per second on average, and the columns headed, by "speed gain" shows the ratio of the speed of XM to that, of W-OP, and W-OS, respectively. For example, XM is 26.9 times faster than W-OP on KDD dataset. Also, in the illustrative examples, XM is 1.2, 8.5, and 8.9 times faster than W-OP in SynC, SynCN, and Forest cover datasets, respectively. In general, W-OP may be roughly C times slower than XM in a dataset having C classes. This may be because W-OP needs to maintain C parallel models, one for each class. The processing speed for OLINDDA, may become diminished when novel classes occur frequently, as observed in KDD dataset. In another illustrative example, W-OS fails to detect 70% or more novel class instances in all datasets, but XM correctly detects 91% or more novel class instances in any dataset. Thus, XM outperforms W-OP both in speed and accuracy, and dominates W-OS in accuracy. The scalability of XM may be tested on higher dimensional data having larger number of classes. FIGS. 13A and 13B show an example of these results. The tests may be done on synthetically generated data, having different dimensions (20-60) and number of classes (10-40). Each dataset may have 250,000 instances. The time complexity of XM may increase linearly with the total number of dimensions in the data, as well as total number of classes in the data. Therefore, XM may be scalable to high dimensional data.

VI. Multi-Novel Class Detection

In addition to the novel class detection techniques discussed previously, the illustrative embodiments may also provide novel class detection techniques that allow for distinguishing among more than one novel class. The multi-class detection techniques described in the following allows for reducing false detection rates on some data sets and increases the novel class detection rate, as well as allows for distinguishing among two or more novel classes. In one embodiment, the multi-class novel class detection technique of novel data classes comprises the following elements: an adaptive threshold for outlier detection, a probabilistic approach for novel class detection using discrete Gini Coefficient, and simultaneous multiple novel class detection.

A. Outlier Detection Using Adaptive Threshold

In one embodiment, a test instance may be identified as an F-outlier if the instance is outside the radius of all the pseudopoints in the ensemble of models. Therefore, if a test instance is outside the hypersphere of a pseudopoint, but very close to its surface, it may still be an outlier. However, this case might be frequent due to concept-drift or noise, i.e., existing class instances may be outside and near to the surface of the hypersphere. As a result, the false alarm rate (i.e., detecting existing classes as novel) may be high. To address this issue, an adaptive approach is provided for detecting the outliers. In particular, one illustrative embodiment allows a slack space beyond the surface of each hyper sphere. If any test instance falls within this slack space, it is considered as existing class instance. This slack space is defined by a threshold, OUTTH. An adaptive technique may be applied to adjust the threshold.

The threshold OUTTH may be used in the following manner. Let x be a test instance, and h be the nearest pseudopoint of x in model $M_i$, with radius r. Let d be the distance from x to the centroid of h. The weight (x) is defined as follows: weight $(x)=e^{r-d}$. If $r \geq d$, then x is inside (or on) the hypersphere and weight(x)$\geq$1. Otherwise, x is outside the hypersphere and weight(x)<1. Note that if x is outside the hypersphere, then weight(x) is within the range (0,1). A reason for using this exponential function is that the function produces values within the range (0,1), which provides a convenient normalized value. The value of OUTTH may also be within (0,1). Now, if weight(x)$\geq$OUTTH, then x may be considered as an existing class instance, otherwise, x is considered as an outlier. If x is identified as an outlier for all models $M_i \in M$, then x may be considered as an F-outlier.

OUTTH is first initialized with an OUTTH_INIT value. In one example, OUTTH_INIT may be set to 0.7. To adjust OUTTH, the latest labeled instance x may be examined. If x had been a false-novel instance (i.e., existing class but misclassified as novel class), then x may have been an outlier. Therefore, weight(x)<OUTTH. If the difference OUTTH−weight(x) is less than a small constant $\epsilon$, then x may be considered as a marginal false-novel instance. If x is a marginal false-novel instance, then the slack space is increased so that future similar instances will not fall outside the decision boundary. Therefore, OUTTH is decreased by a small value ($\epsilon$), which effectively increases the slack space. Conversely, if x is a marginal false-existing instance, then x may be a novel class instance but was falsely identified as an existing class instance by a narrow margin. Therefore, the slack space may be decreased (increase OUTTH) by increasing OUTTH by $\epsilon$. The marginal constraint may be imposed to avoid drastic changes in OUTTH value. FIG. 14 illustrates a slack space outside the decision boundary, the concept of OUTTH, and marginal false-novel and marginal false-existing instances in accordance with the illustrative embodiments.

B. Novel Class Detection Using Gini Coefficient

In one example, the F-outliers detected during the outlier detection phase may occur because of one or more of the following reasons: noise, concept-drift, or concept-evolution. In order to distinguish the F-outliers that occur because of concept-evolution only, a metric called discrete Gini Coefficient of the F-outlier instances may be computed. The illustrative embodiments show that confidence in the concept-evolution scenario may be achieved if the Gini Coefficient is higher than a particular threshold. After detecting the F-outlier instances using the OUTTH value discussed in the previous section, the q-NSC(x) value may be computed for each F-outlier instance x. If the q-NSC(x) value is negative, x may be removed from consideration, (i.e., x is regarded as an existing class instance). For the remaining F-outliers, q-NSC (.) may be within the range [0,1]. Now, a compound, measure, called Novelty score or Nscore, may be computed for each such F-outlier as follows:

$$Nscore(x) = \frac{1 - weight(x)}{1 - minweight} q - NSC(x),$$

where weight(x) is defined in the previous section, and minweight is the minimum weight among all F-outliers having positive q-NSC.

Nscore may include two parts—the first part measures how far the outlier is away from its nearest existing class pseudopoint (higher value=greater distance), and the second part measures the cohesion of the F-outlier with other F-outliers and the separation of the F-outlier from the existing class instances. Note that the value of Nscore(x) is within [0,1]. A higher value indicates a greater likelihood of being a novel class instance. The distribution of Nscore(x) may be characterized by the actual class of F-outlier instances. In other words, by examining the distribution of Nscore(x), the novelty of the F-outlier instances may be determined, as follows: Nscore(x) values are discretized into n equal intervals (or bins), and a cumulative distribution function (CDF) of Nscore is constructed. Let $y_i$ be the value of the CDF for the i-th interval. The discrete Gini Coefficient G(s), for a random sample of $y_i$, may be computed as follows:

$$G(s) = \frac{1}{n}\left(n + 1 - 2\left(\frac{\sum_{i=1}^{n}(n + 1 - i)y_i}{\sum_{i=1}^{n} y_i}\right)\right).$$

Let us consider three different example cases and examine the behavior of G(s) in each case. Case 1: All Nscore(x) are very low, and fall in the first interval. Therefore, $y_i$=1 for all i. Therefore, G(s) becomes (after simplification):

$$G(s) = \frac{1}{n}\left(n+1-2\left(\frac{\sum_{i=1}^{n}(n+1-i)1}{\sum_{i=1}^{n}1}\right)\right) = 0.$$

Note that this case occurs when all F-outliers actually belong to the existing classes.

Case 2: All Nscore(x) are very high, and fall in the last interval. Therefore, $y_n=1$ and $y_i=0$ for all i<n. Therefore, G(s) becomes (after simplification):

$$G(s) = \frac{1}{n}\left(n+1-2\left(\frac{1}{1}\right)\right) = \frac{n-1}{n}.$$

Note that this case occurs when all F-outliers actually belong to the novel class.

Case 3: Nscore(x) is evenly distributed across all the intervals. In this case $y_i=i/n$ for all i. Therefore, G(s) becomes (after simplification):

$$G(s) = \frac{1}{n}\left(n+1-2\left(\frac{\sum_{i=1}^{n}(n+1-i)i}{\sum_{i=1}^{n}i}\right)\right) = \frac{n-1}{3n}.$$

Note that this case may occur if the distribution is mixed, i.e., noise, concept-drift and possibly some novel class instances.

By examining the three cases, a threshold for Gini Coefficient may be generated to identify a novel class. If $$G(s) > \frac{n-1}{3n},$$

a novel class may be declared and the F-outliers tagged as novel class instances. If G(s)=0, the F-outliers may classified as existing class instances. If $$G(s) \in \left(0, \frac{n-1}{3n}\right),$$

the F-outliers falling in the first interval may be filtered out, and the rest of the F-outliers may be considered as a novel class. Mote that if n→∞, $$\frac{n-1}{3n} \to \frac{1}{3}.$$

However, for any value of n<∞, $$\frac{n-1}{3n} < \frac{1}{3}.$$

For example, if n=10, then $$\frac{n-1}{3n} = 0.3.$$

In this example, n=10.

C. Simultaneous Multiple Novel Class Detection

It is possible that more than one novel class may arrive at the same time (in the same chunk). This is a common scenario in text streams, such as Twitter messages. Note that determining whether there is more than one novel class may present a challenge, since the determination may execute in an unsupervised fashion. In order to detect multiple novel classes, a graph may be constructed, and the connected components in the graph may be identified. The number of connected components may determine the number of novel classes. The basic assumption in determining the multiple novel classes follows from the cohesion and separation property. For example, if there are two novel classes, then the separation among the different novel class instances should be higher than the cohesion among the same-class instances.

At first, N_list, the collection of novel class instances detected using the novel class detection technique, may be used to create $K_V$ pseudo-points using K-Means clustering and summarize the clusters. Here, $K_V$=K|N_List|/S (S being the chunk size). Then a graph G=(V,E) may be built. Each pseudopoint is considered a vertex of G. For each pseudopoint h, its nearest neighbor h.nn may be found based on centroid distances, and the silhouette coefficient of h may be computed using the following formula:

$$h.sc = \frac{dist(h, h.nn) - h.\mu}{\max(dist(h, h.nn), h.\mu)},$$

where dist(h, h.nn) is the centroid distance between h to h.nn, and h.μ is the mean distance from the centroid of h to all instances belonging to h.

If h.sc is high (close to 1), it indicates h is a tight cluster and it is far from its nearest cluster. On the other hand, if h.sc is low, then h is not a tight cluster, and it is close to its nearest cluster. An edge (h, h.nn) may be added to G if h.sc is less than a threshold $th_{SC}$, which indicates h and h.nn are not so separable. In this example, $th_{SC}$=0.8 is used. Once the graph G is built, the connected components may be found, and each pseudopoint may be marked with the corresponding component number.

For each connected component $g_i \in G$, its global centroid. $C(g_i)$ (i.e., the center of gravity of all pseudopoints in $g_i$) and $\mu d(g_i)$ (i.e., the mean distance of all the pseudopoints in $g_i$ from $C(g_i)$) may be computed. Each pair of components $(g_1, g_2) \in G$ may be merged if $\mu d(g_1)+\mu d(g_2)$ is greater than twice the distance between $C(g_1)$ and $C(g_2)$. In other words, two components may be merged if the mean intra-component distance is higher than the inter-component distance, i.e., the components are less dense and less separable from each other. Finally, class labels are assigned, to each novel class instance, which is equal to the component number to which the instance belongs.

VII. Experiments

A. Dataset

To further illustrate the embodiments described in Section VI, a number of non-limiting experimental examples are provided using synthetic and real datasets. Such experiments are by way of illustration only, and do not limit the many various implementations of the illustrative embodiments. While extensive experiments have been performed on the Twitter, Forest Cover, KDD, and synthetic data sets, due to space limitation, only Twitter and Forest Cover datasets experiments are reported here.

B. Experimental Setup

Baseline Techniques

MineClass: MCM: This is a proposed approach, which stands for Multi Class Miner in Data Streams. OW: This is the combination of two approaches, namely, OLINDDA, and weighted classifier ensemble (WCE). OLINDDA works as a novel class detector, and WCE performs the classification. Baseline may comprise two variations—parallel and single. Only the parallel baseline model is used here, since it was the better of the two. In all experiments, the ensemble size and chunk-size are kept the same for both these techniques. In addition, the same base learner (i.e., k-NN) is used for all three methods.

Parameters Settings

The Feature set size=30 for Twitter dataset. For other datasets, all the numeric features may be used. For example, K (number of pseudopoints per chunk)=50, S (chunk size)=1000, L (ensemble size)=6, q (minimum number of F-outliers required to declare a novel class)=50. For OLINDDA, the default parameter values are used.

B. Overall Novel Class Detection

Evaluation Approach

The following performance metrics are used for evaluation: $M_{new}$=% of novel class instances Misclassified as existing class, $F_{new}$=% of existing class instances Falsely identified as novel class, ERR=Total, misclassification error (%) (including $M_{new}$ and $F_{new}$). The initial models are built in each method with the first InitNumber chunks. From the InitNumber+1st chunk onward, first the performances of each, method are evaluated on that chunk, then the chunk is used to update the existing models. InitNumber=3 is used for all experiments. The performance metrics for each chunk are saved and aggregated for producing the summary result.

FIGS. 15A-15E illustrate the total misclassification error (ERR) for various datasets, including the ERR rates in (a) Twitter, and (b) Forest dataset; (c) ROC curves in Twitter dataset; Novel classes missed, in (d) Twitter, and (e) Forest dataset. FIGS. 15A and 15B show the ERR rates for each approach throughout the stream in the Twitter, and Forest datasets respectively. For example, in FIG. 15A at X axis=200, the Y values show the average ERR of each approach from the beginning of the stream to chunk 200 in Twitter dataset. At this point, the ERR of MineClass, MCM, and OW are 17.2%, 1.3%, and 3.3%, respectively. FIGS. 15D and 15E show the total number of novel instances missed, for each of the baseline approaches for Twitter and Forest dataset, respectively. For example, in FIG. 15E, at the same value of the X axis (=200), the Y values show the total novel instances missed (i.e., misclassified as existing class) for each approach from the beginning of the stream to chunk 200 in the Twitter dataset. At this point, the number of novel instances missed, by MineClass, MCM, and OW are 929, 0, and 3533, respectively. The ROC curves for the Twitter, and Forest datasets are generated by plotting false novel class detection rate (false positive rate if we consider novel class as positive class and existing classes as negative class) against the true novel class detection rate (true positive rate). FIG. 15C snows the ROC curves for the Twitter dataset.

FIG. 16A illustrates Table IV showing a summary of the results. In particular, Table IV summarizes the results of overall classification and novel class detection error i.e., error in classification and detecting novel class only (not distinguishing multiple novel classes). For example, the column headed by $M_{new}$ reports the $M_{new}$ rates of each approach in different datasets for the entire stream. In Twitter dataset, the $M_{new}$ rates are 24.3%, 0.7%, and 100% for MineClass, MCM, and OW, respectively. The column AUC reports the area under the ROC curves for each dataset. To summarize the results, MCM outperforms MineClass and OW in ERR, $M_{new}$ and $F_{new}$ rates. This is because of the enhanced mechanism of MCM in detecting novel classes. Recall that MCM applies an adaptive threshold for outlier detection, and also may employ a probabilistic approach in recognizing the novel class instances. The net effect is that the overall $F_{new}$ and $M_{new}$ rates drop significantly and the ERR rate also drops.

C. Results

FIG. 16B illustrates Table V, which shows a summary of multiple novel class detection results according to the non-limiting experimental example. There are 4 and 2 occurrences of two novel classes in Twitter, and Forest datasets, respectively. In other words, two novel classes appear simultaneously in 4 different data chunks in Twitter dataset, and two novel classes appear simultaneously in 2 different data chunks in Forest dataset. For each occurrence of multiple novel classes, the confusion matrix is reported in a single column. The entries in the rows headed by 'Type 1 as Type 1' report the number of type 1 novel class instances correctly detected as type 1, the rows headed by 'Type 1 as Type 2' report the number of type 1 novel class instances incorrectly detected as type 2, and so on. For example, in the Twitter dataset, and in the first occurrence of two novel classes (under column '1'), all of the 360 instances of type 1 novel class are identified correctly as type 1; none of the type 1 novel class instances are incorrectly identified as type 2; 518 of the type 2 novel class instances are correctly identified as type 2; and 35 of the type 2 novel class instances are incorrectly identified as type 1. Note that the numbering of type 1 and 2 are relative. In addition, the precision, recall, and F-measure for each occurrence are reported for each dataset, based on the misclassification of type 1 novel class instance into the other kind. For example, the table cell corresponding to the column headed by '1' and the row headed by 'Twitter F-measure' reports the F-measure of multiple novel class detection on the first occurrence of two novel classes in Twitter dataset, which is 0.95. The F-measure is computed by considering type 1 instances as positive, and the other as negative class. Considering the fact that am unsupervised approach is applied, the results are very promising, especially in the Twitter dataset, where the F-measure is 0.97. For the Forest dataset, the F-measure is lower because the novel classes in Twitter dataset are relatively well separated than that of the Forest dataset.

VIII. Feature Space Homogenizing

In addition to the novel class detection techniques discussed above, the illustrative embodiments provide a framework for classifying a data stream that observes infinite-length, concept-drift, concept-evolution, and feature-evolution. This framework may be referred to as DXMiner (or DECSMiner), which stands for Dynamic feature based Enhanced Classifier for Data Streams with novel class Miner. In addition to other data classification aspects, DXMiner provides a realistic feature extraction and selection technique for data streams, which selects the features for the test instances without knowing their labels. A fast and effective feature space conversion embodiment is also provided to address the feature-evolution problem. In this embodiment, different heterogeneous feature spaces may be converted into one homogeneous space without losing any feature value.

A. DXMiner Overview

Top Level Description

Process 4 below shows one approach that may be utilized by the illustrative embodiments:

---

Process 4 DXMiner

```
1:   M ← Build-initial-ensemble( )
2:   buf ← empty //temporary buffer
3:   D_u ← latest chunk of unlabeled instances
4:   D_l ← sliding window of last r data chunks
5:   F_u ← Extract&Select-Features(D_l,D_u) //Feature set for D_u
6:   Q⇐ D_u //FIFO queue of data chunks waiting to be labeled
7:   while true do
8:       for all x_j ∈ D_u do
9:           M',x_j' ← Convert-Featurespace(M,x_j,F_u)
10:          NovelClass-Detection&Classification(M',x_j', buf)
11:      end for
12:      if the instances in Q.front( ) are now labeled then
13:          D_f⇐ Q //Dequeue
14:          M ← Train&Update(M,D_f)
15:          D_l ← move-window(D_l,D_f) //slide the window to
                 include D_f
16:      end if
17:      D_u ← new chunk of unlabeled data
18:      F_u ← Extract&Select-Features(D_l,D_u) //Feature set for D_u
19:      Q⇐ D_u //Enqueue
20:  end while
```
---

Process 4 sketches the basic steps of DXMiner. The system may include an ensemble of L classification models, $\{M_1, \ldots, M_L\}$. The data stream may be divided, into equal, sized chunks. When the data points of a chunk are labeled by an expert, it may be used for training. The initial ensemble may be built from first L data chunks (line 1).

In one embodiment, feature extraction and selection is applied on the raw data to extract all the features and select the best features for the latest unlabeled data chunk $D_u$ (line 5). The feature selection technique is described in further detail below. However, if the feature set is pre-determined, then the function (Extract&SelectFeatures) may simply return that feature set.

$D_u$ may be enqueued into a queue of unlabeled data chunks waiting to be labeled (line 6). Each instance of the chunk $D_u$ may then be classified by the ensemble M (lines 8-11). Before classification, the models in the ensemble, as well as the test instances, may pass through a feature space conversion process.

Feature space conversion (line 9) may not be needed if the feature set for the whole data stream is static. However, if the feature space is dynamic, then different feature sets may be present in different data chunks. As a result, each model in the ensemble would be trained on different feature sets. In addition, the feature space of the test instances would also be different from the feature space of the models. Therefore, a feature space conversion technique may be applied to homogenize the feature sets of the models and the test instances, which is described in further detail below.

Novel class detection and classification (line 10) may be performed after the conversion of feature spaces. The test instance is examined by the ensemble of models to determine whether the instance may be identified as a novel class instance, or as one of the existing class instances. The buffer buf may be used to temporarily store potential novel class instances.

The queue Q may be checked to determine if the chunk at the front (i.e., oldest chunk) is labeled. If the oldest chunk, is labeled, the chunk is dequeued, used to train a model, and the sliding window of labeled chunks is shifted right. By keeping the queue to store unlabeled data, the constraint imposed by many existing classification techniques in that each new data point arriving in the stream should be labeled as soon as it is classified by the existing model may be eliminated.

Training and update of the models are shown at line 14. As a model is trained from the training data, a decision boundary around, the training data may be built in order to detect novel classes. Each model also saves the set of features with which it is trained. The newly trained model may replace an existing model in the ensemble. The model to be replaced may be selected by evaluating each of the models in the ensemble on the training data, and choosing the one with the highest error. Finally, when a new data chunk arrives, the best features for that chunk may be selected, and the chunk may be enqueued into Q.

Feature Extraction and Selection

The data points in the stream may or may not have a fixed feature set. If they have a fixed feature set, then that feature set may be used. Otherwise, a feature extraction and feature selection technique may be applied to the data points. Note that features for the instances of the test chunk may be selected before the instances can be classified by the existing models, since the classification models may require the feature vectors for the test instances, in some embodiments. However, since the instances of the test chunk may be unlabeled, supervised feature selection (e.g. information gain) may not be used on that chunk. To solve this problem, two alternatives may be used: predictive feature selection, and informative feature selection. Once the feature set has been selected for a test chunk, the feature values for each instance may be computed, and feature vectors may be produced. The same feature vector may be used during classification (when unlabeled) and training (when labeled).

Predictive Feature Selection

The features of the test instances may be predicted without using any of their information; instead, the past labeled instances may be used to predict the feature set of the test instances. This may be performed, by extracting all features from the last r labeled chunks ($D_1$ in DXMiner Process 4), and then selecting the best R features using some selection criteria. In the experiments described later, r=3 is used. One popular selection criterion is information gain. Another selection criterion is called deviation weight. For example, the deviation weight for the i-th feature for class c may be given by:

$$dw_i = freq_i * \frac{freq_i^c}{N_c} * \frac{N - N_c}{freq_i - freq_i^c + \varepsilon}$$

Where $freq_i$ is the total frequency of the i-th feature, $freq_i^c$ is the frequency of the i-th feature in class c, $N_c$ is the number of instances of class c, N is the total number of instances, and $\varepsilon$ is a smoothing constant. A higher value of deviation weight means greater discriminating power. For each class, the top r features having the highest deviation weight may be chosen. Thus, if there are total |C| classes, then R=|C|r features may be selected this way. These features may be used as the feature space for the test instances. Deviation weight may be used instead of information gain in some data streams because this selection criterion may allow for achieving better classification accuracy. Although information gain and deviation weight may consider a fixed number of classes, this may not affect the novel class detection process since the feature selection may be used just to select the best features for the test instances. The test instances are still unlabeled, and therefore, novel class detection mechanism may be applicable to them.

Informative Feature Selection

Informative feature selection comprises using the test chunk to select the features. All possible features may be extracted from the test chunk ($D_u$ in the DXMiner Process 4), and the best R features are selected in an unsupervised way. For example, one such unsupervised selection criterion is to choose the R highest frequency features in the chunk. This strategy may be very useful in data streams such as Twitter.

Training and Update

In one embodiment, the feature vectors constructed in the previous step may be supplied to the learning algorithm to train a model. In one example, a semi-supervised clustering technique is used to train a k-NN based classifier, K clusters are built with the training data, applying a semi-supervised clustering technique. After building the clusters, the cluster summary (mentioned as pseudopoint) of each cluster may be saved. The summary may contain the centroid, radius, and frequencies of data points belonging to each class. The radius of a pseudopoint may be defined as the distance between the centroid and the farthest data point in the cluster. The raw data points are discarded after creating the summary. Therefore, each model $M_i$ is a collection of K pseudopoints. In one non-limiting example, a test instance $x_j$ is classified using $M_i$ as follows. First find, the pseudopoint $h \in M_i$ whose centroid is nearest from $x_j$. The predicted class of $x_j$ may be the class that has the highest frequency in h. $x_j$ may be classified using the ensemble M by taking a majority voting among all classifiers.

Each pseudopoint may correspond, to a "hypersphere" in the feature space having center at the centroid, and a radius equal to its radius. Let S (h) be the feature space covered by such a hypersphere of pseudopoint h. The decision boundary of a model $M_i$ (or $B(M_i)$) may be the union of the feature spaces (i.e., S(h)) of all pseudopoints $h \in M_i$. The decision boundary of the ensemble M (or B(M)) may be the union of the decision boundaries (i.e., B ($M_i$)) of all models $M_i \in M$.

In one non-limiting example, the ensemble may be updated by the newly trained classifier as follows. Each existing model in the ensemble may be evaluated on the latest training chunk, and their error rates are obtained. The model having the highest error may be replaced, with the newly trained model. This ensures that there are exactly L models in the ensemble at any given point of time.

Classification and Novel Class Detection

Each instance in the most recent unlabeled chunk may be first examined by the ensemble of models to see if the instance is outside the decision boundary of the ensemble (i.e., B (M)). If the instance is inside the decision boundary, then the instance may be classified normally (i.e., using majority voting) using the ensemble of models. Otherwise, the instance may be declared as an F-outlier. As previously stated as Property 1, for any class of data, it is assumed that a data point should be closer to the data points of its own class (cohesion) and farther apart from the data points of other classes (separation). Thus, if there is a novel class in the stream, instances belonging to the class will be far from the existing class instances and will be close to other novel class instances. Since F-outliers are outside B(M), they are far from the existing class instances. Consequently, the separation property for a novel class is satisfied by the F-outliers. Therefore, F-outliers are potential novel class instances, and they may be temporarily stored in the buffer buf (see Process 4) to observe whether they also satisfy the cohesion property. Then a determination is made as to whether there are enough F-outliers that are close to each other. This may be performed by computing the following metric, which is called, the q-Neighborhood Silhouette Coefficient, or q-NSC.

Here q is a user defined parameter. For brevity, the $\lambda_c$-neighborhood of an F-outlier x is denoted as $\lambda_c(x)$. Thus, $\lambda_+(x)$ of an F-outlier x is the set of q instances of class $c_+$, that are closest to the outlier x. Similarly, $\lambda_o(x)$ refers to the set of q F-outliers that are closest to x. Let $\overline{D}_{c_{out},q}(x)$ be the mean distance from an F-outlier x to its q-nearest F-outlier instances (i.e., to its $\lambda_o(x)$ neighborhood). Also, let $\overline{D}_{c_{min},q}(x)$ be the mean distance from x to its closest existing class neighborhood $\lambda_{c_{min}}(x)$. Then q-nsc of x q-nsc given by:

$$q\text{-}NSC(x) = \frac{\overline{D}_{c_{min},q}(x) - \overline{D}_{c_{out},q}(x)}{\max(\overline{D}_{c_{min},q}(x), \overline{D}_{c_{out},q}(x))}$$

q-nsc, a unified measure of cohesion and separation, yields a value between −1 and −1. A positive value indicates that x is closer to the F-outlier instances (more cohesion) and farther away from existing class instances (more separation), and vice versa. q-nsc(x) of an F-outlier x may be computed separately for each classifier $M_i \in M$, a new class may be declared if there are at least q'(>q) F-outliers having positive q-nsc for all classifiers $M_i \in M$. In order to reduce the time complexity in computing q-nsc( ), the F-outliers may be clustered, and q-nsc( ) may be computed of those clusters only. The q-NSC( ) of each such cluster may be used, as the approximate q-nsc( ) value of each data point in the cluster.

It is worthwhile to mention here that no assumptions are made about the number of novel classes. If there are two or more novel classes appearing at the same time, all of them will be detected as long as each one of them satisfies Property 1 and each of them has >q instances. In one embodiment, they will be simply tagged as "novel class", i.e., no distinction will be made among them. However, in one embodiment, the distinction may be learned by the model as soon as those instances are labeled by human experts, and a classifier is trained with them.

B. Feature Space Conversion

Data streams that are dynamic in nature and thus do not have any fixed feature space (such as text streams) may have different feature spaces for different models in the ensemble, since different sets of features would likely be selected for different chunks. In addition, the feature space of test instances is also likely to be different from the feature space of the classification models. Therefore, when classifying an instance, a homogeneous feature space may be needed for the model and the test instances. In generating a homogeneous feature space, three example options may be considered: 1) Lossy fixed conversion (Lossy-F conversion), 2) Lossy local conversion (Lossy-L conversion), and 3) Lossless homogenizing conversion (Lossless conversion).

Lossy Fixed (Lossy-F) Conversion

In Lossy-F conversion, the same feature set may be used for the entire stream, which had been selected for the first data chunk (or first n data chunks). Using the same feature set makes the feature set fixed, and therefore all the instances in the stream, whether training or testing, may be mapped to this feature set. This option is a lossy conversion because future models and instances may lose important features due to this conversion.

Consider the following example. Let $F_s = \{F_a, F_b, F_c\}$ be the features selected in the first n chunks of the stream. With the Lossy-F conversion, all future instances may be mapped to this feature set. That is, suppose the set of features for a future instance x are: $\{F_a, F_c, F_d, F_e\}$, and the corresponding feature values of x are: $\{x_a, x_c, x_d, x_e\}$. Then after conversion, x may be represented by the following values: $\{x_a, 0, x_c\}$. In other words, any feature of x that is not in $F_s$ (i.e., $F_d$ and $F_e$) may be discarded, and any feature of $F_s$ that is not in x (i.e., $F_b$) may be assumed to have a zero value. All future models will also be trained using $F_s$.

Lossy Local (Lossy-L) Conversion

In Lossy-L conversion, each training chunk, as well as the model built from the chunk, may have its own feature set selected, using the feature extraction and selection technique described in the illustrative embodiments. When a test instance is to be classified using a model $M_i$, the model may use its own feature set as the feature set of the test instance. This conversion is also lossy because the test instance might lose important features as a result of this conversion.

Continuing from the Lossy-F example above, let $F_s$ be the selected feature set for a model $M_i$, and let x to be an instance being classified using $M_i$. Note that for the Lossy-F conversion, $F_s$ may be the same over all models, whereas for Lossy-L conversion, $F_s$ may be different for different models.

Lossless Homogenizing (Lossless) Conversion

In Lossless conversion, each, model may have its own selected set of features. When a test instance x is to be classified using a model $M_i$, both the model and the instance may convert their feature sets to the union of their feature sets. This conversion may be referred to as "lossless homogenizing" since both the model and the test instance preserve their dimensions (i.e., features), and the converted feature space becomes homogeneous for both the model and the test instance. Therefore, no useful features may be lost as a result of the conversion.

Continuing from the previous Lossy-L example, let $F_s = \{F_a, F_b, F_c\}$ be the feature set of a model $M_i$, $\{F_a, F_c, F_d, F_e\}$ be the feature set of the test instance x, and $\{x_a, x_c, x_d, x_e\}$ be the corresponding feature values of x. Then after conversion, both x and $M_i$ will have the following features: $\{F_a, F_b, F_c, F_d, F_e\}$. Also, x will be represented with the following feature values: $\{x_a, 0, x_c, x_d, x_e\}$. In other words, all the features of x may be included in the converted feature set, and any feature of $F_s$ that is not in x (i.e., $F_b$) may be assumed to be zero.

Advantage of Lossless Conversion Over Lossy Conversions

In one embodiment, Lossless conversions may be preferred over Lossy conversions because no features are lost in the conversions. It is assumed here that Lossless conversion preserves the properties of a novel class. That is, if an instance belongs to a novel class, it remains outside the decision boundary of any model $M_i$ of the ensemble M in the converted feature space. However, this may not be true for a Lossy-L conversion, as the following theorem states.

Lemma 2—If a test point x belongs to a novel class, it will be misclassified by the ensemble M as an existing class instance under certain conditions when the Lossy-L conversion is used.

According to the illustrative embodiments, if x remains inside the decision boundary of any model $M_i \in M$, then the ensemble M may consider it as an existing class instance. Let $M_i \in M$ be the model under question. Without loss of generality, let $M_i$ and x have m and n features, respectively, l of which are common features. That is, let the features of the model be $\{F_{i_1}, \ldots, F_{i_m}\}$ and the features of x be $\{F_{j_1}, \ldots, F_{j_n}\}$, where $i_k = j_k$ for $0 \leq k \leq l$. In the boundary case, l+0, i.e., no features are common between $M_i$ and x. Let h be the pseudopoint in $M_i$ that is closest to x, and also, R be the radius of h, and C be the centroid of h. The Lossless feature space may be the union of the features of $M_i$ and x, which is: $\{F_{i_1}, \ldots, F_{i_l}, F_{i_{l+1}}, \ldots, F_{i_m}, F_{j_{l+1}}, \ldots, F_{j_n}\}$. According to our assumption that the properties of the novel class are preserved with the Lossless conversion, x will remain outside the decision boundary of all models $M_i \in M$ in the converted feature space. Therefore, the distance from x to the centroid C may be greater than R.

Let the feature values of the centroid C in the original feature space be: $\{y_{i_1}, \ldots, y_{i_m}\}$ where $y_{i_k}$ is the value of feature $F_{i_k}$. After Lossless conversion, the feature values of C in the new feature space may be: $\{y_{i_1}, \ldots, y_{i_m}, 0, \ldots, 0\}$. That is, all feature values for the added features $\{F_{j_{l+1}}, \ldots, F_{j_n}\}$ are zeros. Also, let the feature values of x in the original feature space be: $\{x_{j_1}, \ldots, x_{j_n}\}$. The feature values of x after the Lossless conversion may be: $\{x_{j_1}, \ldots, x_{j_l}, 0, \ldots, 0, x_{j_{l+1}}, \ldots, x_{j_n}\}$, that is, the feature values for the added features are all zeros. Without loss of generality, let Euclidean distance be the distance metric. Let D be the distance from x to the centroid C. Therefore, it may be deduced that:

$$D^2 = (C-x)^2 > R^2 \Rightarrow R^2 < \sum_{k=1}^{l}(y_{i_k}-x_{j_k})^2 + \sum_{k=l+1}^{m}(y_{i_k}-0)^2 + \sum_{k=l+1}^{n}(0-x_{i_k})^2$$

Now, let $A^2 = \sum_{k=1}^{l}(y_{i_k}-x_{j_k})^2 + \sum_{k=l+1}^{m}(y_{i_k}-0)^2$, and $B^2 = \sum_{k=l+1}^{n}(0-x_{j_k})^2$. Note that with the Lossy-L conversion, the distance from x to C may be A, since the converted feature space is the same as the original feature space of $M_i$. Thus, it may follow that:

$$R^2 < A^2 + B^2 \Rightarrow R^2 = A^2 + B^2 - e^2 \text{ (letting } e>0) \Rightarrow A^2 = R^2 + (e^2-B^2) \Rightarrow A^2 < R^2 \text{ (provided that } e^2-B^2<0)$$

Therefore, in the Lossy-L converted feature space, the distance from x to the centroid C may be less than the radius of the pseudopoint h, meaning, x is inside the region of h, and as a result, x is inside decision boundary of $M_i$. Therefore, x may be misclassified as an existing class instance by $M_i$ when the Lossy-L conversion is used, under the condition that $e^2-B^2<0$.

Lemma 2 is supported by the following experimental results, which show that Lossy-L conversion misclassifies most of the novel class instances as existing classes. It might appear that increasing the dimension of the models and the test instances may have am undesirable side effect due to curse of dimensionality. However, it is reasonable to assume that the feature set of the test instances is not dramatically different from the feature sets of the classification models because the models usually represent the most recent concept. Therefore, in one example, the converted dimension of the feature space may be almost the same as the original, feature spaces. Furthermore, this type of conversion has been proved to be successful in other popular classification techniques, such as Support Vector Machines.

C. Experiments

Dataset

In these experiments, four different datasets having different characteristics are used. Such experiments are by way of illustration only, and do not limit the many various implementations of the illustrative embodiments. FIG. 11A includes Table VI, which illustrates a summary of the datasets used.

Twitter dataset (Twitter): This dataset comprises 170,000 Twitter messages (tweets) of seven different trends (classes). The raw data is in free text and preprocessing is applied to obtain a useful dataset. The preprocessing comprises two steps. First, filtering is performed on the messages to filter out words that match against a stop word list. Examples or stop words are articles ('a', 'an', 'the'), acronyms ('lol', 'btw') etc.

Second, Wiktionary is used to retrieve the parts of speech (POS) of the remaining words, remove all pronouns (e.g., 'I', 'u'), change tense of verbs (e.g. change 'did' and 'done' to 'do'), change plurals to singulars and so on. The previously described informative feature selection technique is also applied for the Twitter dataset. Also, the feature vector for each message is generated using the following formula: $w_{i,j} = \beta * f(a_i, m_j) \Sigma_{j=1}^S f(a_i, m_j)$ where $w_{i,j}$ is the value of the i-th feature ($a_i$) for the j-th message in the chunk, $f(a_i, m_j)$ is the frequency of feature ($a_i$) in message $m_j$, and $\beta$ is a normalizing constant.

NASA Aviation Safety Reporting System dataset (ASRS): This dataset comprises around 135,000 text documents. Each document is a report corresponding to a flight anomaly. There are 13 different types of anomalies (or classes), such as "aircraft equipment problem: critical", "aircraft equipment problem: less severe", etc. These documents are treated as a data stream by arranging the reports in order of their creation time. The documents are normalized using a software called PLADS, which removes stop words, expands abbreviations, and performs stemming (e.g. changing tense of verbs). The instances in the dataset are multi-label, meaning an instance may have more than lass label. The multi-label classification problem is transformed into 13 separate binary classification problems, one for each class. When reporting the accuracy, the average accuracy of the 13 datasets is reported. The previously described predictive feature selection may be applied for the ASRS dataset. Deviation weight is used for feature selection, which has shown to be preferable over information gain. The feature values are produced using the same formula that is used for the Twitter dataset, KDD Cup 1999 Intrusion Detection Dataset (KDD) And Forest Cover Dataset From UCI Repository (Forest) may also be used.

Experimental Setup

Baseline techniques: DXMiner: This is the proposed approach with the Lossless feature space conversion. Lossy-F: This approach is the same as DXMiner except that the Lossy-F feature space conversion is used. Lossy-L: This is DXMiner with the Lossy-L feature space conversion. O-F: This is a combination of the OLINDDA approach with FAE approach. These two are combined. In this combination, OLINDDA performs as the novel class detector, and FAE performs data classification. This may be performed as follows: For each chunk, the novel class instances are first detected using OLINDDA. All other instances in the chunk may be assumed to be in the existing classes, and they are classified using FAE. FAE uses the Lossy-L conversion of feature spaces, OLINDDA is also adapted to this conversion. For fairness, the underlying learning algorithm for FAE may be chosen the same as that of DXMiner. Since OLINDDA assumes that there is only one "normal" class, parallel OLINDDA models may be built, one for each class, which may evolve simultaneously. Whenever the instances of a novel class appear, a new OLINDDA model may be created for that class. A test instance may be declared as novel, if all the existing class models identify this instance as novel.

Parameters settings: DXMiner: R (feature set size)=30 for Twitter and 50 for ASRS. Note that R is used for data streams having feature-evolution. K (number of pseudopoints per chunk)=50, S (chunk size)=1000, L (ensemble size)=6, and q (minimum number of F-outliers required to declare a novel class)=50. These parameter values may be considered to be reasonably stable in certain examples, which are obtained by running DXMiner on a number of real and synthetic datasets. OLINDDA: Number of data points per cluster ($N_{excl}$)=30, least number of normal, instances needed to update the existing model=100, least number of instances needed to build the initial model=100. FAE: m (maturity)=200, p (probation time)=4000, f (feature change threshold)=5, r(growth rate)=10, N(number of instances)=1000, M (feature selected)= same as R of DXMiner. These parameters may be chosen either according to the default values used in OLINDDA, FAE, or by trial and error to obtain an overall satisfactory performance.

D. Evaluation

Evaluation approach: The following performance metrics may be used for evaluation: $M_{new}$=% of novel class instances Misclassified as existing class, $F_{new}$=% of existing class instances Falsely identified as novel class, ERR=Total misclassification error (%) (including $M_{new}$ and $F_{new}$). The initial, models in each method may be built with the first three chunks. From the $4^{th}$ chunk onward, first the performances of each method may be evaluated on that chunk, then that chunk may be used to update the existing models. The performance metrics for each chunk for each method are saved and averaged for producing the summary result.

Figure 18A:
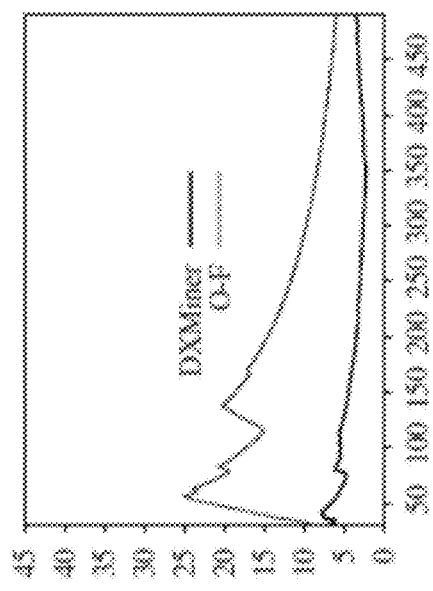
FIGS. 18A-18D depict example ERR rates and missed novel classes in Twitter and Forest datasets in accordance with am illustrative embodiment.
Figure 18B:
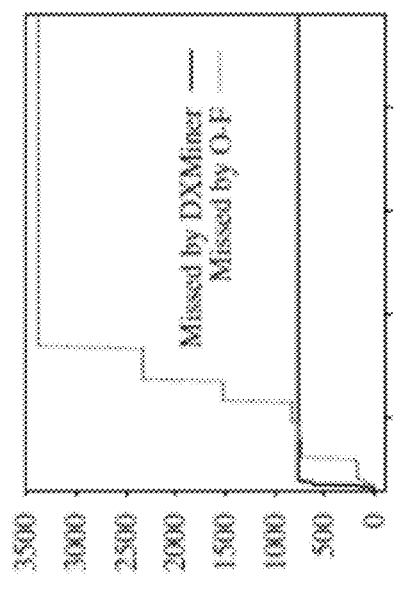
Figure 18C:
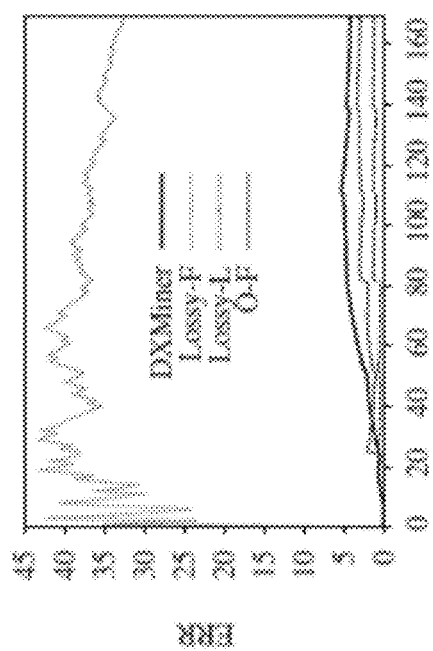

FIGS. 18A-18D illustrate the ERR rates and missed novel classes in Twitter (a,c) and Forest (b,d) datasets according to this example experiment. In particular, FIGS. 18A and 18C show the ERR rates and total number of missed novel classes respectively, for each approach throughout the stream in Twitter dataset. For example in FIG. 18A, at X axis=150, the Y values show the average ERR of each approach from the beginning of the stream to chunk 150. At this point, the ERR of DXMiner, Lossy-F, Lossy-L, and O-F are 4.4% 35.0%, 1.3%, and 3.2%, respectively. FIG. 18C shows the total number of novel instances missed for each of the baseline approaches. For example, at the same value of X axis, the Y values show the total novel instances missed (i.e., misclassified as existing class) for each approach from the beginning of the stream to chunk 150. At this point, the number of novel instances missed by DXMiner, Lossy-F, Lossy-L, and O-F are 929, 0, 1731, and 2229 respectively. The total number of novel class instances at this point is 2287, which is also shown in the graph.

Figure 18D:
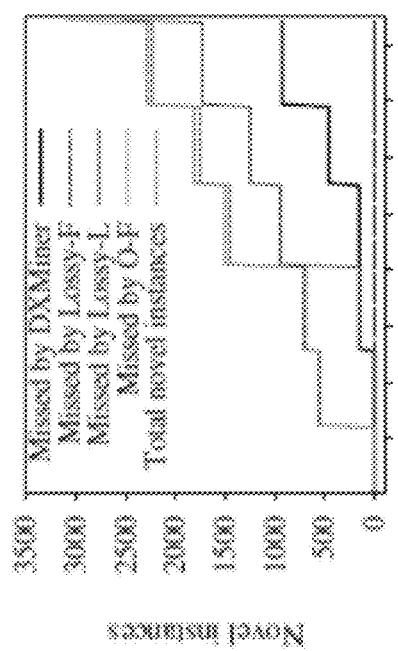

Note that although O-F and Lossy-L have lower ERR than DXMiner, they may have higher $M_{new}$ rates, as they miss most of the novel class instances. This is because both FAE and Lossy-L use the Lossy-L conversion, which, according to Lemma 2, is likely to misclassify more novel class instances as existing class instance (i.e., have higher $M_{new}$ rates). On the other hand, Lossy-F has zero $M_{new}$ rate, but it has a high false positive rate. This is because it wrongly recognizes most of the data points as novel class as a fixed feature vector is used for training the models; although newer and more powerful features evolve often in the stream. FIGS. 18B and 18D show the ERR rates and number of novel classes missed, respectively, for Forest dataset. Note that since the feature vector may be fixed for this dataset, no feature space conversion is required, and therefore, Lossy-L and Lossy-F may not be applicable here.

Figure 19A:
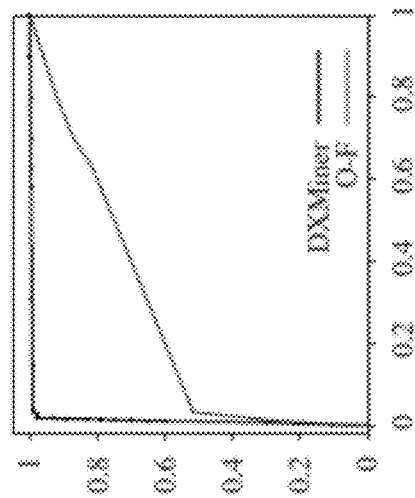
FIGS. 19A-19D depict example ROC curves for Twitter and Forest datasets and ERR rates and ROC curves for ASRS dataset in accordance with an illustrative embodiment.
Figure 19B:
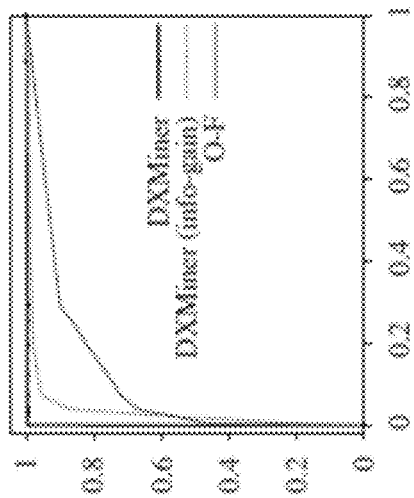

FIGS. 19A-19D illustrate the ROC curves for (a) Twitter, (b) Forest dataset; and ERR rates (c) and ROC curves (d) for ASRS dataset. ROC curves may be generated for the Twitter, KDD, and Forest datasets by plotting false novel class detection rate (false positive rate if novel, classes are considered positive class and existing classes as negative class) against true novel class detection rate (true positive rate). The ROC curves corresponding to Twitter and Forest datasets are shown in FIGS. 19A and 19B, and the corresponding AUCs are reported, in Table VII in FIG. 17B.

Figure 19C:
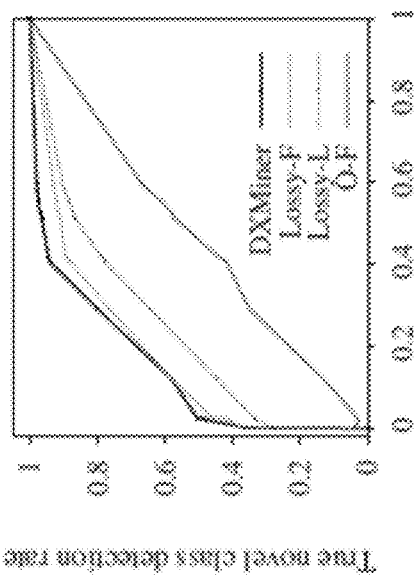
Figure 19D:
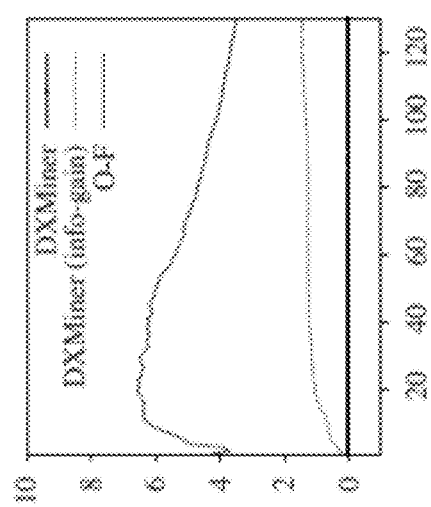

FIG. 19C shows the ERR rates for ASRS dataset, averaged over all 13 classes. Here DXMiner (with deviation weight feature selection criterion) has the lowest error rate. FIG. 19D shows the corresponding ROC curves. Each ROC curve is averaged over all 13 classes. Here too, DXMiner has the highest area under the curve (AUC), which is 0.996, whereas O-F has AUC=0.876. Table VII in FIG. 17B shows the summary of performances of all approaches in all datasets. Note that for the ASRS we report false positive (FP) and false negative (FN) rates, since ASRS does not have any novel classes. The FP and FN rates may be averaged, over all 13 classes. For any dataset, DXMiner may have the highest AUC. The running times (training plus classification time per 1,000 data points) of DXMiner and O-F for different datasets are 26.4 and 258 (Twitter), 34.9 and 141 (ASRS), 2.2 and 13.1 (Forest), and 2.6 and 66.7 seconds (KDD), respectively. DXMiner may be at least 4 times or more faster than O-F in any dataset. Twitter and ASRS datasets may require longer running times than Forest and KDD due to the feature space conversions at runtime. O-F may be much slower than DXMiner because |C| OLINDDA models run in parallel, where |C| is the number of classes, making O-F roughly |C| times slower them DXMiner.

Figure 20:
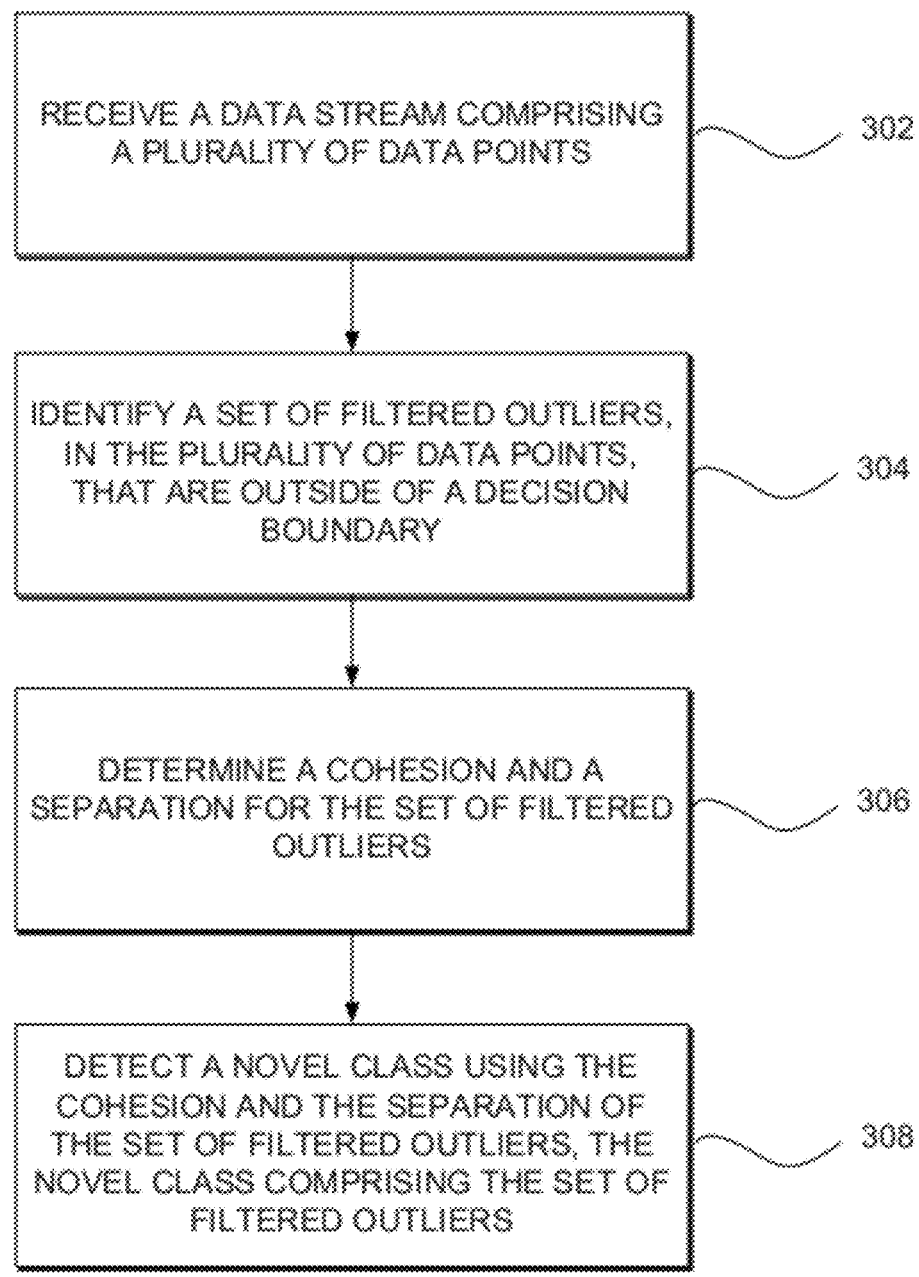
FIG. 20 is a flowchart of a process for detecting a novel class in accordance with an illustrative embodiment.

FIG. 20 is a flowchart that depicts a process of detecting a novel class in accordance with, an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart, block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

In one embodiment, the process described in FIG. 20 may be implemented by the data classification manager 100 in FIG. 1. The data classification manager may receive a data stream comprising a plurality of data points (step 302). When such a stream arrives, the data classification system identifies, in the plurality of data points, a set of F-outliers that are is outside of a decision boundary (step 304). For example, in one embodiment, identifying the set of F-outliers that is outside of the decision boundary may include identifying the set of F-outliers that is outside of the decision boundary of the ensemble of classification models. In another example embodiment, identifying the set of F-outliers that is outside of the decision boundary may include identifying the set of F-outliers that is outside of the decision boundary and a slack space.

Once the F-outliers outside the decision boundary nave been identified, the data classification system may then determine a cohesion and a separation for the set of F-outliers (step 306). For example, in one embodiment, determining a cohesion and a separation for the set of F-outliers may include determining a unified measure of the cohesion and the separation. In another example embodiment, determining a cohesion and a separation for the set of F-outliers may include determining the cohesion and the separation for the set of F-outliers with respect to each classification model.

The data classification system may then detect a novel class using the cohesion and the separation of the set of F-outliers, the novel class comprising the set of F-outliers (step 308). For example, in one embodiment, the novel class may be detected using the cohesion and the separation of the set of filtered outliers when a threshold number of the set of F-outliers having the cohesion and the separation that exceeds a predetermined threshold. In another example embodiment, detecting the novel class using the cohesion and the separation of the set of filtered outliers may include detecting the novel class in response to at least a threshold number of the plurality of classification models using the cohesion and the separation for the set of filtered outliers to detect the novel class. In a further example embodiment, detecting the novel class may include determining a gini coefficient G(s) for the set of filtered outliers, and then detecting the novel class using the cohesion, the separation, and the gini coefficient G(s) of the set of F-outliers.

Figure 21:
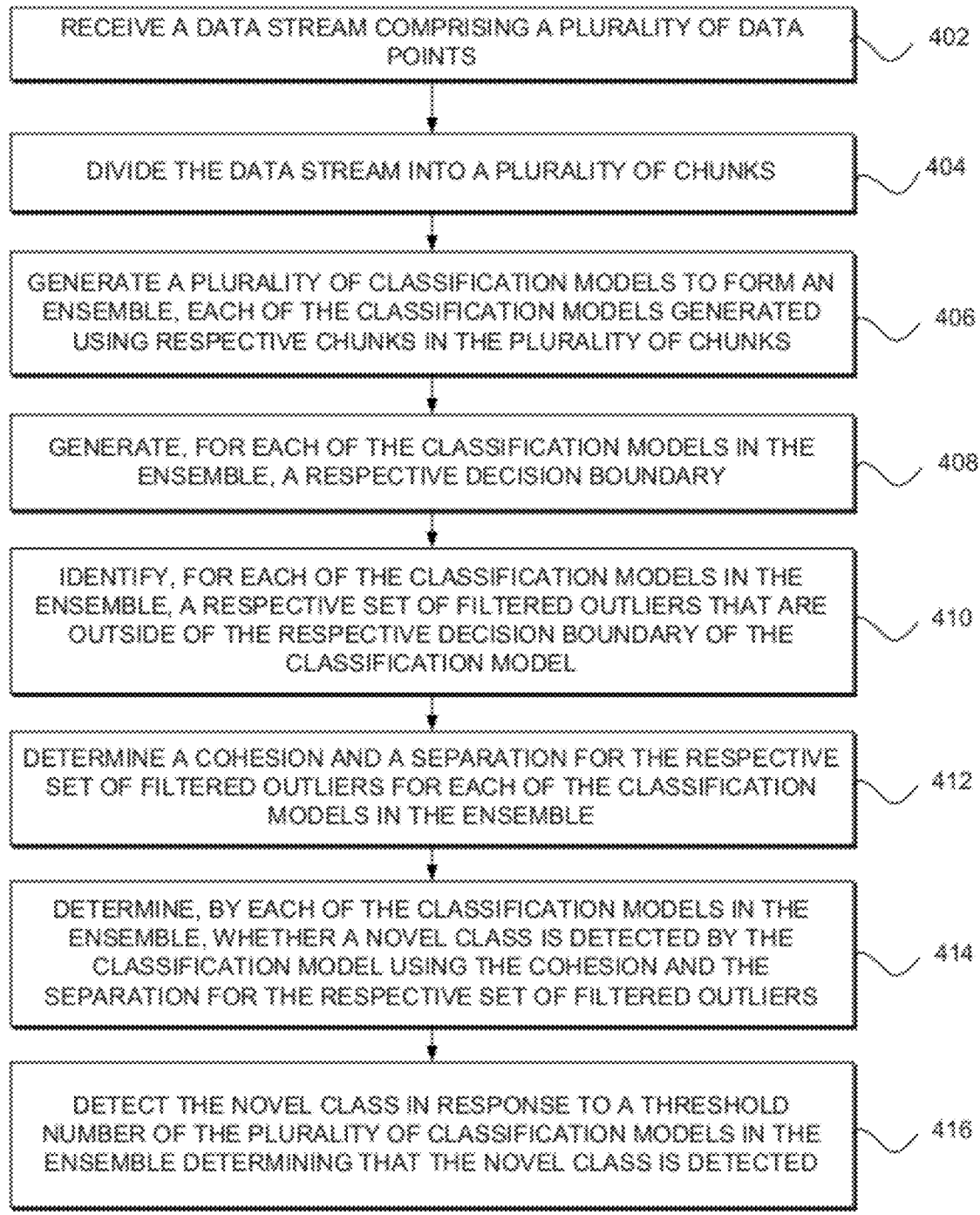
FIG. 21 is a flowchart of a process for detecting a novel class in accordance with an illustrative embodiment.

FIG. 21 is a flowchart that depicts another process for detecting a novel class in accordance with an illustrative embodiment. For example, in one embodiment, the process described in FIG. 21 may be implemented by the data classification manager 100 in FIG. 1. Upon receiving a data stream comprising a plurality of data points (step 402), the data classification manager may divide the data stream into a plurality of chunks (step 404). The data classification manager may also generate a plurality of classification models to form an ensemble, each of the classification models generated using respective chunks in the plurality of chunks (step 406). The data classification manager may generate, for each of the classification models in the ensemble, a respective decision boundary (step 408). For each of the classification models in the ensemble, the data classification manager may identify a respective set of filtered outliers that are outside of the respective decision boundary of the classification model (step 410). The data classification manager may also determine a cohesion and a separation for the respective set of filtered outliers for each of the classification models in the ensemble (step 412). For example, in one embodiment, determining the cohesion and the separation for the respective set of filtered outliers for each of the classification models in the ensemble may include determining a unified measure of the cohesion and the separation for the respective set of filtered outliers for each of the classification models in the ensemble, wherein the unified measure of the cohesion and the separation is a value in a range from −1 to 1. The data classification manager may determine, by each of the classification models in the ensemble, whether a novel class is detected by the classification model using the cohesion and the separation for the respective set of filtered outliers (step 414). In response to a threshold number of the plurality of classification models in the ensemble determining that the novel class is detected, the data classification manager may detect the novel class (step 416). In one example embodiment, detecting the novel class in response to the threshold number of the plurality of classification models in the ensemble determining that the novel class is detected may include detecting the novel class in response to all of the plurality of classification models in the ensemble determining that the novel class is detected. In another example embodiment, detecting the novel class in response to the threshold number of the plurality of classification models in the ensemble determining that the novel class is detected may include detecting the novel class in response to determining, by each of a threshold number of the plurality of classification models in the ensemble, that a threshold amount of the respective set of filtered outliers has a positive unified measure of the cohesion and the separation.

Figure 22:
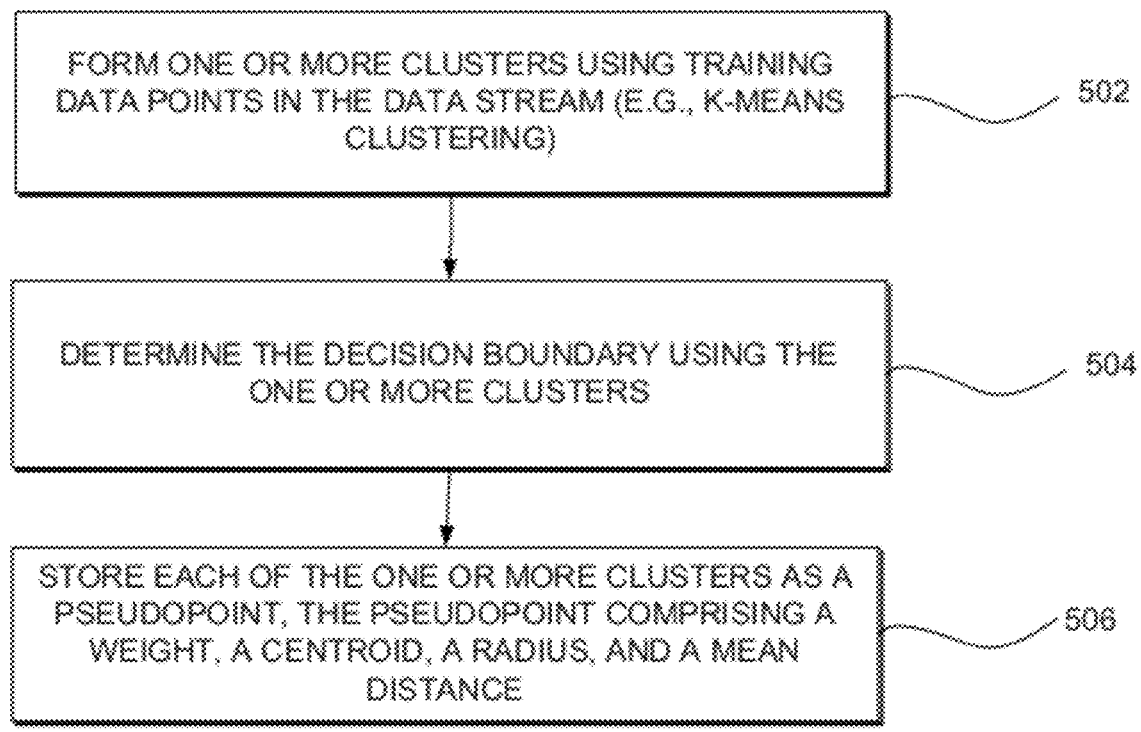
FIG. 22 is a flowchart of a process for forming clusters in accordance with an illustrative embodiment.

FIG. 22 is a flowchart that depicts a process for determining a decision boundary using clusters in accordance with an illustrative embodiment. In one embodiment, the process described in FIG. 22 may be implemented by the data classification manager 100 in FIG. 1. The data classification manager may form one or more clusters using training data points in the data stream (step 502). The data classification manager may then determine the decision boundary using the one or more clusters (step 504). For example, in one embodiment, forming the one or more clusters using the training data points in the data stream may include forming the one or more clusters using k-means clustering applied to training data. In one example embodiment, the data classification manager may also store each of the one or more clusters as a pseudopoint, the pseudopoint comprising a weight, a centroid, a radius, and a mean distance (step 506).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 23:
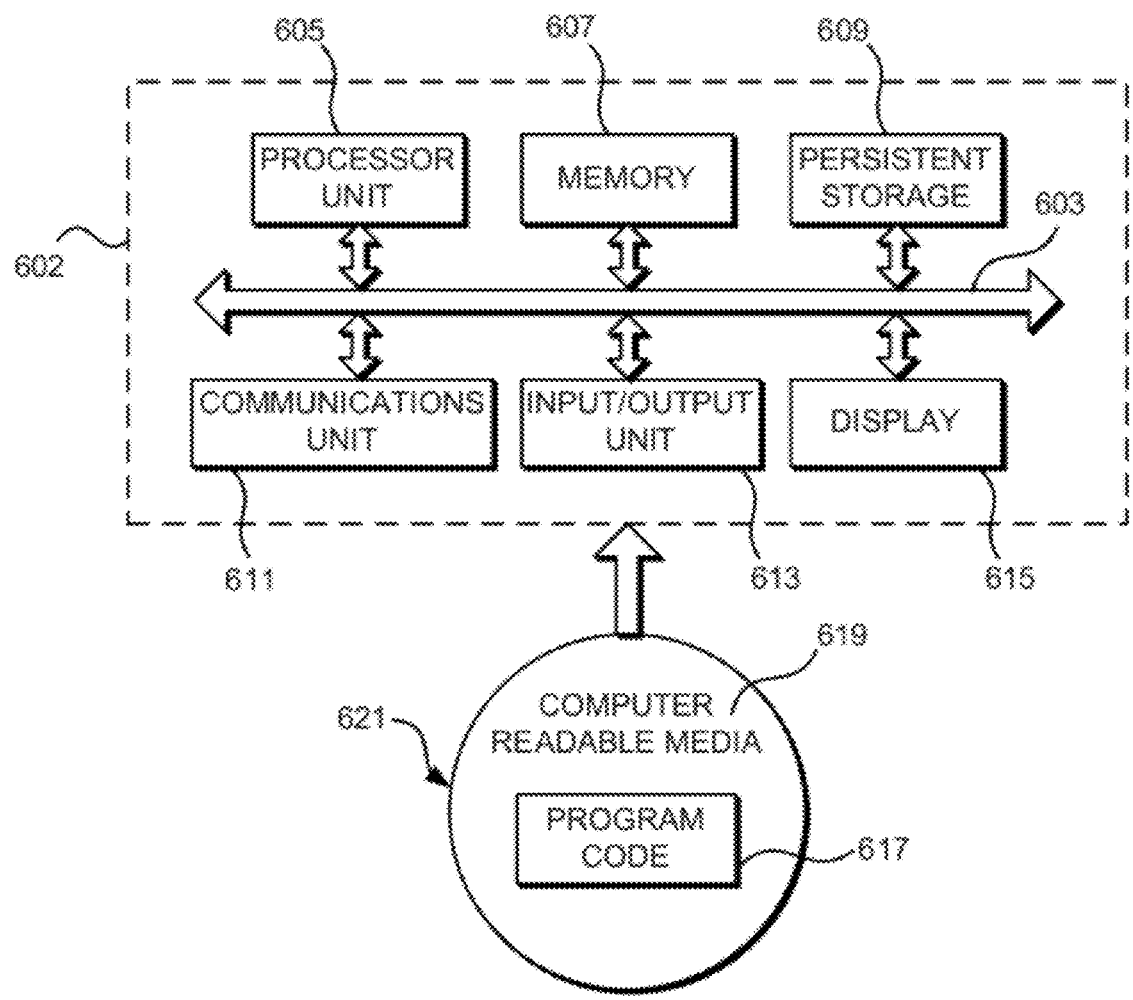
FIG. 23 is a block diagram of a computing device in which the illustrative embodiments may be implemented.

Referring to FIG. 23, a block diagram of a computing device 102 is shown in which the illustrative embodiments may be implemented. In particular, the detection of novel data classes, as described in any of the illustrative embodiments, may be implemented on the computing device 602. Computer-usable program code or instructions implementing the processes used in the illustrative embodiments may be located on the computing device 602. The computing device 602 includes a communications fabric 603, which provides communications between a processor unit 605, a memory 607, a persistent storage 609, a communications unit 611, an input/output (I/O) unit 613, and a display 615.

The processor unit 605 serves to execute instructions for software that may be loaded into the memory 607. The processor unit 605 may be a set of one or more processors or may be a multi-processor core, depending on the particular implementation. Further, the processor unit 605 may be implemented using one or more heterogeneous processor systems in which a main processor is present with secondary processors on a single chip. As another illustrative example, the processor unit 605 may be a symmetric multi-processor system containing multiple processors of the same type.

The memory 607, in these examples, may be, for example, a random access memory or any other suitable volatile or non-volatile storage device. The persistent, storage 609 may take various forms depending on the particular implementation. For example, the persistent storage 609 may contain one or more components or devices. For example, the persistent storage 609 may be a hard, drive, a flash memory, a rewritable optical disk, a rewritable magnetic tape, or some combination of the above. The media used by the persistent storage 609 also may be removable. For example, a removable hard drive may be used for the persistent storage 609.

The communications unit 611, in these examples, provides for communications with other data processing systems or communication devices. In these examples, the communications unit 611 may be a network interface card. The communications unit 611 may provide communications through the use of either or both physical and wireless communication links.

The input/output unit 613 allows for the input and output of data with other devices that may be connected to the computing device 602. For example, the input/output unit 613 may provide a connection for user input through a keyboard, and mouse. Further, the input/output unit 613 may send output to a processing device. The display 615 provides a mechanism to display information to a user, such as a graphical user interface.

Instructions for the operating system and applications or programs are located on the persistent storage 609. These instructions may be loaded into the memory 607 for execution by the processor unit 605. The processes of the different embodiments may be performed by the processor unit 605 using computer-implemented instructions, which may be located in a memory, such as the memory 607. These instructions are referred to as program code, computer-usable program code, or computer-readable program code that may be read and executed by a processor in the processor unit 605. The program code in the different embodiments may be embodied on different physical or tangible computer-readable media, such as the memory 607 or the persistent storage 609.

Program code 617 is located in a functional form on a computer-readable media 619 and may be loaded onto or transferred to the computing device 602 for execution by the processor unit 605. The program code 617 and the computer-readable media 619 form computer program product 621 in these examples. In one embodiment, the computer program product 621 is the novel data class detection system described in any of the illustrative embodiments. In this embodiment, the program code 617 may include computer-usable program code capable of detecting novel data classes, including detecting novel data classes in the presence of concept-drift, as described, in any of the illustrative embodiments herein. Indeed, any combination of the processes described in the illustrative embodiments may be implemented in the program code 617.

In one example, the computer-readable media 619 may be in a tangible form, such as, for example, an optical or magnetic disc that is inserted or placed into a drive or other device that is part of the persistent storage 609 for transfer onto a storage device, such as a hard, drive that is part of the persistent storage 609. In a tangible form, the computer-readable media 619 also may take the form of a persistent storage, such as a hard drive or a flash memory that is connected to the computing device 602. The tangible form of the computer-readable media 619 is also referred, to as computer recordable storage media.

Alternatively, the program code 617 may be transferred to the computing device 602 from the computer-readable media 619 through a communication link to the communications unit 611 or through a connection to the input/output unit 613. The communication link or the connection may be physical or wireless in the illustrative examples. The computer-readable media 619 also may take the form of non-tangible media, such as communication links or wireless transmissions containing the program code 617. In one embodiment, the program code 617 is delivered to the computing device 602 over the Internet.

The different components illustrated for the computing device 602 are not meant to provide architectural limitations to the manner in which different embodiments may be implemented. The different illustrative embodiments may be implemented in a data processing system including components in addition to or in place of those illustrated, for computing device 602. Other components shown in FIG. 23 can be varied, from the illustrative examples shown.

As one example, a storage device in the computing device 602 is any hardware apparatus that may store data. The memory 607, the persistent storage 609, and the computer-readable media 619 are examples of storage devices in a tangible form.

In another example, a bus system may be used to implement the communications fabric 603 and may be comprised of one or more buses, such as a system bus or an input/output bus. Of course, the bus system may be implemented using any suitable type of architecture that provides for a transfer of data between different components or devices attached to the bus system. Additionally, the communications unit 611 may include one or more devices used to transmit and receive data, such as a modem or a network adapter. Further, a memory may be, for example, the memory 607 or a cache such as found in an interface and memory controller hub that may be present in the communications fabric 603.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A method for detecting a novel class, the method comprising:
   receiving, by at least one computing device, a data stream comprising a plurality of data points;
   comparing, by the at least one computing device, individual data points of the plurality of data points with a decision boundary to determine whether the individual data points are outside the decision boundary, the decision boundary corresponding to at least one classification model formed using training data;
   identifying, by the at least one computing device, a plurality of filtered outliers in the plurality of data points, the plurality of filtered outliers including the individual data points that are determined to be outside of the decision boundary;
   storing, by the at least one computing device, the plurality of filtered outliers in a buffer;
   determining, by the at least one computing device, a quantity of filtered outliers stored in the buffer;
   determining, by the at least one computing device, a cohesion and a separation for individual filtered outliers of the plurality of filtered outliers in response to the quantity of filtered outliers meeting or exceeding a predefined buffer threshold, the cohesion being determined based at least in part on a measure of closeness between a respective filtered outlier of the plurality of filtered outliers and other filtered outliers of the plurality of filtered outliers, and the separation being determined based at least in part on a measure of separation between the respective filtered outlier and a set of training data points in the plurality of data points; and
   detecting, by the at least one computing device, a novel class using the cohesion and the separation of the individual filtered outliers, the novel class comprising the plurality of filtered outliers.

2. The method of claim 1, wherein detecting the novel class using the cohesion and the separation of the individual filtered outliers comprises detecting, by the at least one computing device, the novel class in response to a threshold number q of the plurality of of filtered outliers having the cohesion and the separation exceeding a predetermined threshold.

3. The method of claim 1, further comprising:
   classifying, by the at least one computing device, a portion of the plurality of data points into one or more existing classes in response to the portion of the plurality of data points being within the decision boundary.

4. The method of claim 3, wherein the data stream comprises one or more concepts that change over time, and wherein the individual data points of the plurality of data points in the data stream are classified into one of the novel class or the one or more existing classes.

5. The method of claim 1, further comprising:
   determining, by the at least one computing device, one or more Fpseudopoints for the individual filtered outliers; and
   wherein determining the cohesion and the separation for the individual filtered outliers comprises determining, by the at least one computing device, the cohesion and the separation using the Fpseudopoints.

6. The method of claim 1, further comprising:
   forming, by the at least one computing device, one or more clusters using training data points in the data stream; and
   determining, by the at least one computing device, the decision boundary using the one or more clusters.

7. The method of claim 6, wherein forming the one or more clusters using the training data points in the data stream comprises forming, by the at least one computing device, the one or more clusters using k-means clustering applied to training data.

8. The method of claim 6, further comprising:
   storing, by the at least one computing device, each of the one or more clusters as a pseudopoint, the pseudopoint comprising a weight, a centroid, a radius, and a mean distance.

9. The method of claim 6, further comprising:
   storing, by the at least one computing device, each of the one or more clusters as a pseudopoint, the pseudopoint associated with a region in a feature space, the region having a center and a radius; and
   wherein determining the decision boundary using the one or more clusters comprises determining, by the at least one computing device, the decision boundary to be a union of the regions of the one or more pseudopoints.

10. The method of claim 1, wherein determining the cohesion and the separation for the individual filtered outliers comprises determining, by the at least one computing device, determining a unified measure of the cohesion and the separation; and
    wherein the novel class is detected in response to a predetermined threshold amount of the plurality of filtered outliers having the unified measure of the cohesion and the separation meeting or exceeding a predetermined unified measure threshold.

11. The method of claim 10, wherein the unified measure of the cohesion and the separation is a value in a range from −1 to 1, the cohesion and the separation of the filtered outlier increasing as the value of the unified measure in the range increases; and
    wherein the predetermined unified measure threshold is a value in the range from 0 to 1.

12. The method of claim 1, further comprising:
    delaying, by the at least one computing device, the determining and the detecting for a maximum of $T_c$ time units.

13. The method of claim 1, further comprising:
dividing, by the at least one computing device, the data stream into a plurality of data chunks;
training, by the at least one computing device, a plurality of classification models with the plurality of data chunks, each of the classification models associated with a respective decision boundary;
wherein identifying the plurality of filtered outliers comprises identifying, by the at least one computing device and by each of the classification models, the individual data points in the data stream that are outside of the respective decision boundary of each of the classification models;
wherein determining the cohesion and the separation for the individual filtered outliers comprises determining, by the at least one computing device, the cohesion and the separation for the individual of filtered outliers with respect to each classification model; and
wherein detecting the novel class using the cohesion and the separation of the individual filtered outliers comprises detecting, by the at least one computing device, the novel class in response to at least a threshold number of the plurality of classification models using the cohesion and the separation for the plurality of filtered outliers to detect the novel class.

14. The method of claim 13, wherein training the plurality of classification models with the plurality of data chunks comprises training the plurality of classification models with a plurality of labeled data chunks.

15. The method of claim 13, wherein the novel class is detected in response to all of the plurality of classification models using the cohesion and the separation for the plurality of filtered outliers to detect the novel class.

16. The method of claim 13, wherein the novel class is detected in response to at least the threshold number of the plurality of classification models having a threshold number of respective filtered outliers having the cohesion and the separation exceeding a predetermined threshold.

17. The method of claim 13, wherein each of the plurality of classification models comprises one or more pseudopoints.

18. The method of claim 13, further comprising:
updating, by the at least one computing device, the plurality of classification models by replacing a classification model having a highest error with a newly-trained classification model.

19. The method of claim 13, wherein the decision boundary of each classification model is a union of a plurality of decision boundaries, each of the plurality of decision boundaries determined for a respective one of the plurality of classification models.

20. The method of claim 13, wherein the plurality of classification models forms an ensemble, and wherein the ensemble includes a constant number of classification models.

21. The method of claim 1, further comprising:
incrementally training, by the at least one computing device, an ensemble of classification models using labeled data points in the data stream; and
wherein identifying the plurality of filtered outliers, in the plurality of data points, comprises identifying the individual data points that are outside of the decision boundary of the ensemble of classification models.

22. The method of claim 1, wherein the decision boundary comprises a slack space; and
wherein identifying the plurality of filtered outliers comprises identifying, by the at least one computing device, the individual data points that are outside of the decision boundary and the slack space.

23. The method of claim 1, further comprising:
determining, by the at least one computing device, a gini coefficient G(s) for the plurality of filtered outliers; and
wherein detecting the novel class using the cohesion and the separation of the plurality of filtered outliers comprises detecting, by the at least one computing device, the novel class using the cohesion, the separation, and the gini coefficient G(s) of the plurality of filtered outliers.

24. The method of claim 1, wherein detecting the novel class comprises detecting, by the at least one computing device, two or more novel classes based at least in part on a separation between the two or more novel classes and a cohesion of the data points in each of the two or more novel classes.

25. The method of claim 24, wherein detecting two or more novel classes based on the separation between the two or more novel classes and the cohesion of the data points in each of the two or more novel classes comprises:
constructing, by the at least one computing device, a graph G;
identifying, by the at least one computing device, connected components in the graph G; and
detecting, by the at least one computing device, the two or more novel classes based at least in part on a number of the connected components.

26. The method of claim 1, wherein the individual data points in the data stream comprises a dynamic feature set, the method further comprising:
selecting, by the at least one computing device, the features in the dynamic feature set using one of a predictive feature selection or an informative feature selection; and
generating, by the at least one computing device, a homogenous feature space using a lossless homogenizing conversion.

27. A method for detecting a novel class, the method comprising:
receiving, via at least one computing device, a data stream comprising a plurality of data points;
dividing, via the at least one computing device, the data stream into a plurality of chunks;
generating, via the at least one computing device, a plurality of classification models to form an ensemble, each of the classification models being generated using respective chunks in the plurality of chunks;
generating, via the at least one computing device and for each of the classification models in the ensemble, a respective decision boundary;
identifying, via the at least one computing device and for each of the classification models in the ensemble, a respective plurality of filtered outliers that are outside of the respective decision boundary of the respective classification model;
store, via the at least one computing device, the respective plurality of filtered outliers in a buffer;
determining, via the at last one computing device, a quantity of filtered outliers stored in the buffer;
determining, via the at least one computing device, a cohesion and a separation for the respective plurality of filtered outliers for each of the classification models in the ensemble when the quantity of filtered outliers exceeds a predefined threshold, the cohesion being determined based at least in part on a measure of closeness between a respective filtered outlier of the respective plurality of filtered outliers with the other filtered outliers in the respective plurality of filtered outliers, and the separation being determined based in part on a measure of separation between the respective filtered outlier and the classification models;

determining, via the at least one computing device and by each of the classification models in the ensemble, whether a novel class is detected by the classification model using both the cohesion and the separation for the respective set of filtered outliers; and detecting, via the at least one computing device, the novel class in response to a threshold number of the plurality of classification models in the ensemble determining that the novel class is detected.

28. The method of claim 27, wherein detecting the novel class in response to the threshold number of the plurality of classification models in the ensemble determining that the novel class is detected comprises detecting the novel class in response to all of the plurality of classification models in the ensemble determining that the novel class is detected.

29. The method of claim 27, wherein determining the cohesion and the separation for the respective plurality of filtered outliers for each of the classification models in the ensemble comprises determining, via the at least one computing device, a unified measure representing both the cohesion and the separation for the respective set of filtered outliers for each of the classification models in the ensemble; and wherein the unified measure representing both the cohesion and the separation is a value in a range from −1 to 1.

30. The method of claim 29, wherein detecting the novel class in response to the threshold number of the plurality of classification models in the ensemble determining that the novel class is detected comprises detecting, via the at least one computing device, the novel class in response to determining, by each of a threshold number of the plurality of classification models in the ensemble, that a threshold amount of the respective plurality of filtered outliers has a positive unified measure representing the cohesion and the separation.

31. A data classification and novel class detection system comprising:

a processor in data communication with a memory;

a decision boundary builder executable by the processor, the decision boundary builder being configured to determine a decision boundary corresponding to a least one class of data points within at least one classification model formed using training data;

a filtered outlier identifier executable by the processor, the filtered outlier identifier being configured to:

determine a plurality of filtered outliers, in an incoming data stream, that are outside of the decision boundary; and store the plurality of filtered outliers in a buffer;

a cohesion and separation analyzer executable by the processor, the cohesion and separation analyzer being initiated when a quantity of filtered outliers in the buffer met or exceed a threshold value and being configured to:

determine a cohesion and a separation for the individual filtered outliers in the plurality of filtered outliers, the cohesion being determined based at least in part on a measure of closeness between a respective filtered outlier of the plurality of filtered outliers and the other filtered outliers of the plurality of filtered outliers, and the separation being determined based at least in part on a measure of separation between the respective filtered outliers and a set of training data points from the incoming data stream; and calculate a uniform measure for the individual filtered outliers using the cohesion and the separation, the uniform representing both the cohesion and the separation; and a novel class determination engine executable by the processor, the novel class determination engine being configured to detect a novel class using the uniform measure representing the cohesion and the separation for the plurality of filtered outliers.

32. The data classification and novel class detection system of claim 31, further comprising:

a data stream module divider executable by the processor, the data stream module divider being configured to divide the incoming data stream into a plurality of chunks; and a plurality of classification models executable in the processor, each of the plurality of classification models to be applied to a respective portion of the plurality of chunks to determine whether a novel class exists in the respective portion of the plurality of chunks;

wherein the novel class determination engine detects the novel class if a threshold number of the plurality of classification models determines that the novel class exists in the respective portion of the plurality of chunks.

* * * * *